US010699367B2

(12) United States Patent
Wilt et al.

(10) Patent No.: US 10,699,367 B2
(45) Date of Patent: Jun. 30, 2020

(54) PLACEMENT OPTIMIZATION FOR VIRTUALIZED GRAPHICS PROCESSING

(71) Applicant: Amazon Technologies, Inc., Seattle, WA (US)

(72) Inventors: Nicholas Patrick Wilt, Mercer Island, WA (US); Ashutosh Tambe, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/586,760

(22) Filed: Sep. 27, 2019

(65) Prior Publication Data

US 2020/0027193 A1    Jan. 23, 2020

Related U.S. Application Data

(63) Continuation of application No. 15/905,368, filed on Feb. 26, 2018, now Pat. No. 10,430,916, which is a
(Continued)

(51) Int. Cl.
*G06T 1/20* (2006.01)
*G06F 9/455* (2018.01)
(Continued)

(52) U.S. Cl.
CPC ............. *G06T 1/20* (2013.01); *G06F 9/445* (2013.01); *G06F 9/45558* (2013.01); *G06F 9/50* (2013.01);
(Continued)

(58) Field of Classification Search
CPC . G06T 1/20; G06F 9/5077; G06F 9/50; G06F 9/445; G06F 9/45558; G06F 2009/4557; G06F 2009/45562
See application file for complete search history.

(56) References Cited

U.S. PATENT DOCUMENTS 8,405,666 B2 * 3/2013 Masood ................. G06F 9/455
345/522
9,069,622 B2   6/2015 Post et al.
(Continued)

FOREIGN PATENT DOCUMENTS

WO        2014100558      6/2014

OTHER PUBLICATIONS

U.S. Appl. No. 14/822,511, filed Aug. 10, 2015, Nicholas Patrick Wilt et al.
(Continued)

*Primary Examiner* — Robert J Craddock
(74) *Attorney, Agent, or Firm* — Robert C. Kowert; Kowert, Hood, Munyon, Rankin & Goetzel, P.C.

(57) ABSTRACT

Methods, systems, and computer-readable media for placement optimization for virtualized graphics processing are disclosed. A provider network comprises a plurality of instance locations for physical compute instances and a plurality of graphics processing unit (GPU) locations for physical GPUs. A GPU location for a physical GPU or an instance location for a physical compute instance is selected in the provider network. The GPU location or instance location is selected based at least in part on one or more placement criteria. A virtual compute instance with attached virtual GPU is provisioned. The virtual compute instance is implemented using the physical compute instance in the instance location, and the virtual GPU is implemented using the physical GPU in the GPU location. The physical GPU is accessible to the physical compute instance over a network. An application is executed using the virtual GPU on the virtual compute instance.

20 Claims, 29 Drawing Sheets

Related U.S. Application Data continuation of application No. 14/938,654, filed on Nov. 11, 2015, now Pat. No. 9,904,974.

(51) Int. Cl.
  *G06F 9/445* (2018.01)
  *G06F 9/50* (2006.01)
(52) U.S. Cl.
  CPC .... *G06F 9/5077* (2013.01); *G06F 2009/4557* (2013.01); *G06F 2009/45562* (2013.01)

(56) References Cited

U.S. PATENT DOCUMENTS

| | | | |
|---|---|---|---|
| 9,098,323 | B2 | 8/2015 | Mitra et al. |
| 2007/0033156 | A1 | 2/2007 | Limpert et al. |
| 2011/0083131 | A1 | 4/2011 | Pirzada et al. |
| 2011/0102443 | A1 | 5/2011 | Dror et al. |
| 2011/0134111 | A1 | 6/2011 | Stone |
| 2011/0182422 | A1 | 7/2011 | Anderson et al. |
| 2012/0069032 | A1 | 3/2012 | Hansson et al. |
| 2012/0154389 | A1 | 6/2012 | Bohan et al. |
| 2014/0055466 | A1 | 2/2014 | Petrov et al. |
| 2014/0169471 | A1 | 6/2014 | He |
| 2014/0176583 | A1 | 6/2014 | Abiezzi et al. |
| 2014/0181806 | A1* | 6/2014 | Abiezzi ............... G06F 9/45558 718/1 |
| 2014/0189091 | A1* | 7/2014 | Tamasi ............... H04L 43/0858 709/224 |
| 2014/0215462 | A1 | 7/2014 | Kuo et al. |
| 2014/0286390 | A1 | 9/2014 | Fear |
| 2015/0067672 | A1 | 3/2015 | Mitra et al. |
| 2015/0097844 | A1 | 4/2015 | Wankhede et al. |
| 2015/0105148 | A1 | 4/2015 | Consul et al. |
| 2015/0116335 | A1 | 4/2015 | Chen et al. |
| 2015/0220354 | A1 | 8/2015 | Nair |
| 2015/0221063 | A1 | 8/2015 | Kim et al. |
| 2015/0370589 | A1 | 12/2015 | Bidarkar et al. |
| 2015/0370620 | A1 | 12/2015 | Lai et al. |
| 2016/0239333 | A1 | 8/2016 | Cowperthwaite et al. |
| 2016/0247248 | A1 | 8/2016 | Ha et al. |
| 2017/0004808 | A1 | 1/2017 | Agashe et al. |

OTHER PUBLICATIONS

Federico Silla. "The rCUDA technology: an inexpensive way to improve the performance of GPU-based clusters." Talk at Computer Engineering Laboratory, Delft University of Technology. Delft, Netherlands. Apr. 2015, pp. 1-47.

Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.

Nice, "DCV Administration Guide," NICE s.r.l, Asti, Italy, Jul. 2015, Source: https://www.nice-software.com/download/nice-dcv-2014#documentation, pp. 1-96.

U.S. Appl. No. 14/938,457, filed Nov. 11, 2015, Nicholas Patrick Wilt et al.

U.S. Appl. No. 14/938,461, filed Nov. 11, 2015, Nicholas Patrick Wilt et al.

U.S. Appl. No. 14/938,656, filed Nov. 11, 2015, Nicholas Patrick Wilt et al.

Lin Shi, et al., "vCUDA: GPU-Accelerated High-Performance Computing in Virtual Machines", IEEE Transaction on Computers, vol. 61, No. 6, Jun. 2012, pp. 804-816.

Matthew Danish, et al., "Virtual-CPU Scheduling in the Quest Operating System", 2011 17th IEEE Real-Time and Embedded Technology and Application Symposium, Apr. 11, 2011, pp. 169-179.

Mark Panahi, et al., "A Framework for Real-Time Service-Oriented Architecture", 2009 IEEE Conference on Commerce and Enterprise Computing (CED '09), Jul. 20, 2009, pp. 460-467.

Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.

Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.

U.S. Appl. No. 15/178,292, filed Jun. 9, 2016, Nicholas Patrick Wilt.
U.S. Appl. No. 15/177,255, filed Jun. 8, 2016, Nicholas Patrick Wilt.
U.S. Appl. No. 15/177,262, filed Jun. 8, 2016, Nicholas Patrick Wilt.
U.S. Appl. No. 15/249,150, filed Aug. 26, 2016, Ingegneri.
U.S. Appl. No. 15/374,509, filed Dec. 9, 2016, Featonby, et al.
U.S. Appl. No. 15/417,064, filed Jan. 26, 2017, Featonby, et al.
U.S. Appl. No. 15/439,751, filed Feb. 22, 2017, Surani, et al.

Jeff Weiss, et al., "NVIDIA Grid VCPU Deployment Guide for VMWare Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.

Installing VMware VGPU on vSphere 6.0, Martijin Smit, Mar. 7, 2015, pp. 1-10.

U.S. Appl. No. 15/470,821, filed Mar. 27, 2017, Malcolm Featonby, et al.

* cited by examiner

US 10,699,367 B2

PLACEMENT OPTIMIZATION FOR VIRTUALIZED GRAPHICS PROCESSING

This application is a continuation of U.S. patent application Ser. No. 15/905,368, filed on Feb. 26, 2018, which is a continuation of U.S. patent application Ser. No. 14/938,654, filed Nov. 11, 2015, now U.S. Pat. No. 9,904,974, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
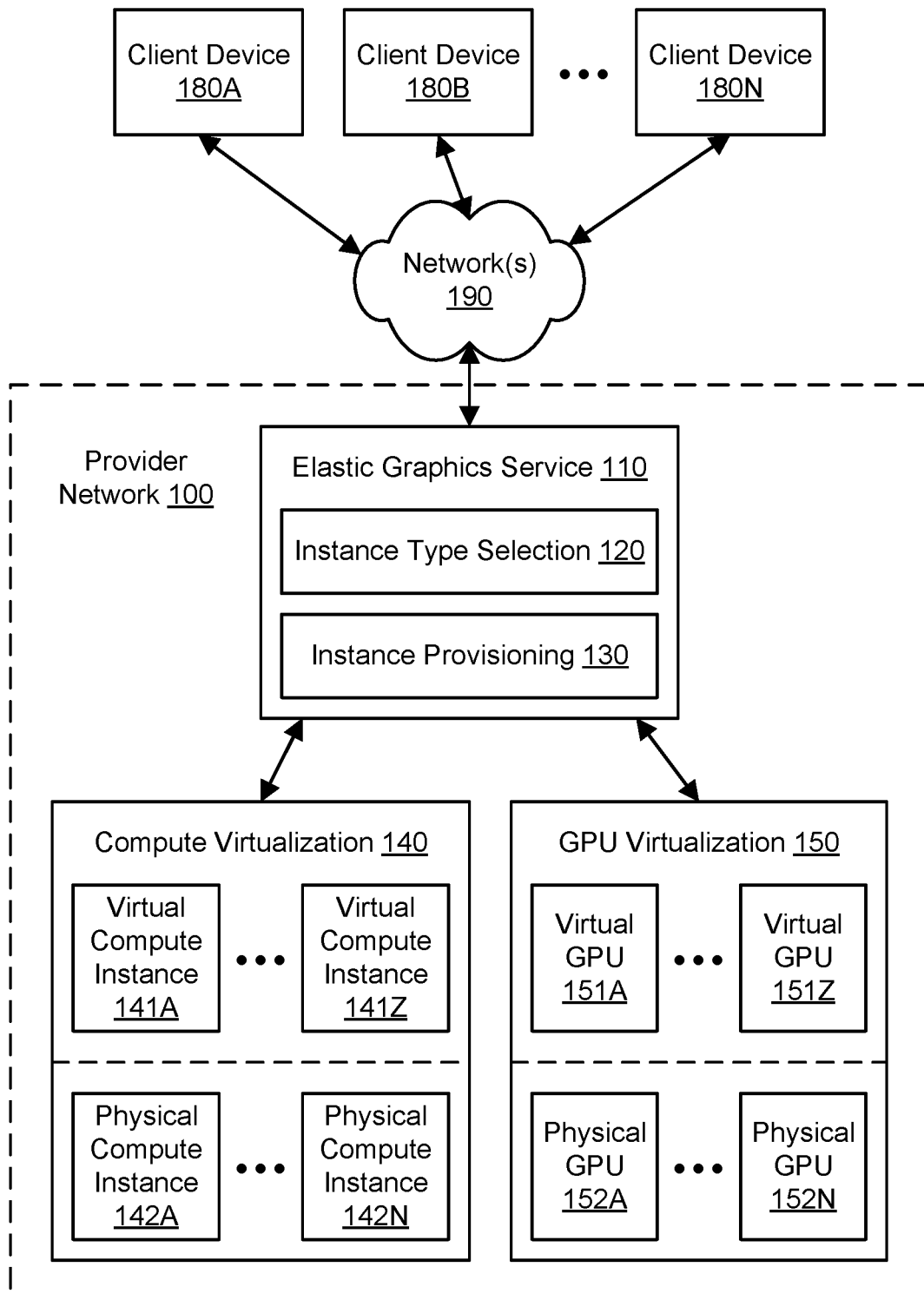
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for scaling for virtualized graphics processing are described. Using the techniques described herein, a virtual compute instance may be provisioned, and a first set of one or more GPU(s) may be attached to the instance to provide graphics processing. The first set of one or more virtual GPUs may provide a particular level of graphics processing. After a change in GPU requirements for the instance is determined, the second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different physical compute instance may also be performed, e.g., to reduce network latency associated with virtualized graphics processing.

Various embodiments of methods, systems, and computer-readable media for placement optimization for virtualized graphics processing are described. Using the techniques described herein, optimization of resource placement may improve one or more metrics (e.g., related to resource usage or cost) for GPU virtualization. Physical compute instance(s) may be used to implement virtual compute instance(s), and physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available physical compute instance(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying physical compute instance and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

Various embodiments of methods, systems, and computer-readable media for application-specific virtualized graphics processing are described. Using the techniques described herein, a virtual compute instance may be provisioned. The virtual compute instance may be configured to execute an application. The application may be associated with graphics requirements. For example, an application manifest may specify a recommended graphics processing unit (GPU) class and/or size of video memory for the application, or analysis of execution of the application may determine graphics requirements for the application. A virtual GPU may be selected for the virtual compute instance based (at least in part) on the graphics requirements for the application. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. The application may be executed on the virtual compute instance using the virtual GPU. Additional applications on the virtual compute instance may use different application-specific virtual GPUs, and the application-specific virtual GPUs may vary in graphics processing capabilities based on the varying requirements of the applications.

Various embodiments of methods, systems, and computer-readable media for local-to-remote migration for virtualized graphics processing are described. Using the techniques described herein, a virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of physical compute instances 142A-142N. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying physical compute instances 142A-142N may be heterogeneous, and the underlying physical GPUs 152A-152N may be heterogeneous as well. In one embodiment, the compute virtualization 140 may use techniques for multi-tenancy to provision virtual compute instances 141A-141Z that exceed the physical compute instances 142A-142N in number. In one embodiment, the GPU virtualization 150 may use techniques for multi-tenancy to provision virtual GPUs 151A-151Z that exceed the physical GPUs 152A-152N in number.

The elastic graphics service 110 may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 18), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 18.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 18:
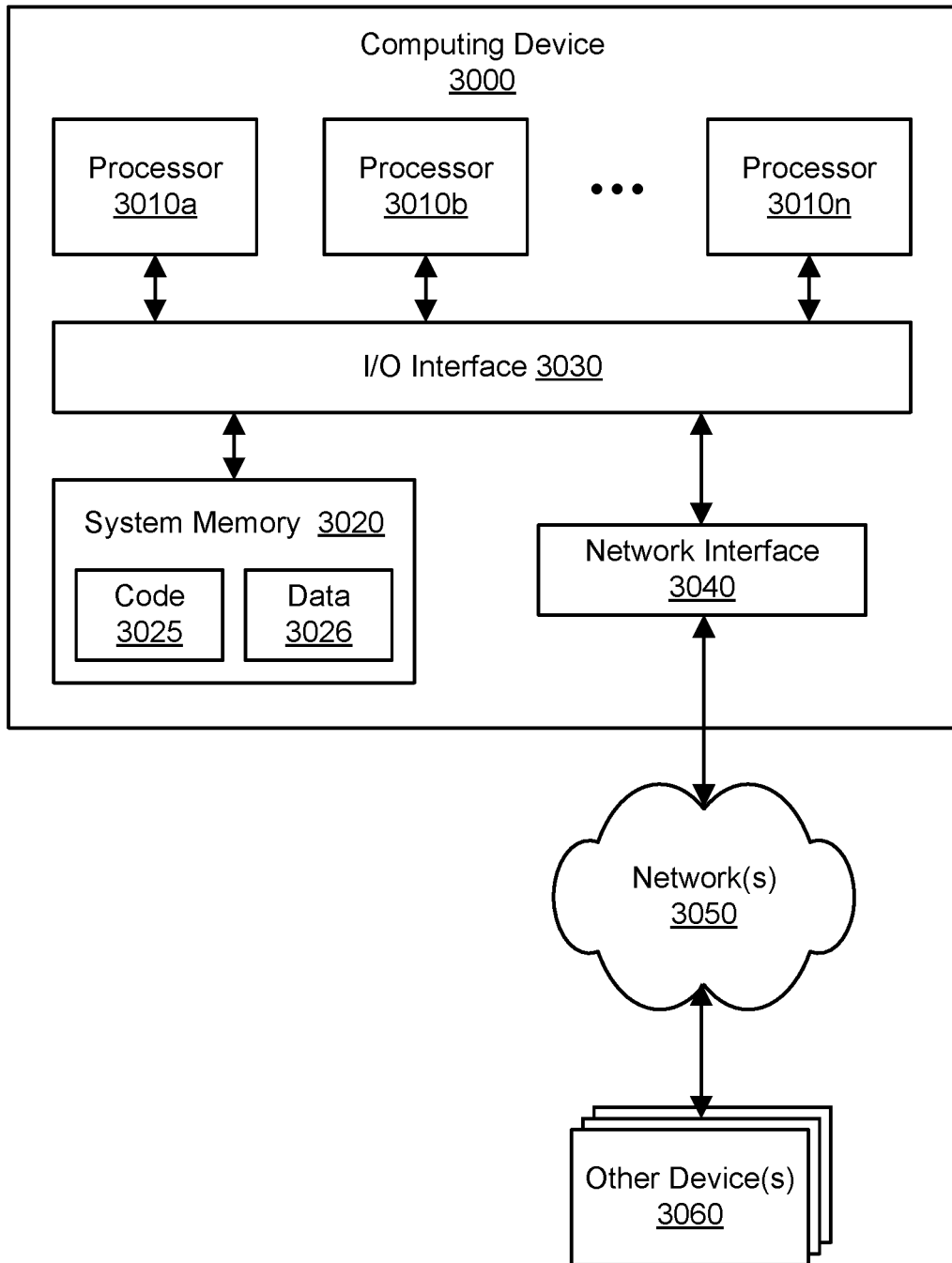
FIG. 18 illustrates an example computing device that may be used in some embodiments.

The provider network 100 may include a plurality of computing devices, any of which may be implemented by the example computing device 3000 illustrated in FIG. 18. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although physical compute instances 142A through 142N are shown for purposes of example and illustration, it is contemplated that different quantities and configurations of physical compute instances may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
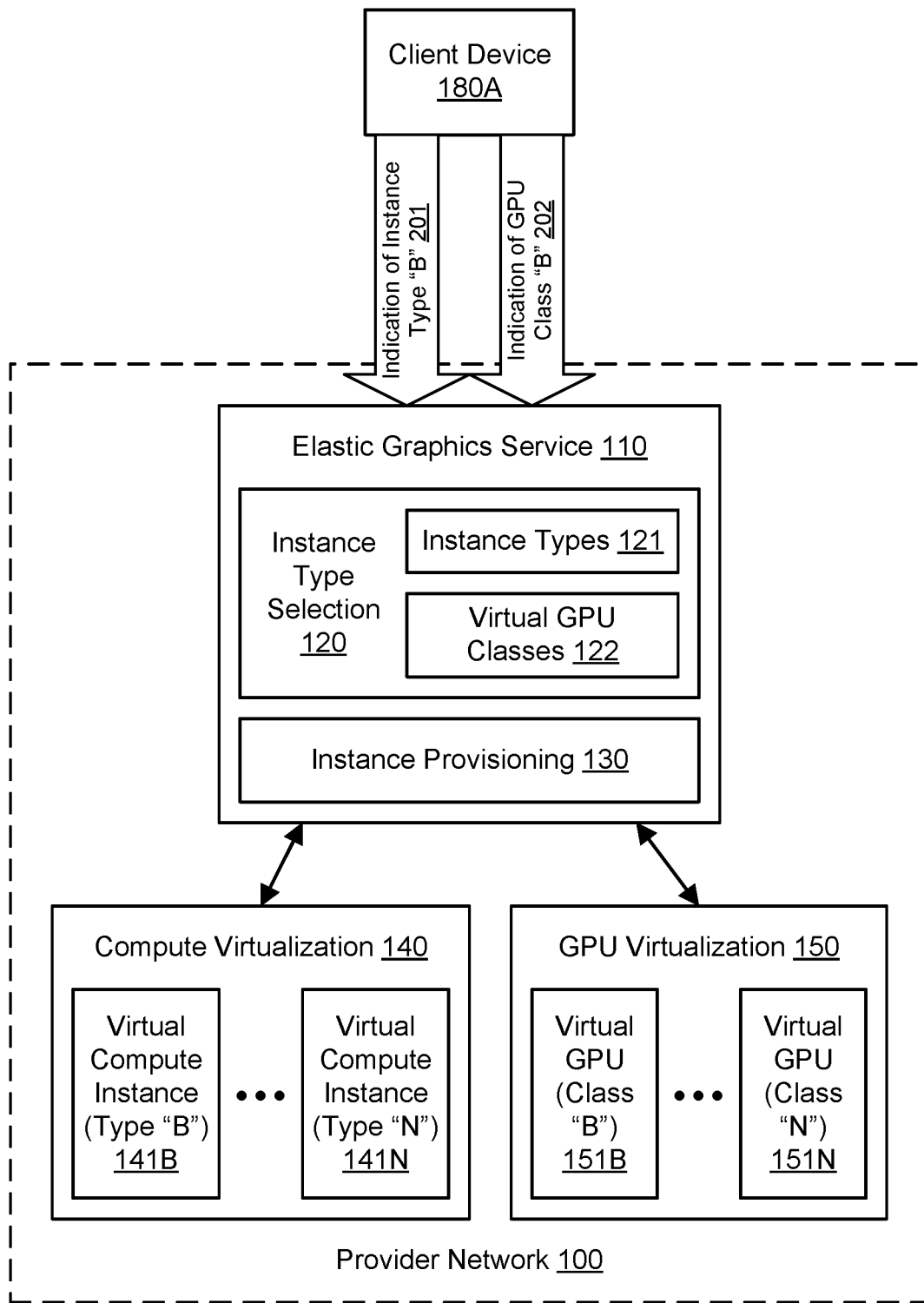
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
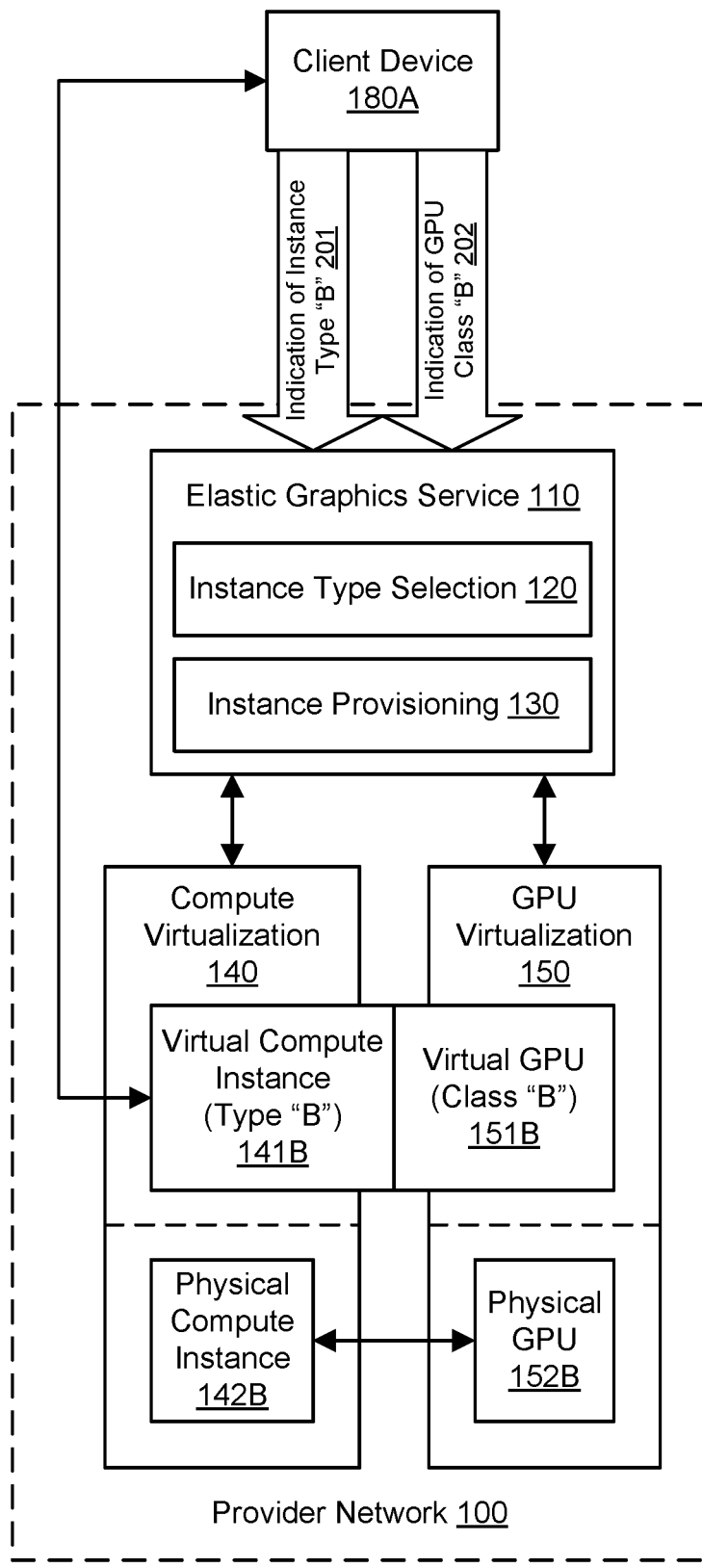
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a physical compute instance 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a physical compute instance 142B may communicate with a physical GPU 152B, e.g., over a network. The physical GPU 152B may be located in a different computing device than the physical compute instance 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
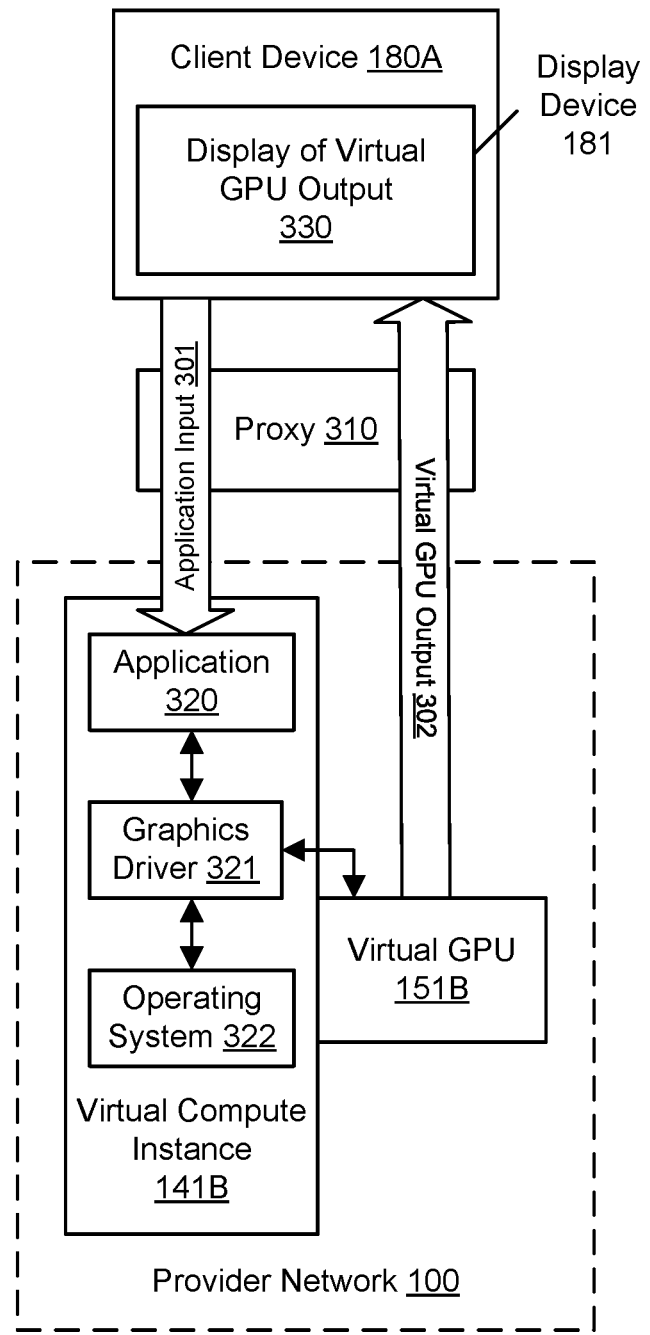
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying physical compute instance 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or co-processor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
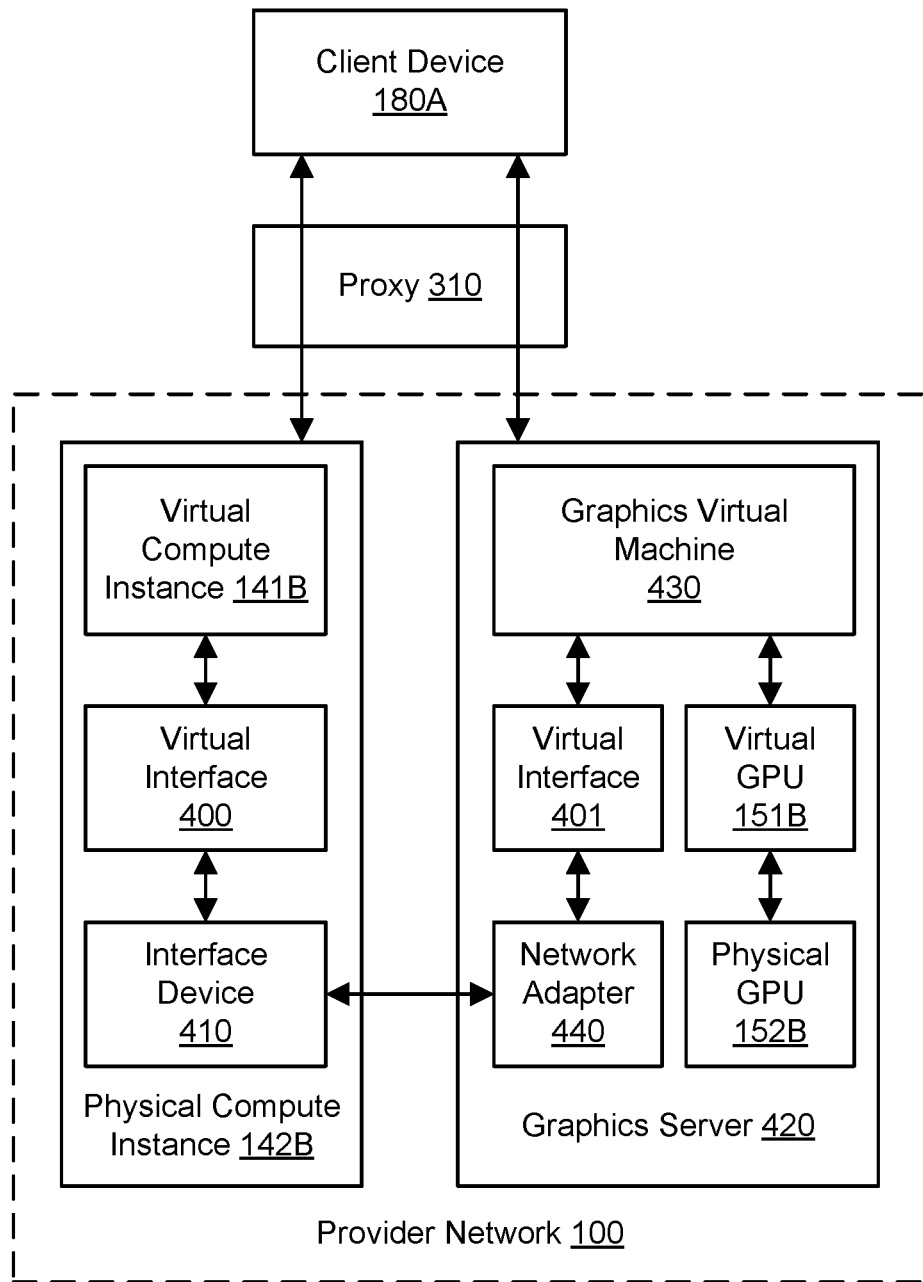
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a physical compute instance 142B, and the virtual GPU 151B attached to that instance 141B may be implemented using a separate and distinct computing device termed a graphics server 420. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the graphics server 420 (and thus with the physical GPU 152B) over a network. The interface device 410 may be implemented in any suitable manner, e.g., as an expansion card (such as a PCI Express card) or attached peripheral device for the physical compute instance 142B. The interface device 410 may use single root I/O virtualization to expose hardware virtual functions to the virtual compute instance 141B. In one embodiment, the physical compute instance 142B may implement a plurality of virtual compute instances, each with its own virtual interface, and the virtual compute instances may use the interface device 410 to interact with the corresponding virtual GPUs on one or more graphics servers. The physical compute instance 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the graphics server 420, and the graphics server 420 may execute the commands on behalf of the interface device. The graphics server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The graphics server 410 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the graphics server 420 may implement a plurality of virtual GPUs (such as virtual GPU 151B) using one or more physical GPUs (such as physical GPU 152B), and the virtual GPUs may interact with the corresponding virtual compute instances on one or more physical compute instances over a network. The graphics server 420 may communicate with the proxy 310 using a suitable remoting protocol, e.g., to send data to and receive data from the client device 180A. For example, the graphics server 420 may generate virtual GPU output based on the commands sent from the interface device 410. The virtual GPU output may be provided to the client device 180A through the proxy 310, e.g., from the physical compute instance 142B or graphics server 420.

Figure 5:
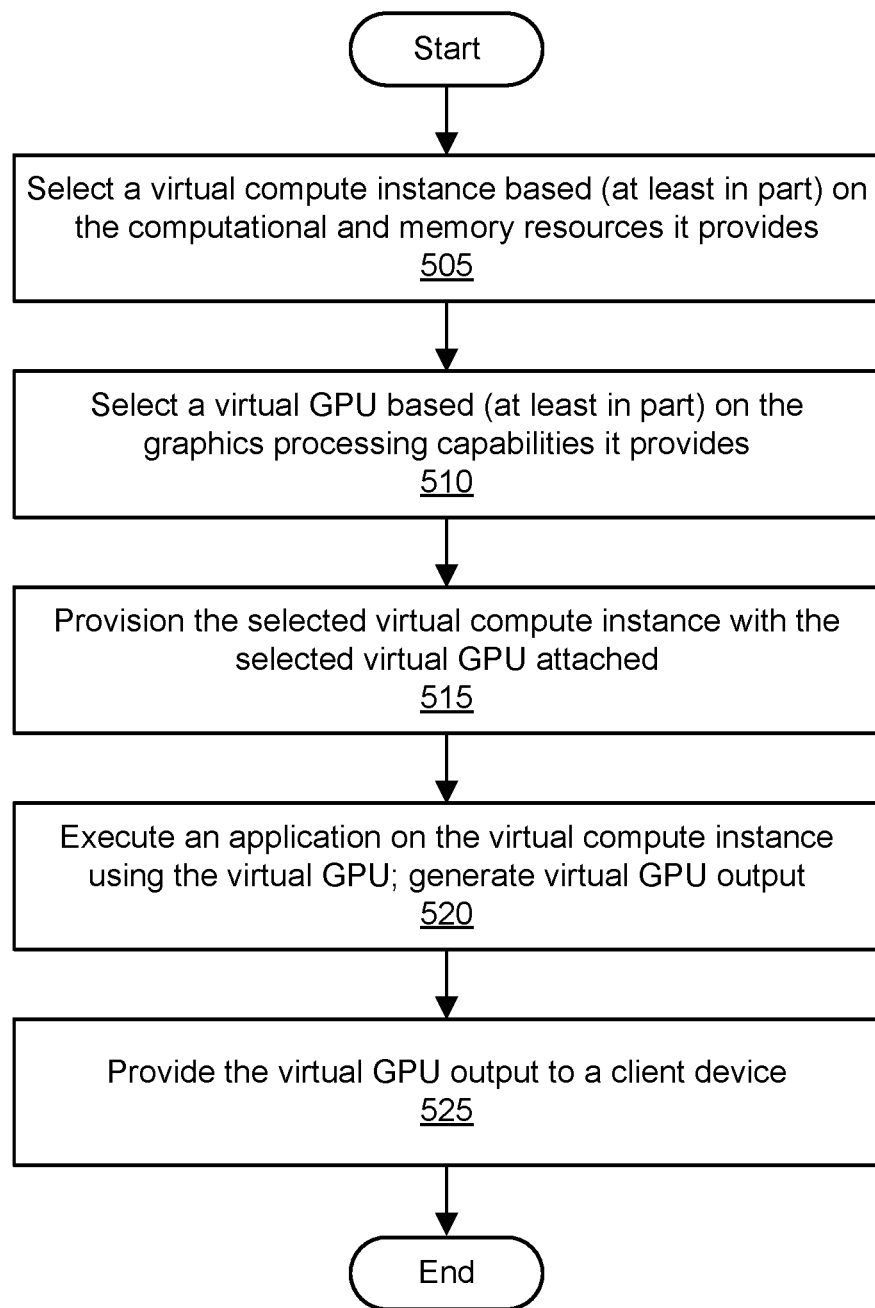
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Application-Specific Virtualized Graphics Processing

In some embodiments, virtualized graphics processing may be provided on an application-specific basis. Using the techniques discussed above for virtualized graphics processing in a provider network, a virtual compute instance may be provisioned. The virtual compute instance may be configured to execute a particular application. As will be discussed in greater detail below, a virtual GPU may be attached to the virtual compute instance specifically for use by the particular application. The application-specific virtual GPU may be dedicated to the particular application, and other applications running on the virtual compute instance may have no access to this particular virtual GPU. In one embodiment, a plurality of applications on the virtual compute instance may have their own dedicated virtual GPUs. The capabilities of the virtual GPUs may vary based on characteristics of the associated applications. In one embodiment, one or more other applications on the virtual compute instance may not have access to any virtual GPUs, e.g., if the graphics requirements for the other applications are not sufficient to justify the cost of a virtual GPU. As used herein, the term "application" generally includes a set of program instructions, a software package, or a set of interconnected software resources designed to perform a set of coordinated functions when executed on a compute instance, often on top of an operating system resident on the compute instance.

Figure 6A:
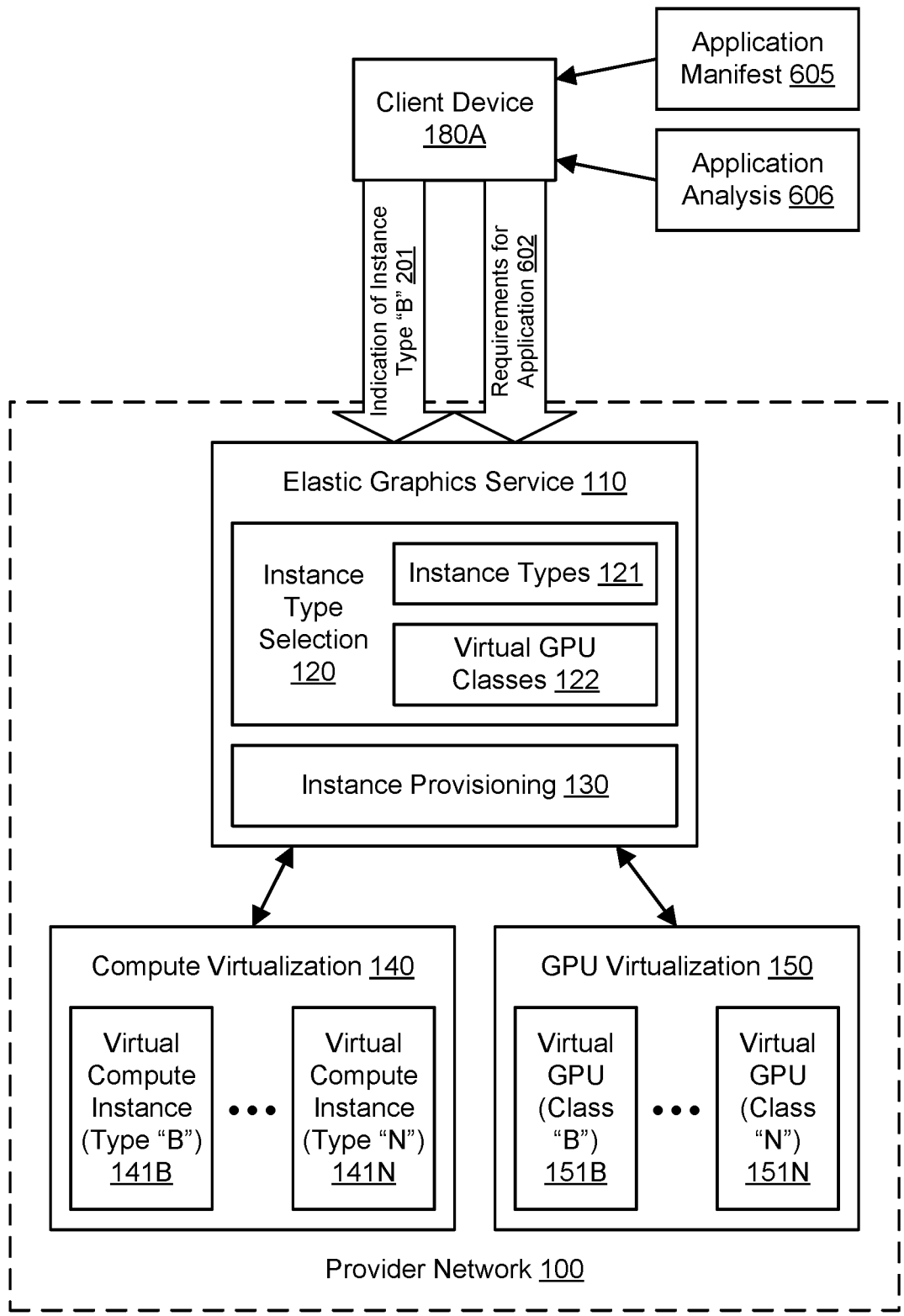
FIG. 6A illustrates an example system environment for application-specific virtualized graphics processing, including selection of a virtual GPU based (at least in part) on requirements for an application, according to one embodiment.

FIG. 6A illustrates an example system environment for application-specific virtualized graphics processing, including selection of a virtual GPU based (at least in part) on requirements for an application, according to one embodiment. An application on a virtual compute instance may be associated with a set of requirements 602. The requirements 602 may include requirements for graphics processing and/or computational requirements and may also be referred to herein as graphics requirements. For example, the graphics requirements 602 may specify a recommended graphics processing unit (GPU) class, a recommended size for video memory, or other GPU features and/or configurations that are recommended to run the application. In one embodiment, the graphics requirements 602 may be determined using an application manifest 605 that specifies required or recommended characteristics of a platform (e.g., computational and memory requirements) or environment for executing the application, including characteristics of a physical compute instance or virtual compute instance. The application manifest 605 may be determined and provided by a developer of the corresponding application who seeks a degree of control over the type of platform or environment on which the application is executed. The application may be implemented using an application virtualization container, and the manifest may be provided with the container for the application.

In one embodiment, programmatic analysis 606 of the application may determine the graphics requirements 602 for the application. The application analysis 606 may include runtime analysis of a graphics workload demanded by the application and/or analysis of an execution history (including graphics workload) of the application, e.g., using similar virtual hardware as the current instance. The graphics workload for the application, either current or historical, may be based on any suitable metrics relating to use of a virtual GPU or underlying physical GPU, such as the number of primitives sent to the GPU, the number of operations requested of the GPU, the video memory used by the GPU, and/or the rate of output from the GPU over a period of time.

In one embodiment, the graphics requirements 602 may be provided to the elastic graphics service 110 by a client 180A. In one embodiment, the elastic graphics service 110 may determine the graphics requirements 602 directly from the application manifest 605 and/or application analysis 606. As shown in FIG. 6A, if the client 180A also seeks to provision a virtual compute instance, the client may provide an indication of the requested instance type 201 for the virtual compute instance along with the graphics requirements 602 for the application-specific virtual GPU. However, the client may also provide the graphics requirements 602 for the application-specific virtual GPU for a virtual compute instance that has already been provisioned and potentially used to execute one or more applications.

As discussed above, the elastic graphics service 110 may offer, to clients, selection and provisioning of virtualized compute instances with attached virtualized GPUs, including application-specific virtual GPUs. The elastic graphics service 110 may include an instance type selection functionality 120 and an instance provisioning functionality 130. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. The client device 180A may provide application-specific graphics requirements 602 that the instance type selection functionality 120 may use to select a particular virtual GPU class. For example, the graphics requirements 602 may specify or map directly to the virtual GPU class "B" from a predefined set of virtual GPU classes. As another example, the graphics requirements 602 may specify the desired resources of a virtual GPU class, and the instance type selection functionality 120 may select the virtual GPU class "B" based on such requirements. If the graphics requirements specify a minimum set of resources for a virtual GPU to be used with an application, then a virtual GPU may be selected that meets or exceeds those minimum set of resources. Accordingly, the virtual GPU class may be selected by the client or on behalf of the client for use with a particular application having particular requirements.

In some circumstances, the class of virtual GPU dictated by the graphics requirements for the application may not be available. The virtual GPU class may not be available for technical reasons (e.g., during a busy period) or for business reasons (e.g., the selected GPU class is more expensive than permitted by an agreement between the user and the provider network). In such circumstances, the elastic graphics service may either return an indication of failure or attempt to reconcile the difference between the requested virtual GPU class and the available virtual GPUs. If a virtual GPU of a lesser class is available, the elastic graphics service may prompt the user for approval. In one embodiment, the elastic graphics service may seek user approval to wait until the requested virtual GPU class is available at an acceptable cost.

Figure 6B:
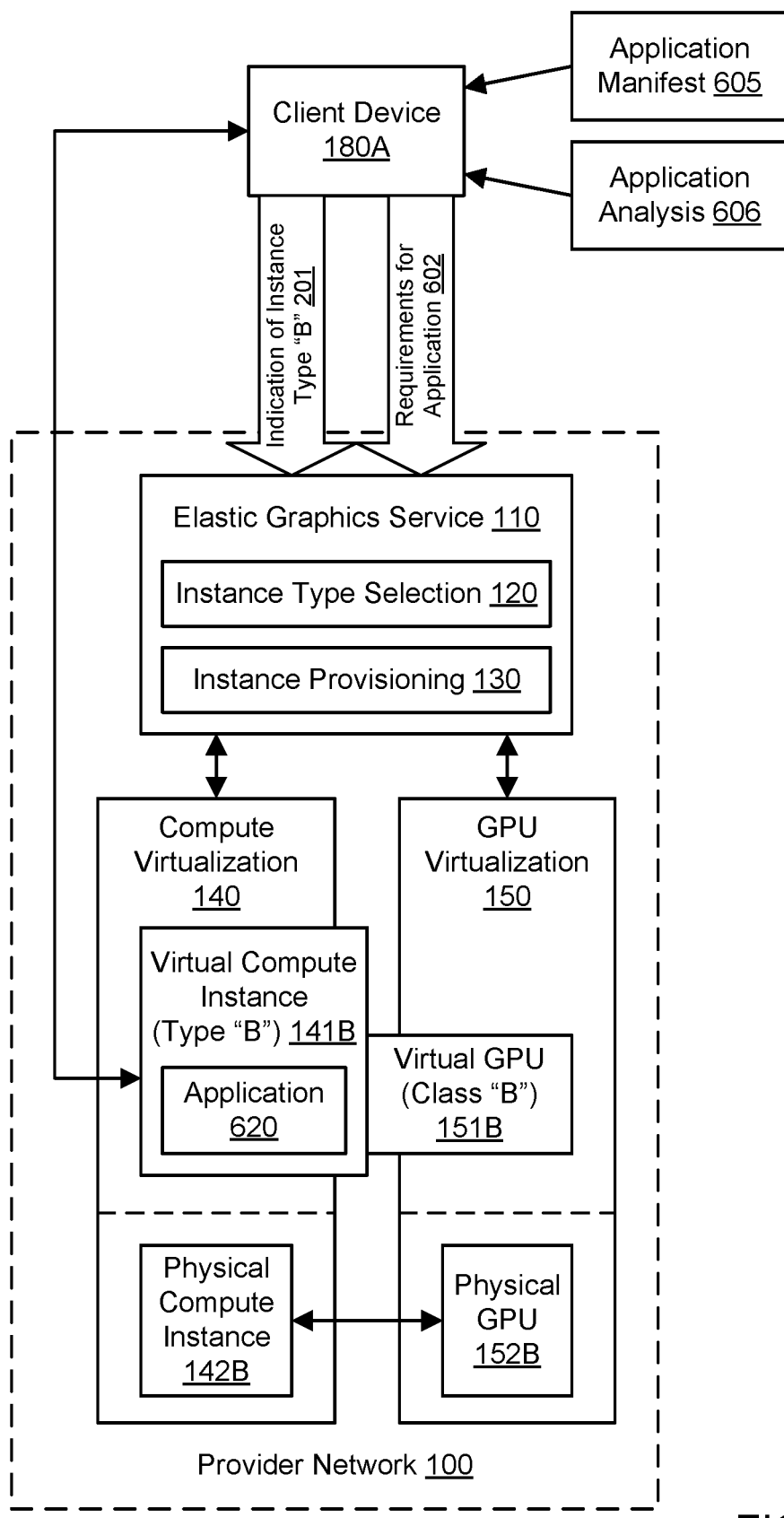
FIG. 6B illustrates further aspects of the example system environment for application-specific virtualized graphics processing, including provisioning of a virtual compute instance with an application-specific virtual GPU attached, according to one embodiment.

FIG. 6B illustrates further aspects of the example system environment for application-specific virtualized graphics processing, including provisioning of a virtual compute instance with an application-specific virtual GPU attached, according to one embodiment. The instance provisioning functionality 130 may provision a virtual compute instance 141B with an attached virtual GPU 151B based on the specified instance type "B" and the virtual GPU class "B" selected based (at least in part) on the application-specific requirements 602. The provisioned virtual compute instance 141B may be implemented by the compute virtualization functionality 140 using suitable physical resources such as a physical compute instance 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a physical compute instance 142B may communicate with a physical GPU 152B, e.g., over a network. The physical GPU 152B may be located in a different computing device than the physical compute instance 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

The virtual compute instance 141B may be configured to execute an application 620. Execution of the application 620 may include using the virtual GPU 151B to generate output based on data supplied to the virtual GPU by the application. The virtual GPU 151B may be attached to the virtual compute instance 141B specifically for use by the particular application 620. The application-specific virtual GPU 151B may be dedicated to the particular application 620, and other applications running on the virtual compute instance 141B may have no access to this particular virtual GPU 151B.

Figure 7A:
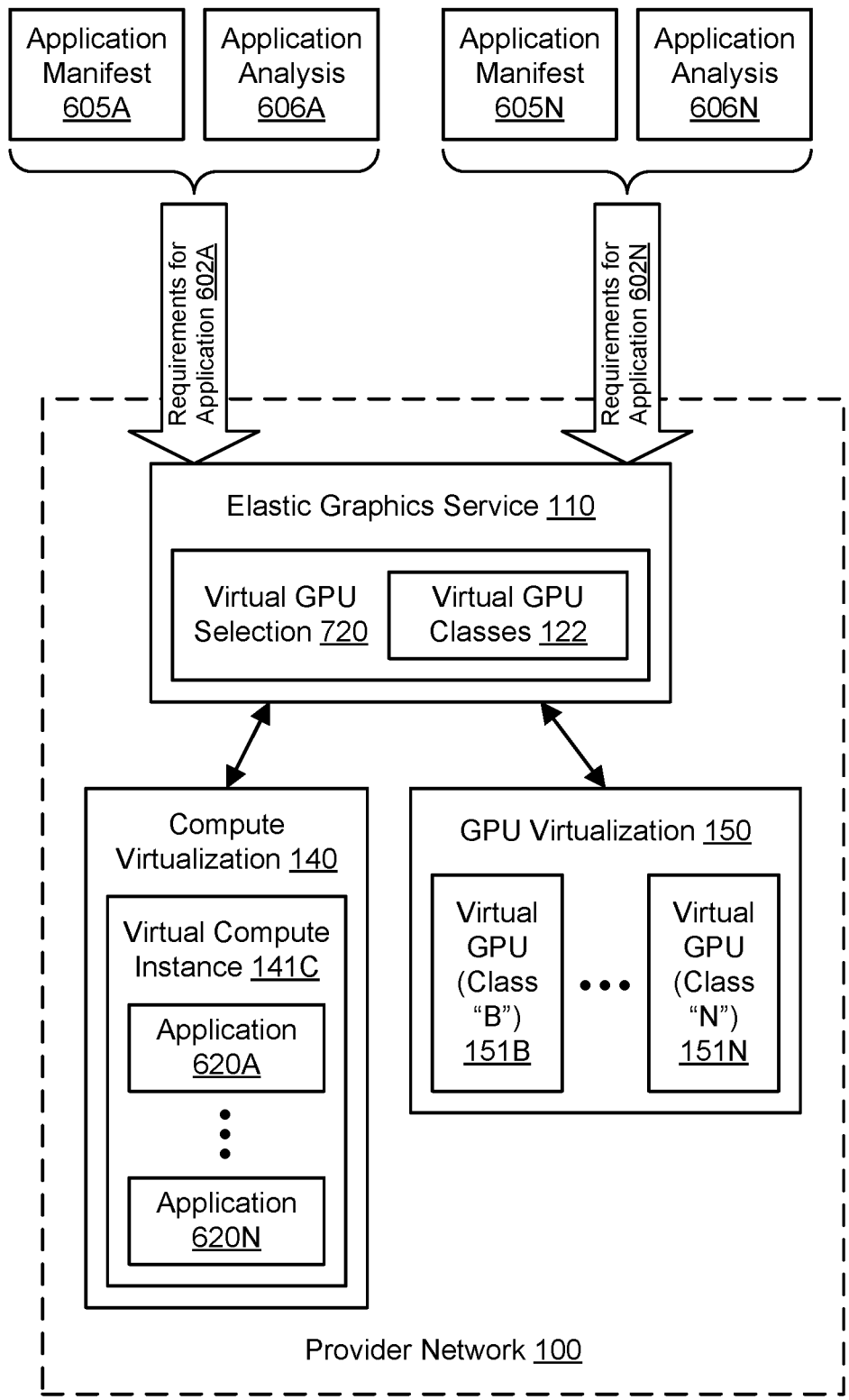
FIG. 7A illustrates further aspects of the example system environment for application-specific virtualized graphics processing, including selection of a plurality of virtual GPUs based (at least in part) on requirements for a plurality of applications, according to one embodiment.

FIG. 7A illustrates further aspects of the example system environment for application-specific virtualized graphics processing, including selection of a plurality of virtual GPUs based (at least in part) on requirements for a plurality of applications, according to one embodiment. In one embodiment, a plurality of applications on the virtual compute instance may have their own dedicated virtual GPUs. The capabilities of the virtual GPUs may vary based on characteristics of the associated applications. As shown in the example of FIG. 7A, a virtual compute instance 141C may be provisioned by the compute virtualization facility 140 using resources of a multi-tenant provider network 100. In various embodiments, the virtual compute instance 141C may be provisioned and used (e.g., to execute one or more applications) before any virtual GPUs are attached or at the same time as the virtual GPUs are attached. The virtual compute instance 141C may be configured to execute a plurality of applications, such as application 620A through application 620N. The applications 620A-620N may be installed on the virtual compute instance 141C from any source. The applications 620A-620N may vary in their computational requirements and graphics requirements. The virtual compute instance 141C may be configured to execute any two or more of the applications 620A-620N in a substantially simultaneous manner, e.g., using multiple processors or processor cores of the underlying physical compute instance and/or software-based multitasking techniques.

Each of the applications 620A-620N may be associated with a set of graphics requirements. As shown in FIG. 7A, the application 620A may be associated with requirements 602A, and the application 620N may be associated with requirements 602N. For example, the graphics requirements 602A-602N may specify a recommended graphics processing unit (GPU) class, a recommended size for video memory, or other GPU features and/or configurations that are recommended to run the corresponding application. In one embodiment, any of the graphics requirements 602A-602N may be determined using a corresponding application manifest 605A-605N that specifies required or recommended characteristics of a platform or environment for executing the corresponding application, including characteristics of a physical compute instance or virtual compute instance. The application manifest 605A-605N may be determined and provided by a developer of the corresponding application who seeks a degree of control over the type of platform or environment on which the application is executed. In one embodiment, programmatic analysis 606A-606N of the corresponding application 620A-620N may determine the graphics requirements 605 for the application. The application analysis 606A-606N may include runtime analysis of a graphics workload demanded by the application and/or analysis of an execution history (including graphics workload) of the application, e.g., using similar virtual hardware as the current instance. The graphics workload for the application, either current or historical, may be based on any suitable metrics relating to use of a virtual GPU or underlying physical GPU, such as the number of primitives sent to the GPU, the number of operations requested of the GPU, the video memory used by the GPU, and/or the rate of output from the GPU over a period of time.

In one embodiment, the graphics requirements 602A-602N may be provided to the elastic graphics service 110 by a client for whom the instance 141C was provisioned. In one embodiment, the elastic graphics service 110 may determine the graphics requirements 602A-602N directly from the application manifest 605A-605N and/or application analysis 606A-606N. As discussed above, the provider network 100 may offer to clients a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on.

The application-specific graphics requirements 602A-602N may be used by a virtual GPU selection functionality 720 to select, for any of the applications 620A-620N, a particular virtual GPU class from among the virtual GPU classes 122. For example, the graphics requirements 602A may specify or map directly to a virtual GPU class "C" from a predefined set of virtual GPU classes 122, and the graphics requirements 602N may specify or map directly to a virtual GPU class "N" from the set of virtual GPU classes. As another example, the graphics requirements 602A may specify the desired resources of a virtual GPU class, and the virtual GPU selection functionality 720 may select the virtual GPU class "C" based on such requirements. Similarly, the graphics requirements 602N may specify the desired resources of a virtual GPU class, and the virtual GPU selection functionality 720 may select the virtual GPU class "N" based on such requirements. If the graphics requirements specify a minimum set of resources for a virtual GPU to be used with an application, then a virtual GPU may be selected that meets or exceeds those minimum set of resources. Accordingly, the virtual GPU classes may be selected by the client or on behalf of the client for use with particular applications having particular graphics requirements. In one embodiment, the elastic graphics service 110 may decline to select and attach a virtual GPU for a particular application based on its requirements, e.g., if the requirements are not sufficient to justify the cost of a virtual GPU and/or the additional latency introduced by GPU virtualization.

Figure 7B:
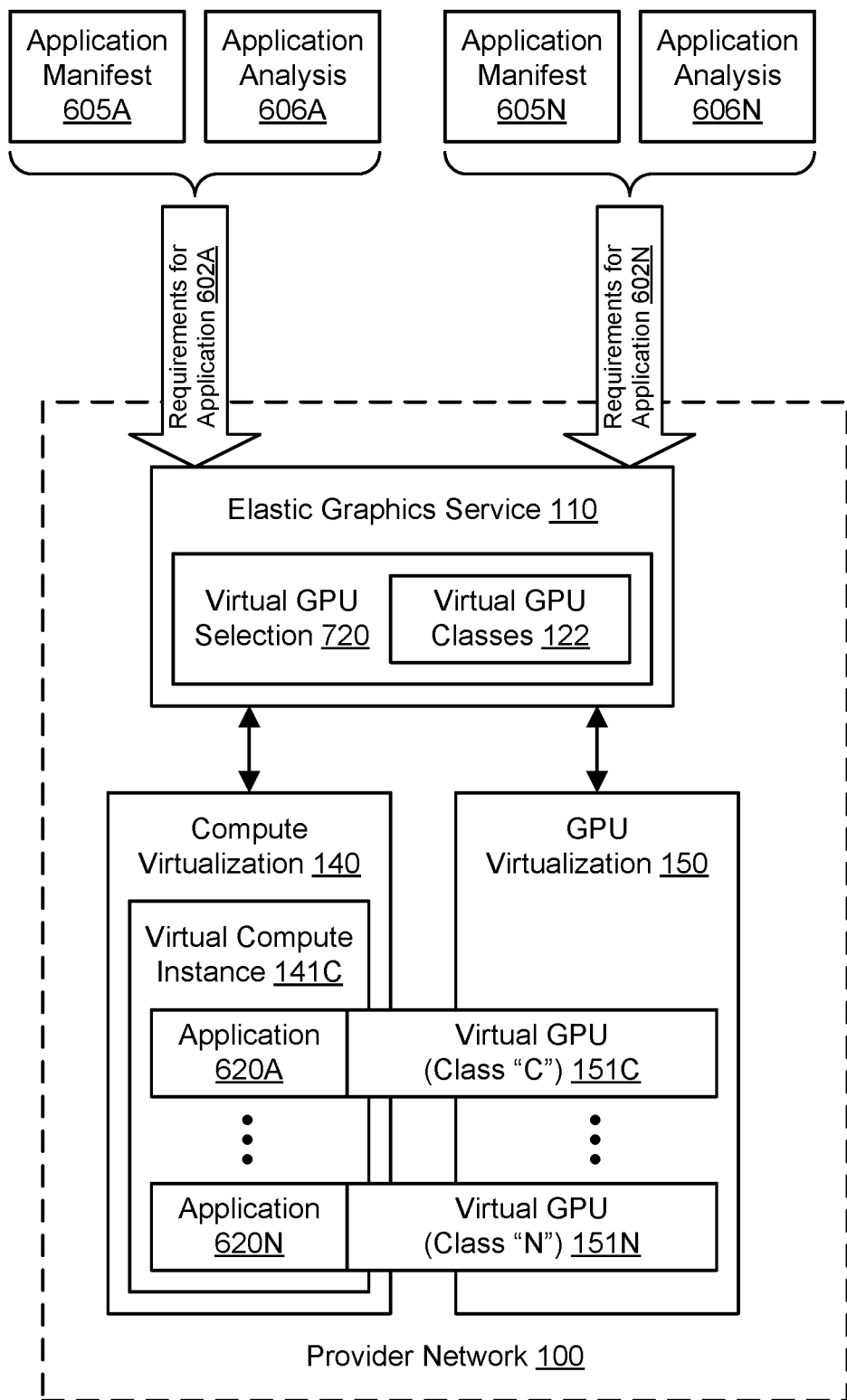
FIG. 7B illustrates further aspects of the example system environment for application-specific virtualized graphics processing, including provisioning of a virtual compute instance with a plurality of application-specific virtual GPUs attached, according to one embodiment.

FIG. 7B illustrates further aspects of the example system environment for application-specific virtualized graphics processing, including provisioning of a virtual compute instance with a plurality of application-specific virtual GPUs attached, according to one embodiment. The elastic graphic service 110 may attach application-specific virtual GPUs to the instance 141C in accordance with the virtual GPU classes selected for the corresponding applications 620A-620N. As shown in FIG. 7B, a virtual GPU 151C based on the selected virtual GPU class "C" may be attached to the instance 141C for exclusive use by application 620A. Similarly, a virtual GPU 151N based on the selected virtual GPU class "N" may be attached to the instance 141C for exclusive use by application 620N. The provisioned virtual GPUs 151C-151N may be implemented by the GPU virtualization functionality 150 using suitable physical resources such as one or more physical GPUs 152A-152N. To implement the virtual compute instance 141C with the attached virtual GPUs 151C-151N, a physical compute instance may communicate with one or more physical GPUs, e.g., over a network. The physical GPUs may be located in a different computing device than the physical compute instance. Even though they may be implemented using separate hardware, the virtual GPUs 151C-151N may be said to be attached to the virtual compute instance 141C, or the virtual compute instance may be said to include the virtual GPUs. The virtual GPUs may be installed on one or more devices that may reside in various locations relative to the physical GPU, e.g., on the same rack, the same switch, the same room, and/or other suitable locations on the same network. The vendor(s) of the physical GPUs may be hidden from the client device that uses the virtual compute instance 141C.

The virtual compute instance 141C may be configured to execute the applications 620A-620N. Execution of the application 620A may include using the virtual GPU 151C to generate output based on data supplied to the virtual GPU by the application. The virtual GPU 151C may be attached to the virtual compute instance 141C specifically for use by the particular application 620A. The application-specific virtual GPU 151C may be dedicated to the particular application 620A, and other applications running on the virtual compute instance 141C may have no access to this particular virtual GPU 151C. Similarly, execution of the application 620N may include using the virtual GPU 151N to generate output based on data supplied to the virtual GPU by the application. The virtual GPU 151N may be attached to the virtual compute instance 141C specifically for use by the particular application 620N. The application-specific virtual GPU 151N may be dedicated to the particular application 620N, and other applications running on the virtual compute instance 141C may have no access to this particular virtual GPU 151N. In one embodiment, one or more other applications on the virtual compute instance 141C may not have access to any virtual GPUs, e.g., if the graphics requirements for the other applications are not sufficient to justify the cost of a virtual GPU.

In one embodiment, the applications 620A-620N may interact with one or more graphics drivers 321, as previously discussed with respect to FIG. 3. The graphics driver(s) 321 may interact with the virtual GPUs 151C-151N to provide graphics processing for the respective applications 620A-620N. The graphics processing may include accelerated two-dimensional graphics processing and/or accelerated three-dimensional graphics processing. In one embodiment, the graphics driver(s) 321 may implement a graphics application programming interface (API) such as Direct3D or OpenGL. The graphics driver(s) 321 may represent components running in user mode and/or kernel mode. As also as previously discussed with respect to FIG. 3, a client device may communicate with the virtual compute instance 141C through a proxy 310. Various other communications may be sent through the proxy 310, including for example virtual GPU output from the virtual GPUs 151C-151N to the client device. Use of the proxy 310 may hide the address of the virtual compute instance 141C and any associated resources (including one or more computing devices that implement the virtual GPUs 151C-151N) from the client device.

In various embodiments, any suitable technique(s) may be used to offload graphics processing from the virtual compute instance 141C to one or more physical GPUs used to implement the application-specific virtual GPUs 151C-151N. In one embodiment, an API shim may intercept calls to a graphics API and marshal the calls over a network to one or more external computing devices that include physical GPUs. The API shim may be application-specific, such that an instance of a dynamic link library (DLL) for graphics processing may be opened in the context of the process for each application that has a dedicated virtual GPU. The DLL may connect to a particular one of the virtual GPUs 151C-151N and provide exclusive access to that virtual GPU on behalf of the corresponding application. The applications may be implemented using application virtualization containers, and the API shim layer may be built into the container for an application.

As discussed previously with respect to FIG. 4, the virtual compute instance 141C may be implemented using a physical compute instance, and the virtual GPUs 151C-151N attached to that instance 141C may be implemented using one or more graphics servers 420. The virtual compute instance 141C may use a virtual interface 400 to interact with an interface device 410. The virtual interface 400 may enable the virtual compute instance 141C to send and receive network data. The interface device 410 may include a network interface and a custom hardware interface. Via the custom hardware interface, the interface device 410 may run program code to emulate a GPU interface and appear to the virtual compute instance 141C to implement or include the application-specific virtual GPUs 151C-151N. In one embodiment, the interface device 410 may present a graphics API to the virtual compute instance 141C and receive API calls for graphics processing (e.g., accelerated 3D graphics processing). Via the network interface, the interface device 410 may communicate with the graphics server 420 (and thus with the physical GPU 152B) over a network. The interface device 410 may be implemented in any suitable manner, e.g., as an expansion card (such as a PCI Express card) or attached peripheral device for the physical compute instance 142B. The interface device 410 may use single root I/O virtualization to expose hardware virtual functions to the virtual compute instance 141C.

Figure 7C:
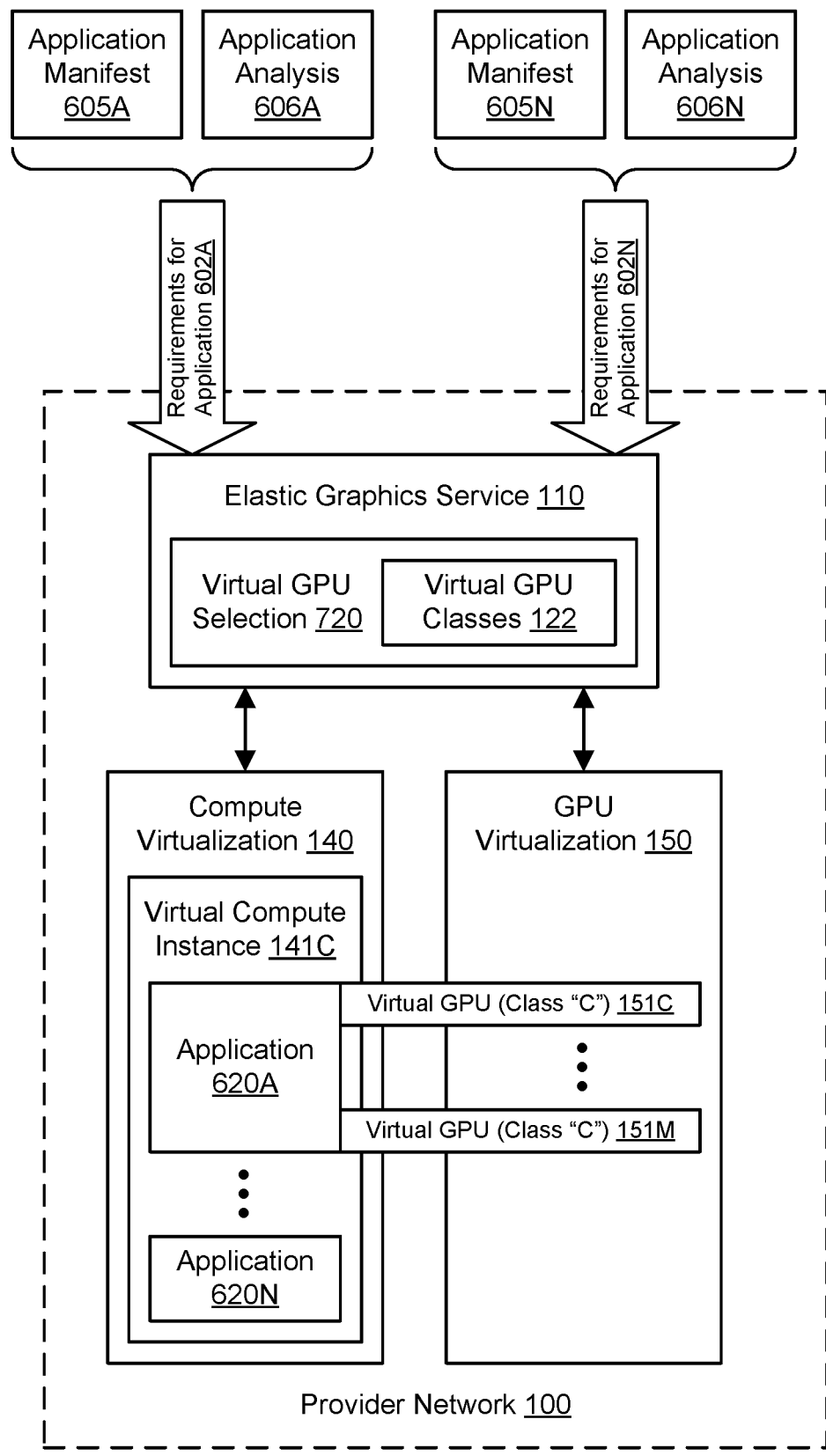
FIG. 7C illustrates further aspects of the example system environment for application-specific virtualized graphics processing, including provisioning of a virtual compute instance with a plurality of application-specific virtual GPUs dedicated to a single application, according to one embodiment.

FIG. 7C illustrates further aspects of the example system environment for application-specific virtualized graphics processing, including provisioning of a virtual compute instance with a plurality of application-specific virtual GPUs dedicated to a single application, according to one embodiment. In one embodiment, the elastic graphics service 110 may decline select and attach multiple virtual GPUs for a particular application based on its requirements. As shown in the example of FIG. 7C, two or more virtual GPUs 151C-151M may be selected based on the requirements 602A for application 620A, and all the virtual GPUs may be attached to the instance 141C for exclusive use by the application 620A. The two or more virtual GPUs 151C-151M selected for the application 620A may collectively meet or exceed the requirements 602A. In one embodiment, the two or more virtual GPUs 151C-151M may be of the same class, e.g., class "C," to facilitate concurrent use by the application 620A. Two or more GPUs may be dedicated to a specific application for any suitable reason(s). For example, two or more virtual GPUs may be dedicated to a particular application if no single virtual GPU can meet the requirements of the application. As another example, two or more virtual GPUs may be dedicated to a particular application if no single virtual GPU that meets the requirements of the application is currently available in the multi-tenant provider network. As yet another example, two or more virtual GPUs may be dedicated to a particular application if no single virtual GPU that meets the requirements of the application is currently available within a budget specified by a client.

Any suitable techniques may be used to permit a single application to use multiple virtual GPUs. In one embodiment, input data from the application 620A may be broadcast to all of the application-specific virtual GPUs 151C-151M, and the virtual GPUs may operate in a concurrent manner on different portions of the input data. The broadcasting may be performed using an API shim. The workload may then be divided among the virtual GPUs 151C-151M, e.g., based on the relative capabilities of the virtual GPUs. For example, each of the virtual GPUs 151C-151M may be dedicated to a particular region of the display, and the output from the virtual GPUs may be combined to generate each frame. As another example, each of the virtual GPUs 151C-151M may be dedicated to a particular frame in a sequence (e.g., every other frame for two virtual GPUs), and the output from the virtual GPUs may be combined to generate a sequence of frames.

In one embodiment, the elastic graphics service 110 may decline to select and attach a virtual GPU for a particular application. As shown in the example of FIG. 7C, an application-specific virtual GPU may not be selected or attached for the application 620N based (at least in part) on the requirements 602N. A virtual GPU may not be dedicated to a specific application for any suitable reason(s). For example, a virtual GPU may not be dedicated to a particular application if the requirements for the application do not justify the cost (to the client) of a virtual GPU and/or the additional network latency introduced by GPU virtualization. As another example, a virtual GPU may not be dedicated to a particular application if no virtual GPU that meets the requirements of the application is currently available in the multi-tenant provider network. As yet another example, a virtual GPU may not be dedicated to a particular application if no virtual GPU is currently available within a budget specified by a client. In one embodiment, the application 620N may still have access to graphics processing provided by a local GPU (as discussed below with respect to FIG. 9A through FIG. 11) and/or a virtual GPU that is attached to the instance 141C but is not application-specific.

Figure 8:
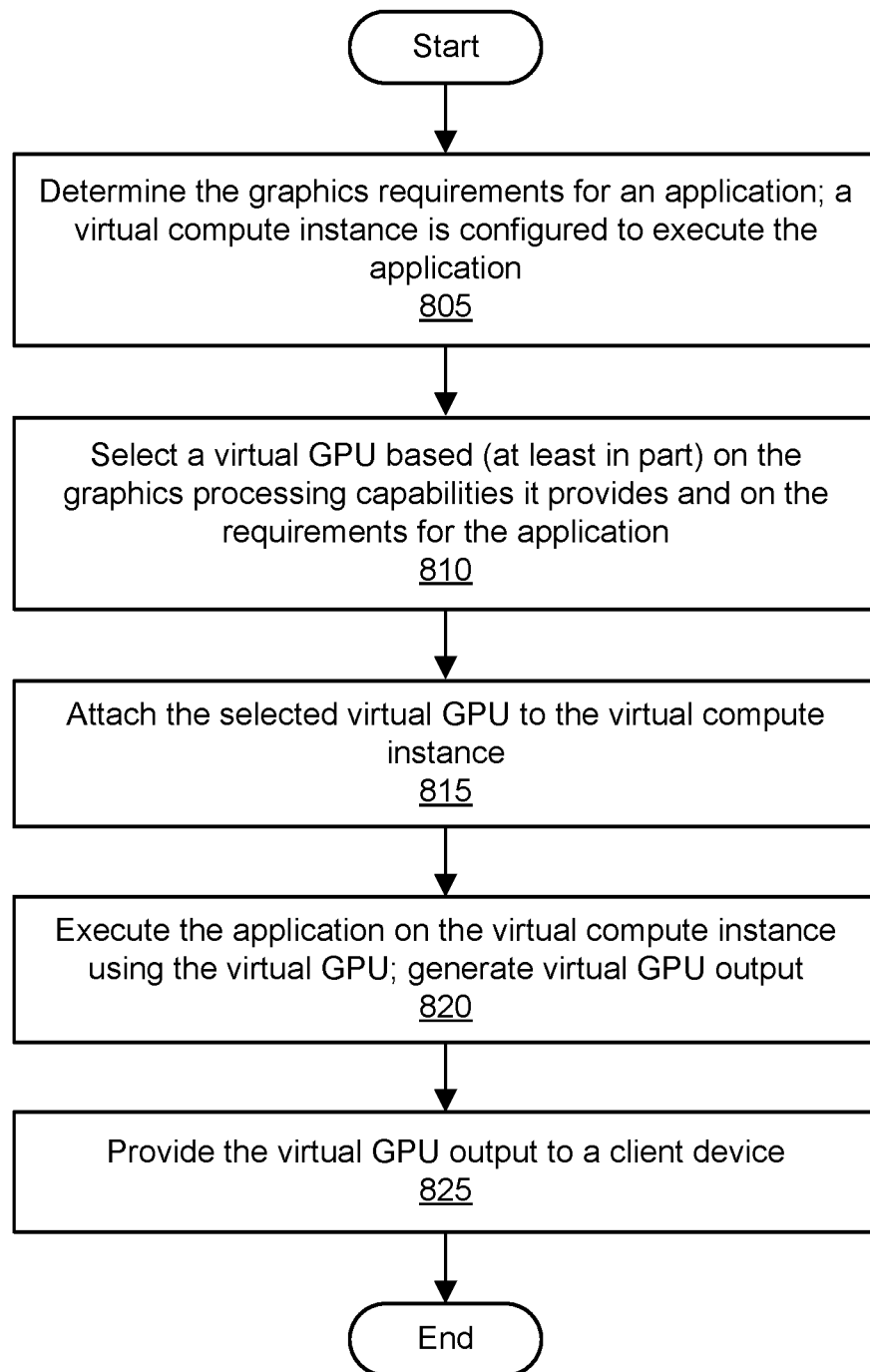
FIG. 8 is a flowchart illustrating a method for providing application-specific virtualized graphics processing, according to one embodiment.

FIG. 8 is a flowchart illustrating a method for providing application-specific virtualized graphics processing, according to one embodiment. As shown in 805, the graphics requirements for an application may be determined. A virtual compute instance may be configured to execute the application. In one embodiment, an elastic graphics service may receive the graphics requirements for the application, e.g., from a client, or may otherwise determine the requirements without client input. The graphics requirements may specify a recommended graphics processing unit (GPU) class, a recommended size for video memory, or other GPU features and/or configurations that are recommended to run the application. In one embodiment, the graphics requirements may be determined using an application manifest that specifies required or recommended characteristics of a platform or environment for executing the application, including characteristics of a physical compute instance or virtual compute instance. The application manifest may be determined and provided by a developer of the corresponding application who seeks a degree of control over the type of platform or environment on which the application is executed. In one embodiment, programmatic analysis of the application may determine the graphics requirements for the application. The analysis may include runtime analysis of a graphics workload demanded by the application and/or analysis of an execution history (including graphics workload) of the application, e.g., using similar virtual hardware as the current instance. The graphics workload for the application, either current or historical, may be based on any suitable metrics relating to use of a virtual GPU or underlying physical GPU, such as the number of primitives sent to the GPU, the number of operations requested of the GPU, the video memory used by the GPU, and/or the rate of output from the GPU over a period of time. The operation shown in 805 may be performed multiple times for multiple applications, such that the different graphics requirements for multiple applications may be determined for a particular instance.

As shown in 810, a virtual GPU may be selected. The virtual GPU may be selected based (at least in part) on the graphics processing capabilities it provides and on the graphics requirements for the application. For example, if the graphics requirements specify a minimum set of resources for a virtual GPU to be used with an application, then a virtual GPU may be selected that meets or exceeds those minimum set of resources. The virtual GPU may be selected from a set of virtual GPU classes characterized by their differing computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. The application-specific graphics requirements may be used to select a particular virtual GPU class. For example, the graphics requirements may specify or map directly to a particular virtual GPU class. As another example, the graphics requirements may specify the desired resources of a virtual GPU class, and a particular virtual GPU class may be selected based on such requirements. The virtual GPU may also be selected based (at least in part) on availability of resources in a resource pool of a provider network that manages such resources. The operation shown in 810 may be performed multiple times for multiple applications, such that multiple application-specific virtual GPUs may be selected based (at least in part) on the different graphics requirements for multiple applications.

As shown in 815, the selected virtual GPU may be attached to the virtual compute instance. In one embodiment, the elastic graphics service may interact with one or more other services or functionalities of a provider network, such as a compute virtualization functionality and/or GPU virtualization functionality, to attach the virtual GPU to the instance. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network. The operation shown in 815 may be performed multiple times for multiple applications, such that multiple application-specific virtual GPUs may be attached to the same instance for multiple applications. The operations shown in 810 and 815 may be performed in response to user input or in response to an automatic determination, e.g., by an elastic graphics service.

As shown in 820, the application may be executed on the virtual compute instance using the application-specific virtual GPU. Execution of the application may include execution of instructions on the virtual compute instance (e.g., on the underlying physical compute instance) and/or virtual GPU (e.g., on the underlying physical GPU). Execution of the application using the application-specific virtual GPU may generate virtual GPU output, e.g., output produced by executing instructions or otherwise performing tasks on the virtual GPU. Additional applications on the virtual compute instance may use different application-specific virtual GPUs, and the application-specific virtual GPUs may vary in graphics processing capabilities based on the varying requirements of the applications. The operation shown in 820 may be performed multiple times for multiple applications, such that multiple application-specific virtual GPUs may be used on the same instance by multiple applications.

As shown in 825, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Local-to-Remote Migration for Virtualized Graphics Processing

In some embodiments, the graphics processing for one GPU associated with a virtual compute instance maybe migrated to a virtual GPU. In one embodiment, the graphics processing provided by a local GPU may be migrated to a virtual GPU. In one embodiment, the graphics processing provided by a first virtual GPU may be migrated to a second virtual GPU. The local GPU may be implemented using attached hardware (e.g., in a physical compute instance used to implement the virtual compute instance) or using emulation. Because the local GPU may provide only a low level of graphics processing capability, a virtual GPU may be attached to the virtual compute instance to provide improved graphics processing relative to the local GPU. In one embodiment, the migration of graphics processing may be performed based (at least in part) on detection of an increase in graphics workload. Live migration may be performed while applications are being executed using the original GPU in a manner that does not require changing or relaunching the applications. Migration of the virtual compute instance to a different virtual compute instance may also be performed, e.g., to reduce network latency associated with virtualized graphics processing. Graphics processing for a virtual compute instance may also be migrated from one virtual GPU to another virtual GPU, e.g., from a less capable or smaller virtual GPU class to a more capable or larger virtual GPU class.

Figure 9A:
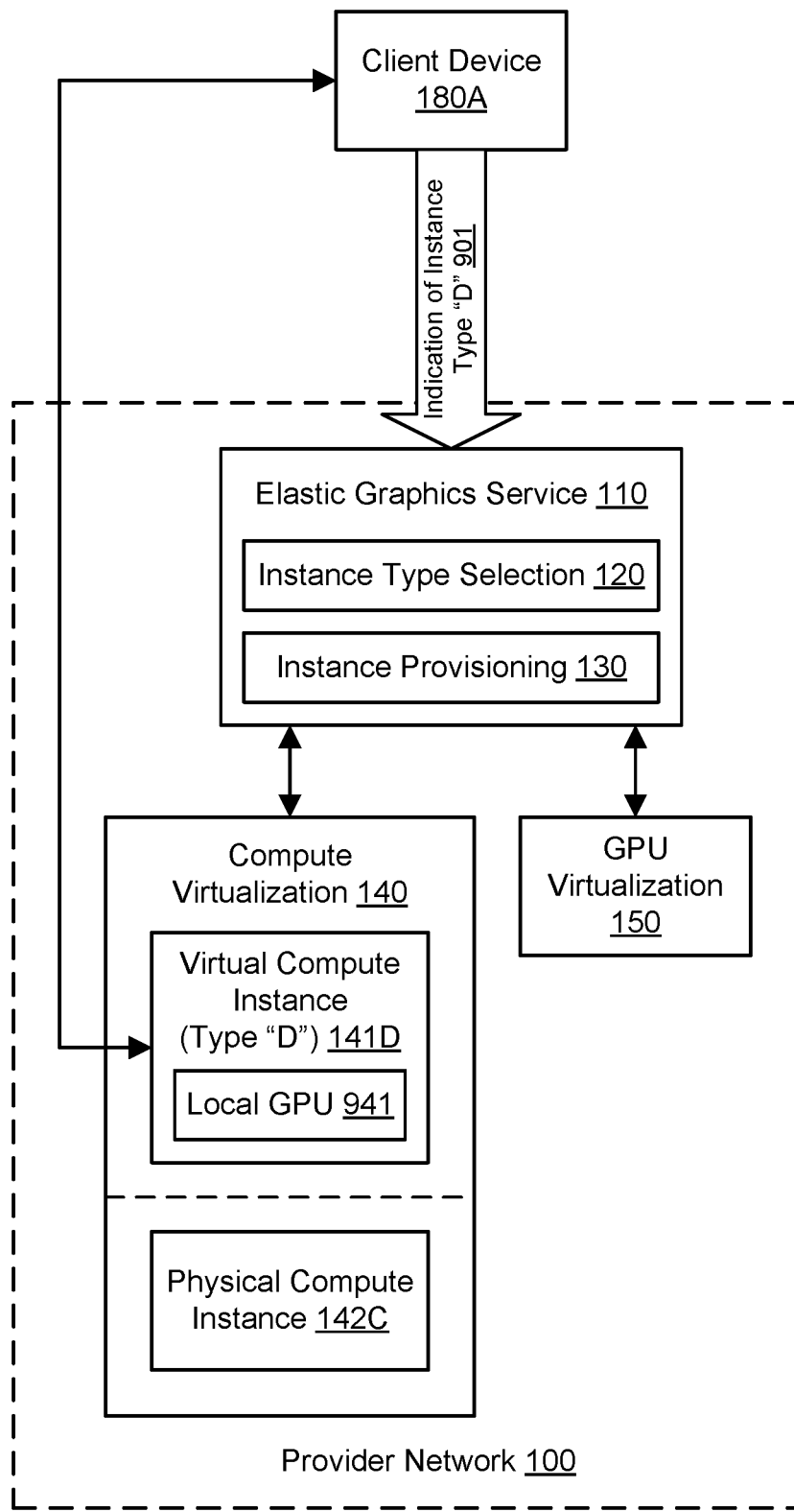
FIG. 9A illustrates an example system environment for local-to-remote migration for virtualized graphics processing, including provisioning of a virtual compute instance with a local GPU, according to one embodiment.

FIG. 9A illustrates an example system environment for local-to-remote migration for virtualized graphics processing, including provisioning of a virtual compute instance with a local GPU, according to one embodiment. As discussed above, the elastic graphics service 110 may offer, to clients, selection and provisioning of virtualized compute instances, potentially with attached virtualized GPUs. The elastic graphics service 110 may include an instance type selection functionality 120 and an instance provisioning functionality 130. As discussed above, the provider network 100 may offer to the client device 180A a plurality of instance types for virtual compute instances. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 901 of a particular instance type. For example, a client may choose or the instance type "B" from a predefined set of instance types using input 901. As another example, a client may specify the desired resources of an instance type using input 901, and the instance type selection functionality 120 may select the instance type "D" based on such a specification. Accordingly, the virtual compute instance type may be selected by the client or on behalf of the client, e.g., using the instance type selection functionality 120.

The instance provisioning functionality 130 may provision a virtual compute instance 141D with a local GPU 941 based on the instance type "D." The provisioned virtual compute instance 141D may be implemented by the compute virtualization functionality 140 using suitable physical resources such as a physical compute instance 142C. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

At the time of its provisioning, the instance 141D may not have an attached virtual GPU. The provisioned instance 141D may be of an instance type that includes the local GPU 941 in a default configuration. In one embodiment, the local GPU 941 may be implemented as a hardware component of the physical compute instance 142C used to implement the virtual compute instance. For example, the local GPU 941 may be implemented using the network-capable, customizable interface device 410 shown in FIG. 4. Alternatively, the local GPU 941 may be implemented using a dedicated physical GPU installed in or attached to the physical compute instance 142C. In one embodiment, the local GPU 941 may be implemented in software using emulation techniques. Typically, the local GPU 941 may provide a low level of graphics processing capabilities in comparison to the virtual GPUs available through the GPU virtualization functionality 150 of the provider network 100.

The virtual compute instance 141D may be used to execute one or more applications. At least one of the applications may use the local GPU 941, e.g., for graphics processing. At some point, a change in graphics workload for the local GPU 941 may be detected during the use of the virtual compute instance 141D. The change in graphics workload may be determined based on user input or automatically detected based on programmatic monitoring. For example, a user may indicate that the graphics workload is expected to change for a currently running application or due to an application that will be added to the instance; the user-supplied indication may include a general request for a more capable virtual GPU or an identification of a specific class of virtual GPU. An automatically detected change in the graphics workload may be based on any suitable metrics relating to use of a GPU, such as the number of primitives sent to the GPU, the number of operations requested of the GPU, the video memory used by the GPU, and/or the rate of output from the GPU over a period of time. The detected change may typically represent an increase in graphics workload, e.g., an increase beyond the graphics capabilities of the local GPU 941. For example, if the application is using the local GPU 941 to produce full-screen 2D or 3D graphics, the graphics workload may increase such that the frames per second (fps) decreases below a threshold of acceptable performance. As another example, the aggregate graphics workload generated by multiple applications may push the local GPU 941 beyond a threshold of acceptable performance as additional applications are executed simultaneously. Any suitable techniques may be used for monitoring of the graphics workload and detecting a change therein, and any suitable thresholds may be used to assess when the graphics workload has increased sufficiently to justify the attachment of a virtual GPU.

Figure 9B:
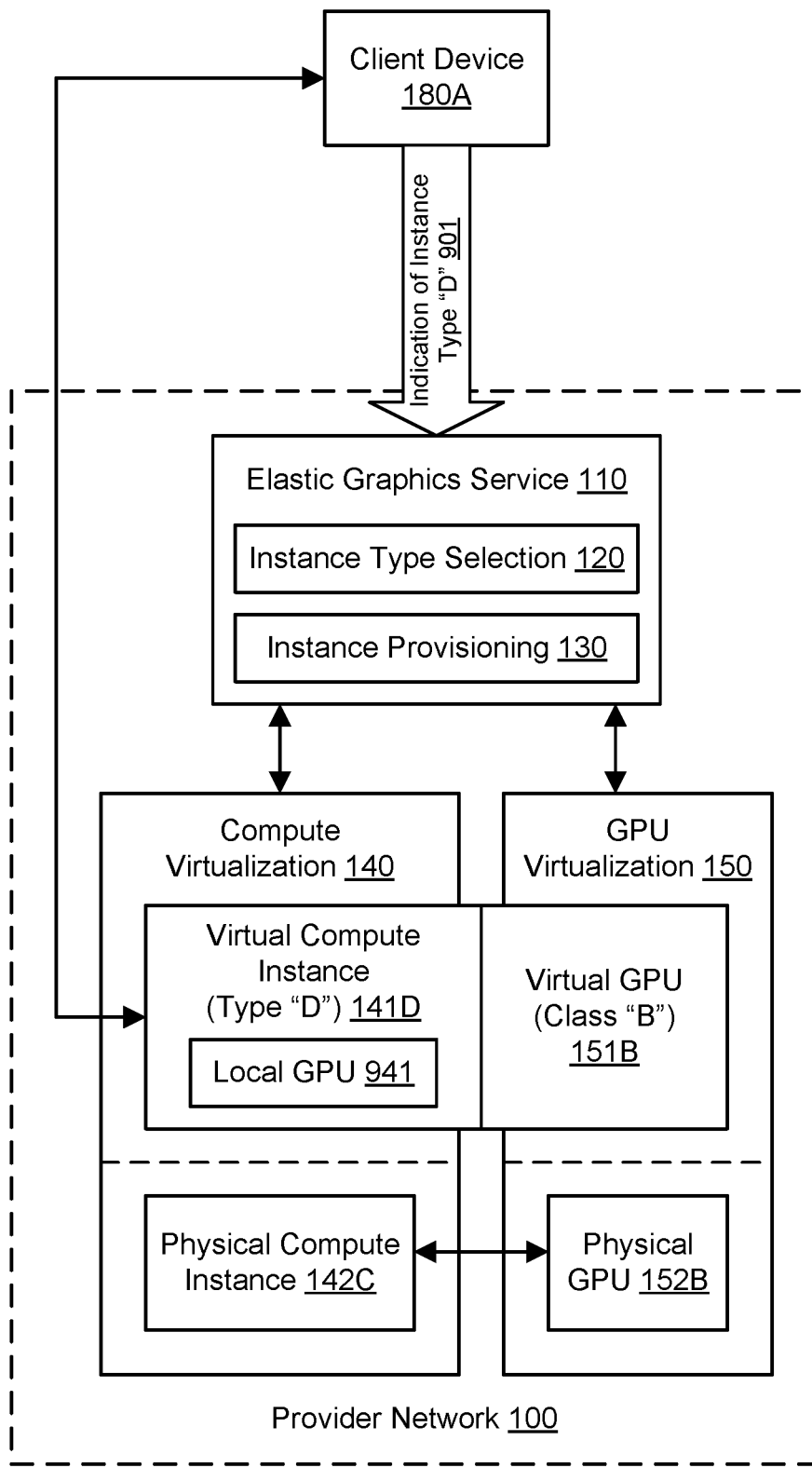
FIG. 9B illustrates further aspects of the example system environment for local-to-remote migration for virtualized graphics processing, including the selection and attachment of a virtual GPU to the virtual compute instance, according to one embodiment.

FIG. 9B illustrates further aspects of the example system environment for local-to-remote migration for virtualized graphics processing, including the selection and attachment of a virtual GPU to the virtual compute instance, according to one embodiment. As discussed above, the provider network 100 may offer a plurality of virtual GPU classes for virtual GPUs. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. A particular virtual GPU 151B may be selected for use with the virtual compute instance 141D, e.g., to replace or supplement the use of the local GPU 941. The virtual GPU 151B may be selected from a set of virtual GPU classes having different graphics processing capabilities. The virtual GPU 151B may be selected to match the current or anticipated graphics workload of the virtual compute instance. Accordingly, the selected virtual GPU 151B may be of a class, such as class "B," that is capable of handling the graphics workload with an acceptable level of performance. In one embodiment, the elastic graphics service may store benchmarks or other metrics for each class of virtual GPU to indicate the graphics processing capabilities relative to various levels of graphics workload. In one embodiment, the virtual GPU 151B may be selected not based on a detected change in the graphics workload but on a configuration change requested by or enabled by a user of the virtual compute instance. For example, if a new application is added to the virtual compute instance during its use, an application manifest for the new application may require greater GPU performance than the instance currently provides (e.g., with the local GPU).

The selected virtual GPU 151B may be attached to the virtual compute instance 141D. In one embodiment, the elastic graphics service 110 may interact with one or more other services or functionalities of a provider network 100, such as a compute virtualization functionality 140 and/or GPU virtualization functionality 150, to attach the virtual GPU 151B to the instance 141D. The virtual compute instance 141D may be implemented using central processing unit (CPU) resources and memory resources of a physical compute instance 142C. The virtual GPU 151B may be implemented using a physical GPU 152B. The physical GPU 152B may be attached to a different computing device than the computing device 142C that provides the CPU resources for the virtual compute instance 141D. The physical GPU 152B may be accessible to the physical compute instance 142C over a network. The virtual GPU 151B may be said to be attached to the virtual compute instance 141D, or the virtual compute instance 141D may be said to include the virtual GPU 151B. In one embodiment, the physical GPU 152B may be shared between the virtual GPU 151B and one or more additional virtual GPUs, and the additional virtual GPUs may be attached to additional virtual compute instances. In one embodiment, the virtual GPU 151B may be accessible to the virtual compute instance 141D via an interface device that includes a network interface and a custom hardware interface. Via the custom hardware interface, the interface device may emulate a GPU and appear to the virtual compute instance 141D to include the virtual GPU 151B. Via the network interface, the interface device may communicate with the physical GPU 152B over the network.

Graphics processing for the virtual compute instance 141D may be migrated from the local GPU 941 to the remotely located virtual GPU 151B. Migration of graphics processing may represent replacing the graphics processing provided by the local GPU 941 with the graphics processing provided by the virtual GPU 151B with respect to one or more applications. Graphics processing may include the execution of instructions on a GPU, often to produce graphical output based on input. Migration of graphics processing may include discontinuing use of the local GPU 941 for graphics processing and initiating use of the virtual GPU 151B for graphics processing with respect to one or more applications. In some circumstances, the migration may be performed at a time when no applications are using the local GPU 941. More typically, the migration may be initiated during execution of one or more applications and while the application(s) are using the local GPU 941. In one embodiment, the graphics processing may be migrated from the local GPU 941 to the virtual GPU 151B based (at least in part) on the increase in the graphics workload. In one embodiment, the local-to-remote migration may be performed based (at least in part) for business reasons, e.g., if a budget for a client is increased such that the cost of a virtual GPU can be justified for that client.

When applications are using the local GPU 941 when migration is initiated, the migration may be referred to as live migration. To implement live migration, any currently running applications may be paused, an interface of the application(s) to the local GPU 941 may be replaced by an interface to the virtual GPU 151B, any graphics instructions and/or data may be transferred to the virtual GPU, and then the virtual GPU may be used to resume the graphics processing. In one embodiment, a shim (such as an API shim) may keep track of graphics resources (e.g., textures, render targets, and so on) that are used by the source GPU. To perform the migration, those graphics resources may be requested, copied via handles, and recreated on the target GPU. The memory and execution stack may be synchronized between the source GPU and the target GPU; once the target GPU is caught up, the instance may be paused to perform the migration. In one embodiment, input data may be broadcast to the local GPU 941 as well as the virtual GPU 151B until the virtual GPU is ready to take over graphics processing. In one embodiment, the video memory on the local GPU 941 may be marked as copy-on-write, the contents of video memory on the local GPU may be transferred to the virtual GPU 151B, and then the "dirty" regions in the memory on the local GPU may be updated on the virtual GPU.

As discussed above with respect to FIG. 3, any suitable technique(s) may be used to offload graphics processing from a virtual compute instance to a virtual GPU on a different computing device. In one embodiment, an API shim may intercept calls to a graphics API and marshal the calls to an interface device that implements the local GPU. Within the interface device or at the API shim level, an interface to the local GPU 941 may be replaced by an interface to the virtual GPU 151B such that the graphics processing is migrated seamlessly and transparently with respect to the application(s), e.g., without needing to modify or relaunch the application(s). In one embodiment, a hardware shim may surface a hardware interface to the virtual compute instance and marshal attempts by the instance to interact with the local GPU.

The physical compute instance 142C and physical GPU 152B may be located in the same rack, in different racks in the same data center, in different data centers, in different availability zones or regions, or in any other locations relative to one another. In one embodiment, migration of the virtual compute instance to a different virtual compute instance may also be performed along with local-to-remote migration of graphics processing. Migration of the virtual compute instance may be performed to move to an underlying physical compute instance that is closer to the selected virtual GPU, e.g., such that the physical compute instance 142C and physical GPU 152B are in the same rack or otherwise in nearby locations in the same data center. Any suitable heuristic(s) may be used to determine whether to migrate the virtual compute instance and/or to select the placement of the destination physical compute instance. For example, the migration of the virtual compute instance may be performed to reduce network latency associated with virtualized graphics processing and/or to reduce usage of a network for virtualized graphics processing. Migration of the instance may include live migration, such that one or more applications executing on the virtual compute instance may be paused on the source instance and then resumed on the destination instance.

Figure 10:
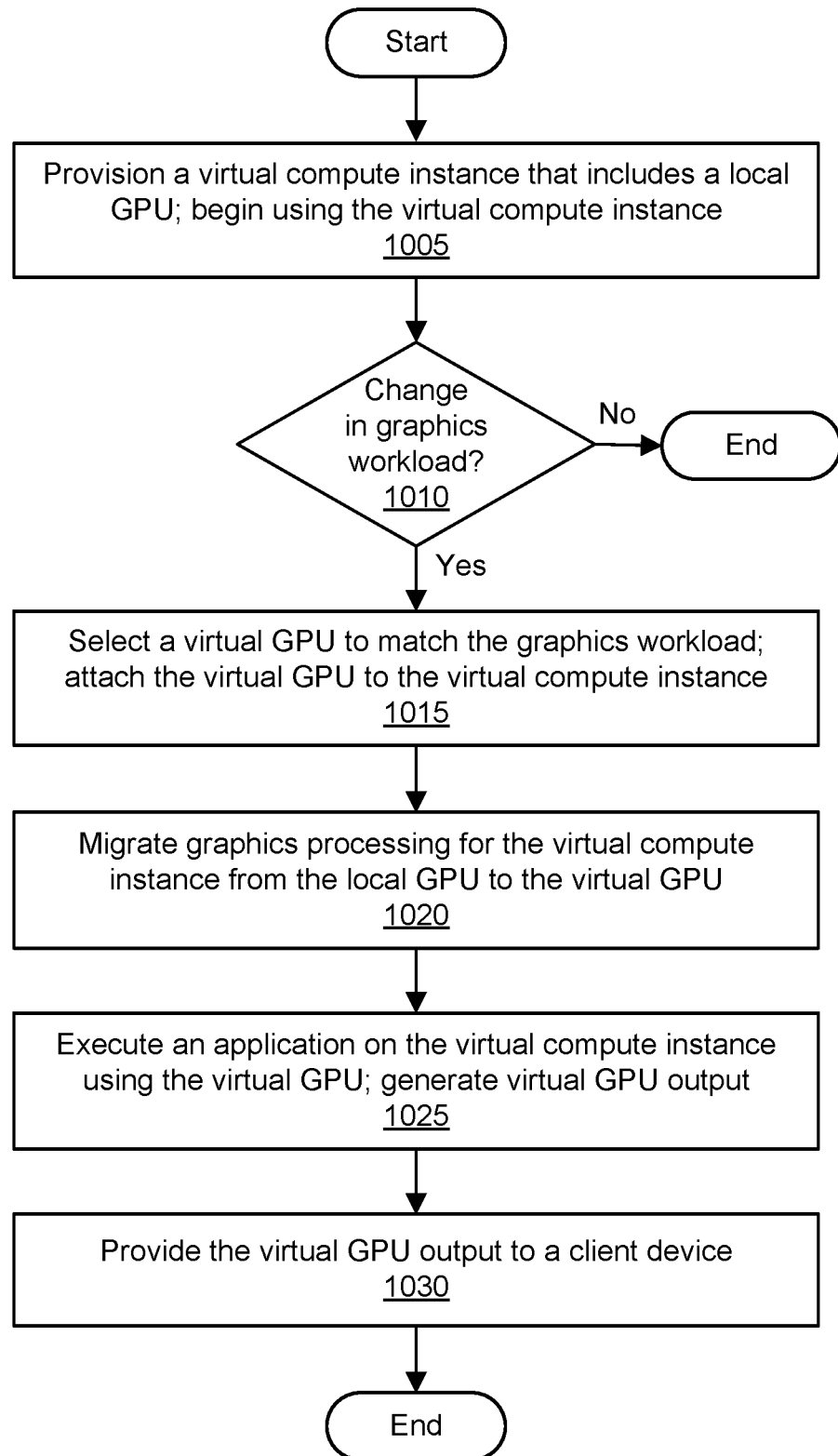
FIG. 10 is a flowchart illustrating a method for local-to-remote migration of graphics processing from a local GPU to a virtual GPU, according to one embodiment.

FIG. 10 is a flowchart illustrating a method for local-to-remote migration of graphics processing from a local GPU to a virtual GPU, according to one embodiment. As shown in 1005, a virtual compute instance may be provisioned from a multi-tenant provider network. The multi-tenant provider network may include a plurality of computing devices configured to implement a plurality of virtual compute instances. The virtual compute instance may include a local graphics processing unit (GPU). The provisioned instance may be of an instance type that includes the local GPU in a default configuration. In one embodiment, the local GPU may be implemented as a hardware component of the physical compute instance used to implement the virtual compute instance. For example, the local GPU may be implemented using the network-capable, customizable interface device 410 shown in FIG. 4. Alternatively, the local GPU may be implemented using a physical GPU installed in the physical compute instance. In one embodiment, the local GPU may be implemented in software using emulation techniques. Typically, the local GPU may provide a low level of graphics processing capabilities in comparison to the virtual GPUs available through an elastic graphics service of the provider network.

Turning back to FIG. 10, the virtual compute instance may be used to execute one or more applications. At least one of the applications may use the local GPU, e.g., for graphics processing. As shown in 1010, a change in graphics workload for the local GPU may be determined during the use of the virtual compute instance. The change in graphics workload may be determined based on user input or automatically detected based on programmatic monitoring. For example, a user may indicate that the graphics workload is expected to change for a currently running application or due to an application that will be added to the instance; the user-supplied indication may include a general request for a more capable virtual GPU or an identification of a specific class of virtual GPU. An automatically detected change in the graphics workload may be based on any suitable metrics relating to use of a GPU, such as the number of primitives sent to the GPU, the number of operations requested of the GPU, the video memory used by the GPU, and/or the rate of output from the GPU over a period of time. The detected change may typically represent an increase in graphics workload, e.g., an increase beyond the graphics capabilities of the local GPU. For example, if the application is using the local GPU to produce full-screen 2D or 3D graphics, the graphics workload may increase such that the frames per second (fps) decreases below a threshold of acceptable performance. As another example, the aggregate graphics workload generated by multiple applications may push the local GPU beyond a threshold of acceptable performance as additional applications are executed simultaneously. Any suitable techniques may be used for monitoring of the graphics workload and detecting a change therein, and any suitable thresholds may be used to assess when the graphics workload has increased sufficiently to justify the attachment of a virtual GPU. If a change in the graphics workload is determined, then the method may proceed to the operation shown in 1015.

As shown in 1015, a virtual GPU may be selected for use with the virtual compute instance, e.g., to replace or supplement the use of the local GPU. The virtual GPU may be selected from a set of virtual GPU classes having different graphics processing capabilities. The virtual GPU may be selected to match the current or anticipated graphics workload of the virtual compute instance. Accordingly, the selected virtual GPU may be of a class that is capable of handling the graphics workload with an acceptable level of performance. In one embodiment, the elastic graphics service may store benchmarks or other metrics for each class of virtual GPU to indicate the graphics processing capabilities relative to various levels of graphics workload. In one embodiment, the virtual GPU may be selected not based on a detected change in the graphics workload but on a configuration change requested by or enabled by a user of the virtual compute instance. For example, if a new application is added to the virtual compute instance during its use, an application manifest for the new application may require greater GPU performance than the instance currently provides (e.g., with the local GPU).

The selected virtual GPU may be attached to the virtual compute instance. In one embodiment, the elastic graphics service may interact with one or more other services or functionalities of a provider network, such as a compute virtualization functionality and/or GPU virtualization functionality, to attach the virtual GPU to the instance. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 1020, graphics processing for the virtual compute instance may be migrated from the local GPU to the remote virtual GPU. Migration of graphics processing may represent replacing the graphics processing provided by the local GPU with the graphics processing provided by the virtual GPU with respect to one or more applications. Graphics processing may include the execution of instructions on a GPU, often to produce graphical output based on input. Migration of graphics processing may include discontinuing use of the local GPU for graphics processing and initiating use of the virtual GPU for graphics processing with respect to one or more applications. In some circumstances, the migration may be performed at a time when no applications are using the local GPU. More typically, the migration may be initiated during execution of one or more applications and while the application(s) are using the local GPU. In one embodiment, the graphics processing may be migrated from the local GPU to the virtual GPU based (at least in part) on the increase in the graphics workload.

When applications are using the local GPU when migration to the remote GPU is initiated, the migration may be referred to as live migration. To implement live migration, any currently running applications may be paused, an interface of the application(s) to the local GPU may be replaced by an interface to the virtual GPU, any graphics instructions and/or data may be transferred to the virtual GPU, and then the virtual GPU may be used to resume the graphics processing. As discussed above with respect to FIG. 3, any suitable technique(s) may be used to offload graphics processing from a virtual compute instance to a virtual GPU on a different computing device. For example, an API shim may intercept calls to a graphics API and marshal the calls to an interface device that implements the local GPU. Within the interface device or at the API shim level, an interface to the local GPU may be replaced by an interface to the virtual GPU such that the graphics processing is migrated seamlessly and transparently with respect to the application(s), e.g., without needing to modify or relaunch the application(s).

Turning back to FIG. 10, as shown in 1025, the application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. The techniques described herein for migration for virtualized graphics processing may be used with the techniques described herein for application-specific virtualized graphics processing. Accordingly, additional applications on the virtual compute instance may use different (e.g., application-specific) virtual GPUs and/or the local GPU, and the application-specific virtual GPUs and/or local GPU may vary in graphics processing capabilities based on the varying requirements of the applications.

As shown in 1030, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Scaling for Virtualized Graphics Processing

In some embodiments, the graphics processing for a virtual compute instance maybe migrated from one or more virtual GPUs to another one or more virtual GPUs. The first set of one or more virtual GPUs may provide a particular level of graphics processing. After a change in GPU requirements for the instance is determined, a second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different virtual compute instance may also be performed, e.g., to reduce network latency associated with virtualized graphics processing.

Figure 11A:
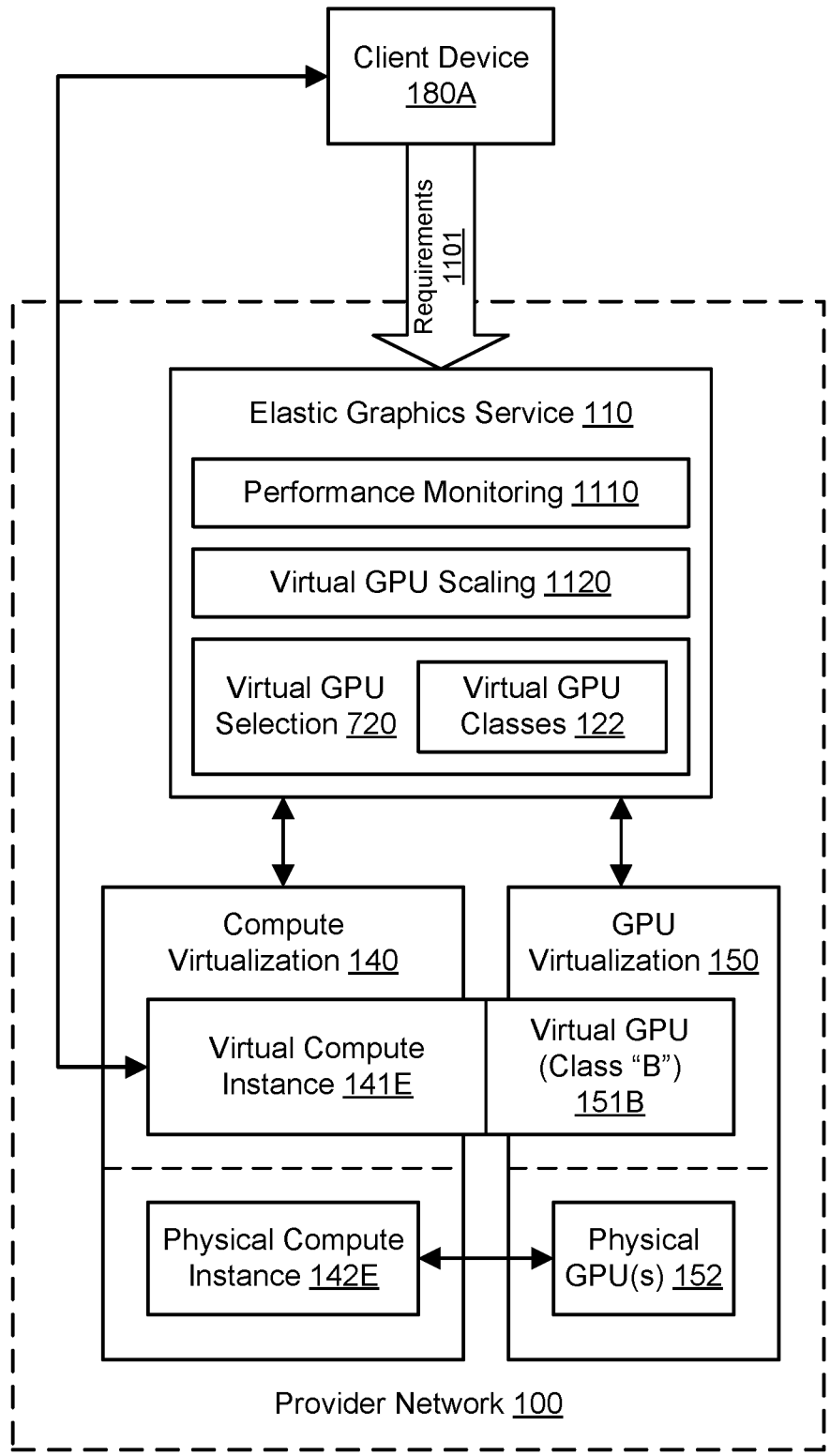
FIG. 11A illustrates an example system environment for scaling for virtualized graphics processing, including a virtual compute instance with a first virtual GPU attached, according to one embodiment.

FIG. 11A illustrates an example system environment for scaling for virtualized graphics processing, including a virtual compute instance with a first virtual GPU attached, according to one embodiment. As discussed above, the elastic graphics service 110 may offer, to clients, selection and provisioning of virtualized compute instances, potentially with attached virtualized GPUs. As shown in the example of FIG. 11A, a virtual compute instance 141E may be provisioned in the provider network 100. The provisioned virtual compute instance 141E may be implemented by the compute virtualization functionality 140 using suitable physical resources such as a physical compute instance 142E. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. Before or after the time of its provisioning, the instance 141E may have an attached virtual GPU 151B of a particular class, such as class "B." The virtual compute instance 141E may be used to execute one or more applications. At least one of the applications may use the virtual GPU 151B, e.g., for graphics processing. The virtual GPU 151B may be implemented using physical GPU resources 152 of the provider network, potentially including physical GPUs 152A-152N. The physical GPU resources 152 may be accessible to the physical compute instance 142E over a network.

At some point, a change in GPU requirements or other requirements may be determined for the virtual compute instance 141E, e.g., during the use of the virtual compute instance. The change in requirements may indicate a need for more graphics processing capability or less graphics processing capability for the instance. In one embodiment, the change in requirements may be determined based (at least in part) on user input for requirements 1101, e.g., by a client 180A of the instance. For example, a user may supply requirements 1101 indicating that the graphics workload is expected to change for a currently running application or due to an application that will be added to the instance. In one embodiment, the user-supplied requirements 1101 may include a general request for a more or less capable virtual GPU or an identification of a specific class of virtual GPU. The user input associated with the requirements 1101 may directly specify a desired class of a virtual GPU or other features of a virtual GPU, or the user input may be transformed and mapped to a desired class of a virtual GPU or other features of a virtual GPU by the elastic graphics service 110. The requirements 1101 specified by the user may include GPU requirements for graphics processing as well as computational requirements. The GPU requirements may specify a recommended graphics processing unit (GPU) class, a recommended size for video memory, or other GPU features and/or configurations that are recommended to run the application. In one embodiment, the GPU requirements may be determined using an application manifest that specifies required or recommended characteristics of a platform (e.g., computational and memory requirements) or environment for executing the application, including characteristics of a physical compute instance or virtual compute instance. For example, if a new application is added to the virtual compute instance during its use, an application manifest for the new application may require greater GPU performance than the instance currently provides (e.g., with the virtual GPU 141E). As another example, the requirements 1101 may represent a change in cost requirements or budgetary requirements for the user, such that scaling of virtualized graphics processing may be performed based (at least in part) on the relative costs of different classes of virtual GPUs.

In one embodiment, the change in requirements may be determined based (at least in part) on performance monitoring 1110. Any suitable techniques may be used to perform performance monitoring 1110 of the virtual compute instance 141E and/or virtual GPU 151B. The performance monitoring 1110 may determine any suitable set of performance metrics, e.g., metrics related to the use of the virtual GPU 151B by the instance 141E. For example, a graphics workload for the virtual GPU 151B may be detected during the use of the virtual compute instance. The graphics workload may be based on any suitable metrics relating to use of a GPU, such as the number of primitives sent to the GPU, the number of operations requested of the GPU, the video memory used by the GPU, and/or the rate of output from the GPU over a period of time. The detected change may represent an increase or decrease in graphics workload, e.g., an increase beyond the graphics capabilities of the virtual GPU 151B or a decrease well below its full graphics capabilities. For example, if the application is using the virtual GPU 151B to produce full-screen 2D or 3D graphics, the graphics workload may increase such that the frames per second (fps) decreases below a threshold of acceptable performance. As another example, the aggregate graphics workload generated by multiple applications may push the virtual GPU 151B beyond a threshold of acceptable performance as additional applications are executed simultaneously. Any suitable techniques may be used for monitoring 1110 of the graphics workload and detecting a change therein, and any suitable thresholds may be used to assess when the graphics workload has changed sufficiently to justify the attachment of a different set of one or more virtual GPUs.

The elastic graphics service 110 may include a functionality for virtual GPU scaling 1120. Using the scaling functionality 1120, the elastic graphics service may determine that the requirements for the instance 141E have changed sufficiently to justify the attachment of a different set of one or more virtual GPUs to replace the virtual GPU 151B. A change in requirements may be insufficient to cause scaling, and so the scaling functionality 1120 may use any suitable heuristics and/or thresholds to determine when to replace the virtual GPU 151B. The scaling functionality 1120 may determine a change in requirements based (at least in part) on the user-specified requirements 1101 and/or on performance monitoring 1110. The scaling functionality 1120 may use the virtual GPU selection functionality 720 to select a new set of one or more virtual GPUs, e.g., based on the change in GPU requirements.

Figure 11B:
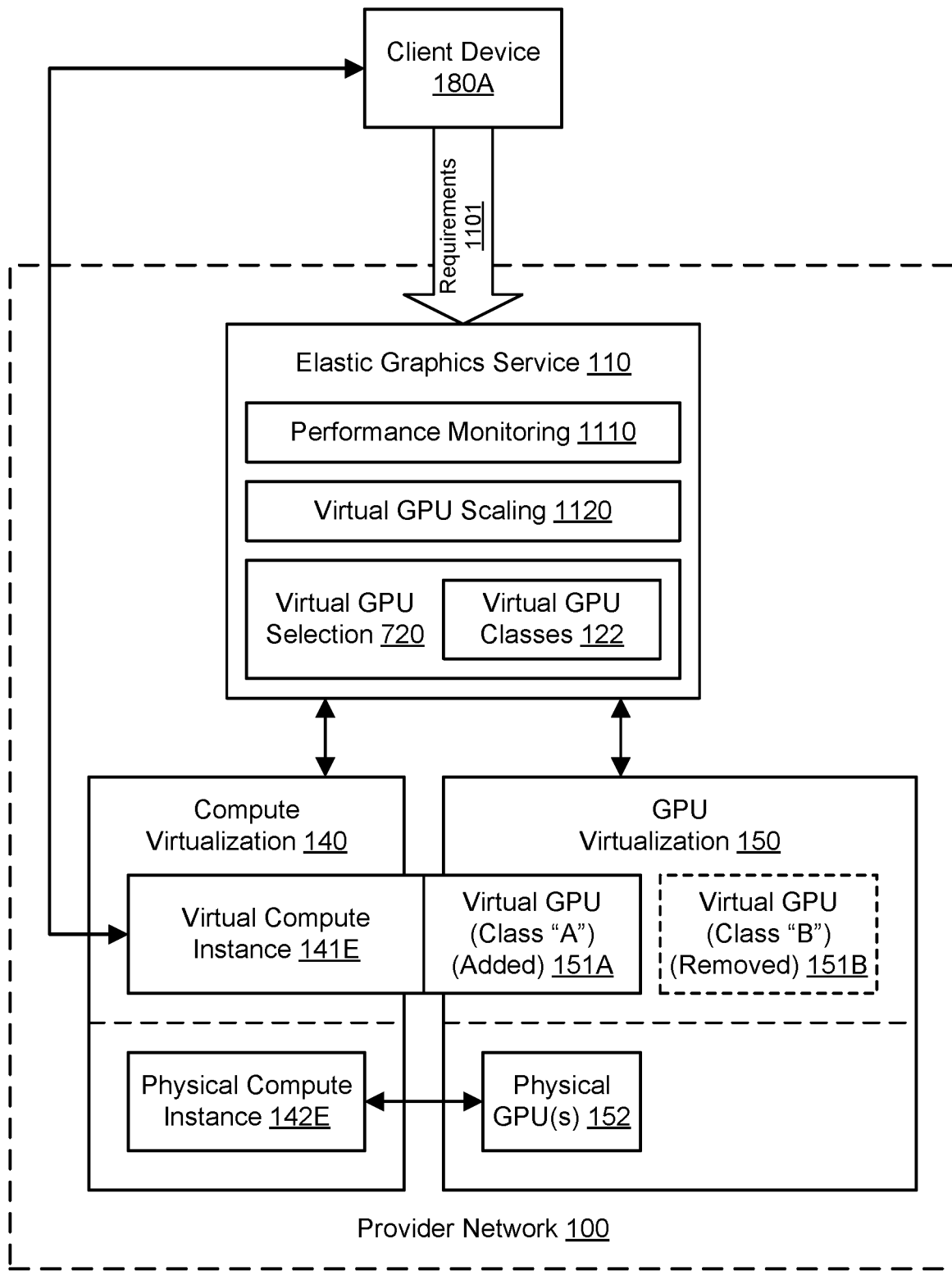
FIG. 11B illustrates further aspects of the example system environment for scaling for virtualized graphics processing, including the replacement of the first virtual GPU with a second virtual GPU for the virtual compute instance, according to one embodiment.

FIG. 11B illustrates further aspects of the example system environment for scaling for virtualized graphics processing, including the replacement of the first virtual GPU with a second virtual GPU for the virtual compute instance, according to one embodiment. Using the virtual GPU scaling functionality 1120, the elastic graphics service 110 may remove the virtual GPU 151B from the virtual compute instance 141E and replace it with another virtual GPU 151A attached to the virtual compute instance. The virtual GPU 151A may be selected based (at least in part) on the change in requirements. The virtual GPU 151A may provide a different level of graphics processing relative to the virtual GPU 151B, such as a lesser level or a greater level. The level of graphics processing may refer to the graphics processing power or ability of a virtual GPU as measured by any suitable metric(s), such as the number of primitives sent to the GPU(s), the number of operations requested of the GPU(s), the video memory used by the GPU(s), and/or the rate of output from the GPU(s) over a period of time.

As discussed above, the provider network 100 may offer a plurality of virtual GPU classes for virtual GPUs. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. The particular virtual GPU 151A may be selected for use with the virtual compute instance 141E, e.g., to replace the use of the virtual GPU 151B. The virtual GPU 151A may be selected from a set of virtual GPU classes having different graphics processing capabilities. The virtual GPU 151A may be selected to meet or exceed the current or anticipated GPU requirements of the virtual compute instance. Accordingly, the selected virtual GPU 151A may be of a class, such as class "A," that is capable of handling a particular graphics workload or other GPU requirements with an acceptable level of performance. In one embodiment, the elastic graphics service may store benchmarks or other metrics for each class of virtual GPU to indicate the graphics processing capabilities relative to various levels of graphics workload.

The virtual GPU 151B may be removed from the virtual compute instance 141E, and the selected virtual GPU 151A may be attached to the virtual compute instance. In one embodiment, the elastic graphics service 110 may interact with one or more other services or functionalities of a provider network 100, such as a compute virtualization functionality 140 and/or GPU virtualization functionality 150, to remove the virtual GPU 151B from the instance 141E and return the virtual GPU (and/or the physical GPU resources used to implement it) to a pool of available resources in the provider network. In one embodiment, the elastic graphics service 110 may interact with one or more other services or functionalities of a provider network 100, such as a compute virtualization functionality 140 and/or GPU virtualization functionality 150, to attach the virtual GPU 151A to the instance 141E. The virtual compute instance 141E may be implemented using central processing unit (CPU) resources and memory resources of a physical compute instance 142E. The virtual GPU 151A may be implemented using the physical GPU resources 152 of the provider network. The physical GPU(s) 152 may be attached to a different computing device than the computing device 142E that provides the CPU resources for the virtual compute instance 141E. The physical GPU(s) 152 may be accessible to the physical compute instance 142E over a network. The virtual GPU 151A may be said to be attached to the virtual compute instance 141E, or the virtual compute instance 141E may be said to include the virtual GPU 151A. In one embodiment, the physical GPU(s) 152 may be shared between the virtual GPU 151A and one or more additional virtual GPUs, and the additional virtual GPUs may be attached to additional virtual compute instances. In one embodiment, the virtual GPU 151A may be accessible to the virtual compute instance 141E via an interface device that includes a network interface and a custom hardware interface. Via the custom hardware interface, the interface device may emulate a GPU and appear to the virtual compute instance 141E to include the virtual GPU 151A. Via the network interface, the interface device may communicate with the physical GPU(s) 152 over the network.

Graphics processing for the virtual compute instance 141E may be migrated from the virtual GPU 151B to the newly attached virtual GPU 151A. Migration of graphics processing may represent replacing the graphics processing provided by the virtual GPU 151B with the graphics processing provided by the virtual GPU 151A with respect to one or more applications. Graphics processing may include the execution of instructions on a GPU, often to produce graphical output based on input. Migration of graphics processing may include discontinuing use of the virtual GPU 151B for graphics processing and initiating use of the virtual GPU 151A for graphics processing with respect to one or more applications. In some circumstances, the migration may be performed at a time when no applications are using the virtual GPU 151B. More typically, the migration may be initiated during execution of one or more applications and while the application(s) are using the virtual GPU 151B. In one embodiment, the graphics processing may be migrated from the virtual GPU 151B to the virtual GPU 151A based (at least in part) on the change in GPU requirements. In one embodiment, the scaling may be performed based (at least in part) for business reasons, e.g., if a budget for a client is increased such that the cost of the virtual GPU 141A can be justified for that client, or if the budget for the client is decreased such that the cost of the virtual GPU 151B can no longer be justified for that client.

When applications are using the virtual GPU 151B when migration is initiated, the migration may be referred to as live migration. To implement live migration, any currently running applications may be paused, an interface of the application(s) to the virtual GPU 151B may be replaced by an interface to the virtual GPU 151A, any graphics instructions and/or data may be transferred to the virtual GPU 151A, and then the virtual GPU 151A may be used to resume the graphics processing. In one embodiment, a shim (such as an API shim) may keep track of graphics resources (e.g., textures, render targets, and so on) that are used by the source GPU. To perform the migration, those graphics resources may be requested, copied via handles, and recreated on the target GPU. The memory and execution stack may be synchronized between the source GPU and the target GPU; once the target GPU is caught up, the instance may be paused to perform the migration. In one embodiment, input data may be broadcast to the virtual GPU 151B as well as the virtual GPU 151A until the virtual GPU 151A is ready to take over graphics processing. In one embodiment, the video memory on the virtual GPU 151B may be marked as copy-on-write, the contents of video memory on the virtual GPU 151B may be transferred to the virtual GPU 151A, and then the "dirty" regions in the memory on the virtual GPU 151B may be updated on the virtual GPU 151A.

As discussed above with respect to FIG. 3, any suitable technique(s) may be used to offload graphics processing from a virtual compute instance to a virtual GPU on a different computing device. In one embodiment, an API shim may intercept calls to a graphics API and marshal the calls to an interface device. Within the interface device or at the API shim level, an interface to the virtual GPU 151B may be replaced by an interface to the virtual GPU 151A such that the graphics processing is migrated seamlessly and transparently with respect to the application(s), e.g., without needing to modify or relaunch the application(s). In one embodiment, a hardware shim may surface a hardware interface to the virtual compute instance and marshal attempts by the instance to interact with the virtual GPU 151B.

The physical compute instance 142E and physical GPU(s) 152 may be located in the same rack, in different racks in the same data center, in different data centers, in different availability zones or regions, or in any other locations relative to one another. Migration of the virtual compute instance may be performed to move to an underlying physical compute instance that is closer to the selected virtual GPU, e.g., such that the physical compute instance 142E and physical GPU(s) 152 are in the same rack or otherwise in nearby locations in the same data center. Any suitable heuristic(s) may be used to determine whether to migrate the virtual compute instance and/or to select the placement of the destination physical compute instance. For example, the migration of the virtual compute instance may be performed to reduce network latency associated with virtualized graphics processing and/or to reduce usage of a network for virtualized graphics processing. Migration of the instance may include live migration, such that one or more applications executing on the virtual compute instance may be paused on the source instance and then resumed on the destination instance.

Figure 11C:
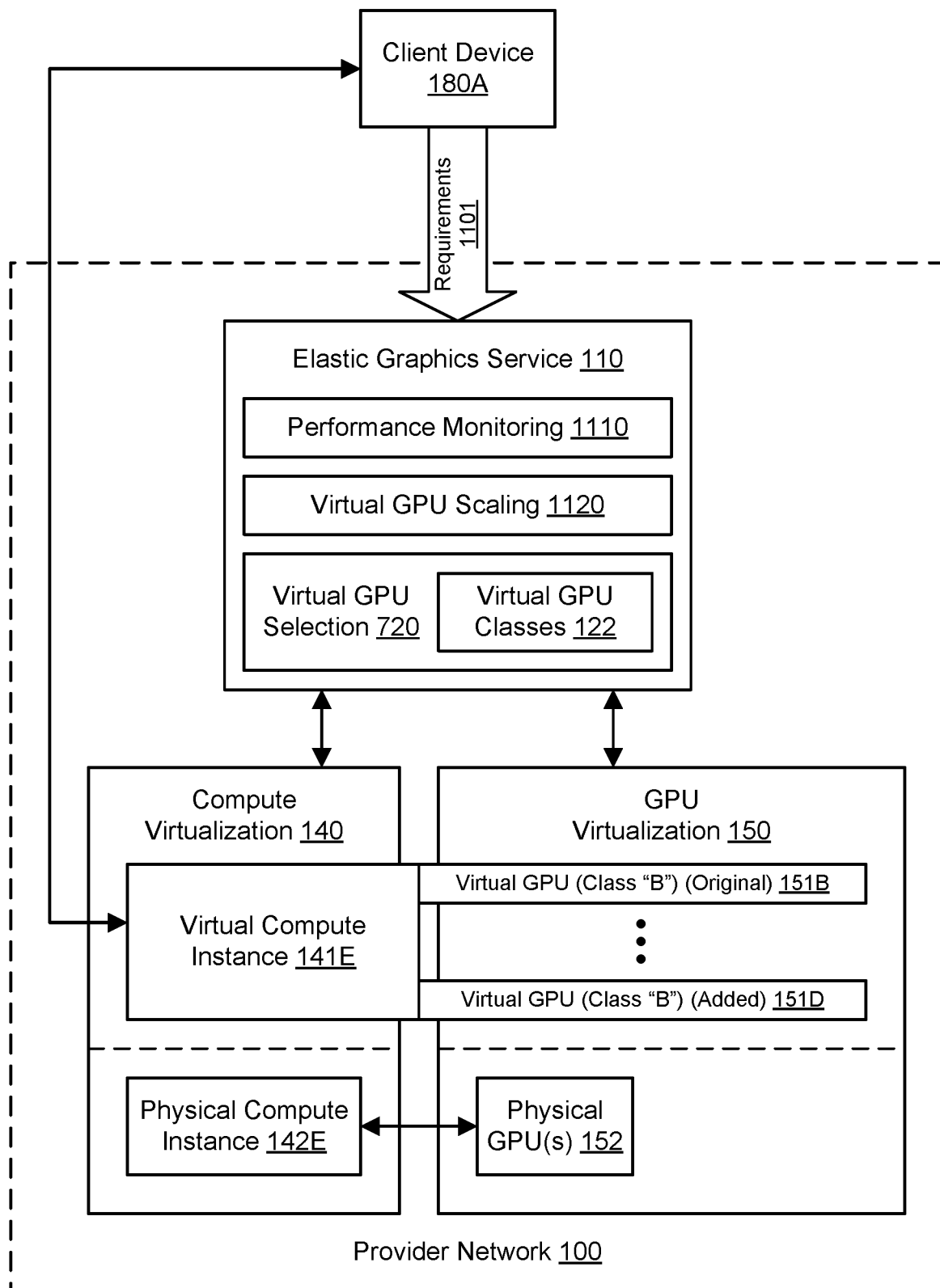
FIG. 11C illustrates further aspects of the example system environment for scaling for virtualized graphics processing, including the addition of a second virtual GPU to the first virtual GPU for the virtual compute instance, according to one embodiment.

FIG. 11C illustrates further aspects of the example system environment for scaling for virtualized graphics processing, including the addition of a second virtual GPU to the first virtual GPU for the virtual compute instance, according to one embodiment. As discussed above, the virtual compute instance 141E may have an attached virtual GPU 151B. In one embodiment, the scaling functionality 1120 may determine that the virtual GPU 151B should be replaced by a set of multiple virtual GPUs. In one embodiment, set of multiple virtual GPUs may also include the original virtual GPU 151B, such that the virtual GPU 151B may be supplemented by one or more additional virtual GPUs. As shown in the example of FIG. 11C, the virtual GPU scaling functionality 1120 may scale up the level of graphics processing for the instance 141 such that a set of virtual GPUs 151B through 151D are attached to the instance to provide graphics processing. The set of virtual GPUs 151B-151D may be implemented by the physical GPU resources 152 as discussed above. The set of virtual GPUs 151B-151D may typically (but not necessarily) be of the same class, such as class "B." It is also contemplated that the virtual GPU 151B may be replaced entirely by a set of multiple virtual GPUs of the same class or of a different class. The multiple virtual GPUs 151B-151D may collectively provide a greater level of graphics processing than the single virtual GPU 151B. Any suitable techniques may be used to distribute a workload among the multiple virtual GPUs 151B-151D, such as broadcasting input data to all of the virtual GPUs and using the virtual GPUs to operate in a concurrent manner on different portions of the input data.

Figure 12A:
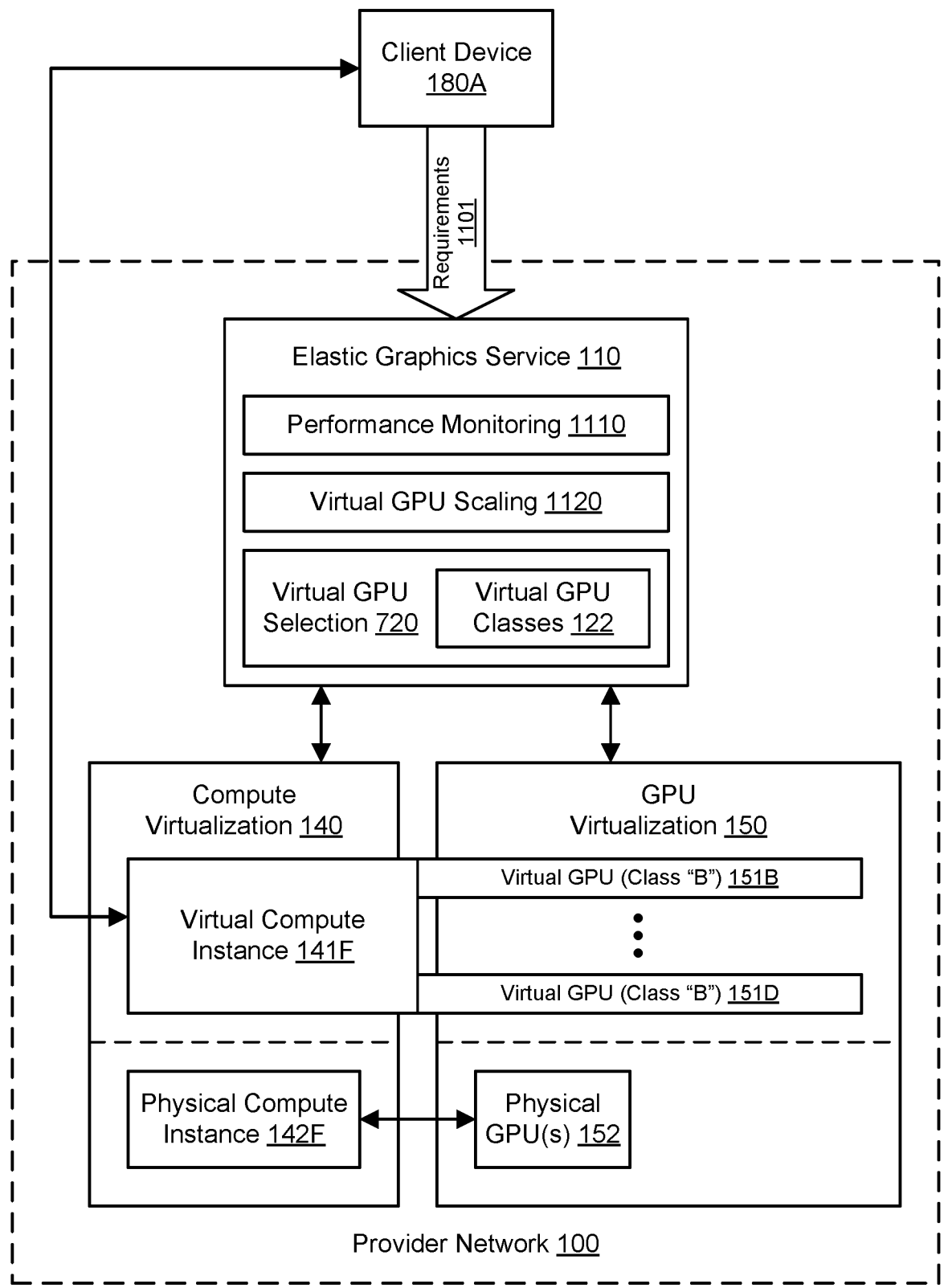
FIG. 12A illustrates an example system environment for scaling for virtualized graphics processing, including a virtual compute instance with two virtual GPUs attached, according to one embodiment.

FIG. 12A illustrates an example system environment for scaling for virtualized graphics processing, including a virtual compute instance with two virtual GPUs attached, according to one embodiment. A virtual compute instance 141F may be provisioned in the provider network 100. The provisioned virtual compute instance 141F may be implemented by the compute virtualization functionality 140 using suitable physical resources such as a physical compute instance 142F. At the time of its provisioning or after its provisioning, the virtual compute instance 141F may have a set of attached virtual GPUs 151B through 151D. The set of virtual GPUs 151B-151D may be implemented by the physical GPU resources 152 as discussed above. The set of virtual GPUs 151B-151D may typically (but not necessarily) be of the same class, such as class "B." Any suitable techniques may be used to distribute a workload among the multiple virtual GPUs 151B-151D, such as broadcasting input data to all of the virtual GPUs and using the virtual GPUs to operate in a concurrent manner on different portions of the input data.

In one embodiment, the scaling functionality 1120 may determine that the virtual GPUs 151B-151D should be replaced a different set of one or more virtual GPUs to provide a different level of graphics processing for the instance 141F, e.g., based on a change in GPU requirements determined based on user input 1101 and/or on performance monitoring 1110. In one embodiment, additional virtual GPUs, typically of the same class, may be added to the virtual GPUs 151B-151D. In one embodiment, one or more of the virtual GPUs 151B-151D may be removed from the attached set of virtual GPUs. In one embodiment, the virtual GPUs 151B-151D may be replaced by multiple virtual GPUs of a different class. As will be discussed below, the virtual GPUs 151B-151D may be replaced by a single virtual GPU.

Figure 12B:
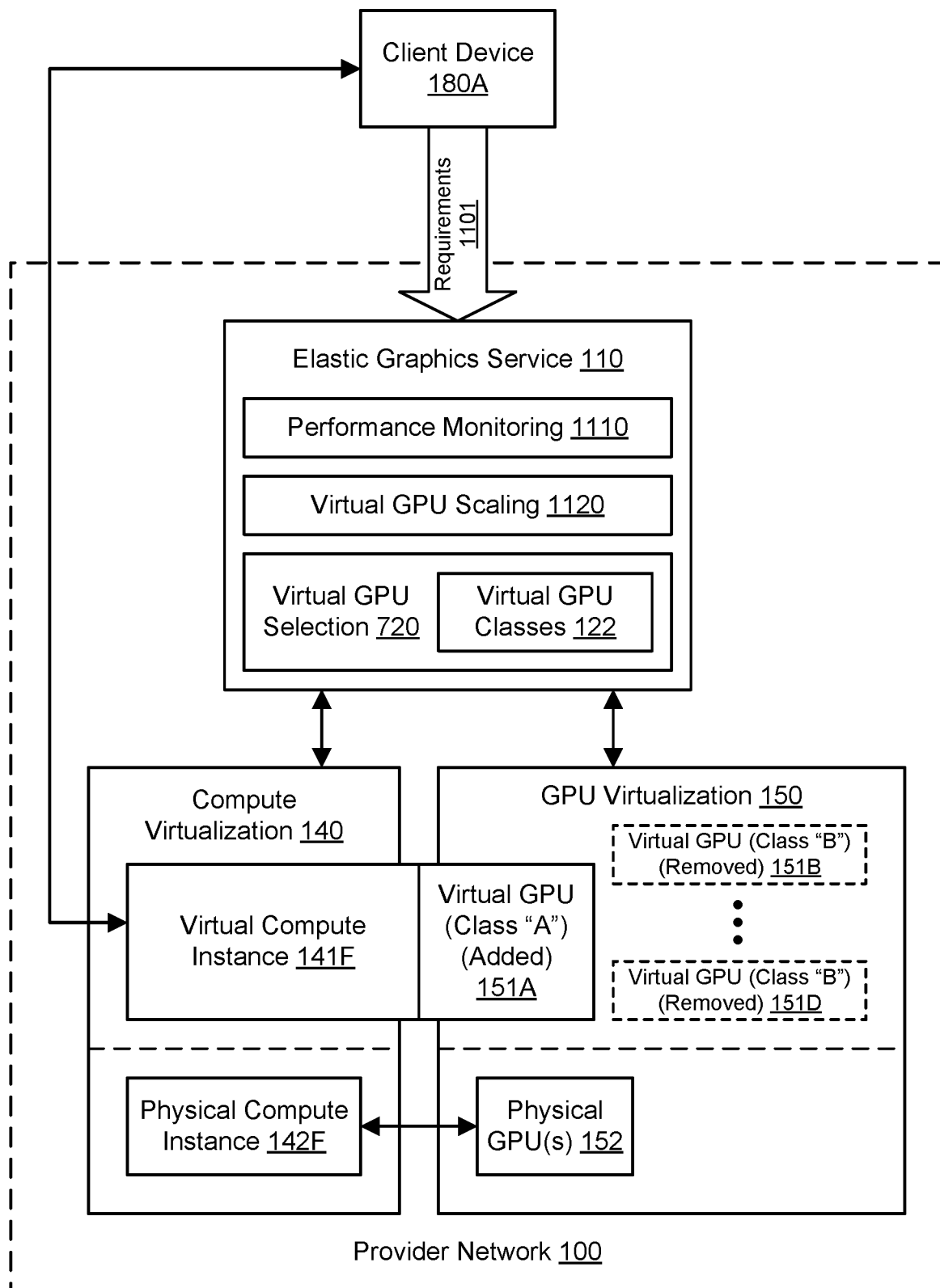
FIG. 12B illustrates further aspects of the example system environment for scaling for virtualized graphics processing, including the replacement of the virtual GPUs with a single virtual GPU for the virtual compute instance, according to one embodiment.

FIG. 12B illustrates further aspects of the example system environment for scaling for virtualized graphics processing, including the replacement of the virtual GPUs with a single virtual GPU for the virtual compute instance, according to one embodiment. Using the virtual GPU scaling functionality 1120, the elastic graphics service 110 may remove the virtual GPUs 151B-151D from the virtual compute instance 141F and replace them with another virtual GPU 151A attached to the virtual compute instance. The virtual GPU 151A may be selected based (at least in part) on the change in GPU requirements. The virtual GPU 151A may provide a different level of graphics processing relative to the virtual GPUs 151B-151D. The level of graphics processing may refer to the collective graphics processing power or ability of one or more virtual GPUs as measured by any suitable metric(s), such as the number of primitives sent to the GPU(s), the number of operations requested of the GPU(s), the video memory used by the GPU(s), and/or the rate of output from the GPU(s) over a period of time. In one embodiment, the single virtual GPU 151A may be of a more capable class and may provide a greater level of graphics processing than the multiple virtual GPUs 151B-151D. In one embodiment, the single virtual GPU 151A may provide a lesser level of graphics processing than the multiple virtual GPUs 151B-151D.

As discussed above, the provider network 100 may offer a plurality of virtual GPU classes for virtual GPUs. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. The particular virtual GPU 151A may be selected for use with the virtual compute instance 141F, e.g., to replace the use of the virtual GPUs 151B-151D. The virtual GPU 151A may be selected from a set of virtual GPU classes having different graphics processing capabilities. The virtual GPU 151A may be selected to meet or exceed the current or anticipated GPU requirements of the virtual compute instance. Accordingly, the selected virtual GPU 151A may be of a class, such as class "A," that is capable of handling a particular graphics workload or other GPU requirements with an acceptable level of performance. In one embodiment, the elastic graphics service may store benchmarks or other metrics for each class of virtual GPU to indicate the graphics processing capabilities relative to various levels of graphics workload.

The virtual GPUs 151B-151D may be removed from the virtual compute instance 141F, and the selected virtual GPU 151A may be attached to the virtual compute instance. In one embodiment, the elastic graphics service 110 may interact with one or more other services or functionalities of a provider network 100, such as a compute virtualization functionality 140 and/or GPU virtualization functionality 150, to remove the virtual GPUs 151B-151D from the instance 141F and return the virtual GPUs (and/or the physical GPU resources used to implement them) to a pool of available resources in the provider network. In one embodiment, the elastic graphics service 110 may interact with one or more other services or functionalities of a provider network 100, such as a compute virtualization functionality 140 and/or GPU virtualization functionality 150, to attach the virtual GPU 151A to the instance 141F. The virtual compute instance 141F may be implemented using central processing unit (CPU) resources and memory resources of a physical compute instance 142F. The virtual GPU 151A may be implemented using the physical GPU resources 152 of the provider network. The physical GPU(s) 152 may be attached to a different computing device than the computing device 142F that provides the CPU resources for the virtual compute instance 141F. The physical GPU(s) 152 may be accessible to the physical compute instance 142F over a network. The virtual GPU 151A may be said to be attached to the virtual compute instance 141F, or the virtual compute instance 141F may be said to include the virtual GPU 151A. In one embodiment, the physical GPU(s) 152 may be shared between the virtual GPU 151A and one or more additional virtual GPUs, and the additional virtual GPUs may be attached to additional virtual compute instances. In one embodiment, the virtual GPU 151A may be accessible to the virtual compute instance 141F via an interface device that includes a network interface and a custom hardware interface. Via the custom hardware interface, the interface device may emulate a GPU and appear to the virtual compute instance 141F to include the virtual GPU 151A. Via the network interface, the interface device may communicate with the physical GPU(s) 152 over the network.

Graphics processing for the virtual compute instance 141F may be migrated from the virtual GPUs 151B-151D to the newly attached virtual GPU 151A. Migration of graphics processing may represent replacing the graphics processing provided by the virtual GPUs 151B-151D with the graphics processing provided by the virtual GPU 151A with respect to one or more applications. Graphics processing may include the execution of instructions on a GPU, often to produce graphical output based on input. Migration of graphics processing may include discontinuing use of the virtual GPUs 151B-151D for graphics processing and initiating use of the virtual GPU 151A for graphics processing with respect to one or more applications. In some circumstances, the migration may be performed at a time when no applications are using the virtual GPUs 151B-151D. More typically, the migration may be initiated during execution of one or more applications and while the application(s) are using the virtual GPUs 151B-151D. In one embodiment, the graphics processing may be migrated from the virtual GPUs 151B-151D to the virtual GPU 151A based (at least in part) on the change in GPU requirements. In one embodiment, the scaling may be performed based (at least in part) for business reasons, e.g., if a budget for a client is increased such that the increased cost of the virtual GPU 151A can be justified for that client, or if the budget for the client is decreased such that the cost of the virtual GPUs 151B-151D can no longer be justified for that client.

When applications are using the virtual GPUs 151B-151D when migration is initiated, the migration may be referred to as live migration. To implement live migration, any currently running applications may be paused, an interface of the application(s) to the virtual GPUs 151B-151D may be replaced by an interface to the virtual GPU 151A, any graphics instructions and/or data may be transferred to the virtual GPU 151A, and then the virtual GPU 151A may be used to resume the graphics processing. In one embodiment, a shim (such as an API shim) may keep track of graphics resources (e.g., textures, render targets, and so on) that are used by the source GPU. To perform the migration, those graphics resources may be requested, copied via handles, and recreated on the target GPU. The memory and execution stack may be synchronized between the source GPU and the target GPU; once the target GPU is caught up, the instance may be paused to perform the migration. In one embodiment, input data may be broadcast to the virtual GPUs 151B-151D as well as the virtual GPU 151A until the virtual GPU 151A is ready to take over graphics processing. In one embodiment, the video memory on the virtual GPUs 151B-151D may be marked as copy-on-write, the contents of video memory on the virtual GPUs 151B-151D may be transferred to the virtual GPU 151A, and then the "dirty" regions in the memory on the virtual GPUs 151B-151D may be updated on the virtual GPU 151A.

As discussed above with respect to FIG. 3, any suitable technique(s) may be used to offload graphics processing from a virtual compute instance to a virtual GPU on a different computing device. In one embodiment, an API shim may intercept calls to a graphics API and marshal the calls to an interface device. Within the interface device or at the API shim level, an interface to the virtual GPUs 151B-151D may be replaced by an interface to the virtual GPU 151A such that the graphics processing is migrated seamlessly and transparently with respect to the application(s), e.g., without needing to modify or relaunch the application(s). In one embodiment, a hardware shim may surface a hardware interface to the virtual compute instance and marshal attempts by the instance to interact with the virtual GPUs 151B-151D.

The physical compute instance 142F and physical GPU(s) 152 may be located in the same rack, in different racks in the same data center, in different data centers, in different availability zones or regions, or in any other locations relative to one another. Migration of the virtual compute instance may be performed to move to an underlying physical compute instance that is closer to the selected virtual GPU, e.g., such that the physical compute instance 142F and physical GPU(s) 152 are in the same rack or otherwise in nearby locations in the same data center. Any suitable heuristic(s) may be used to determine whether to migrate the virtual compute instance and/or to select the placement of the destination physical compute instance. For example, the migration of the virtual compute instance may be performed to reduce network latency associated with virtualized graphics processing and/or to reduce usage of a network for virtualized graphics processing. Migration of the instance may include live migration, such that one or more applications executing on the virtual compute instance may be paused on the source instance and then resumed on the destination instance.

Figure 13:
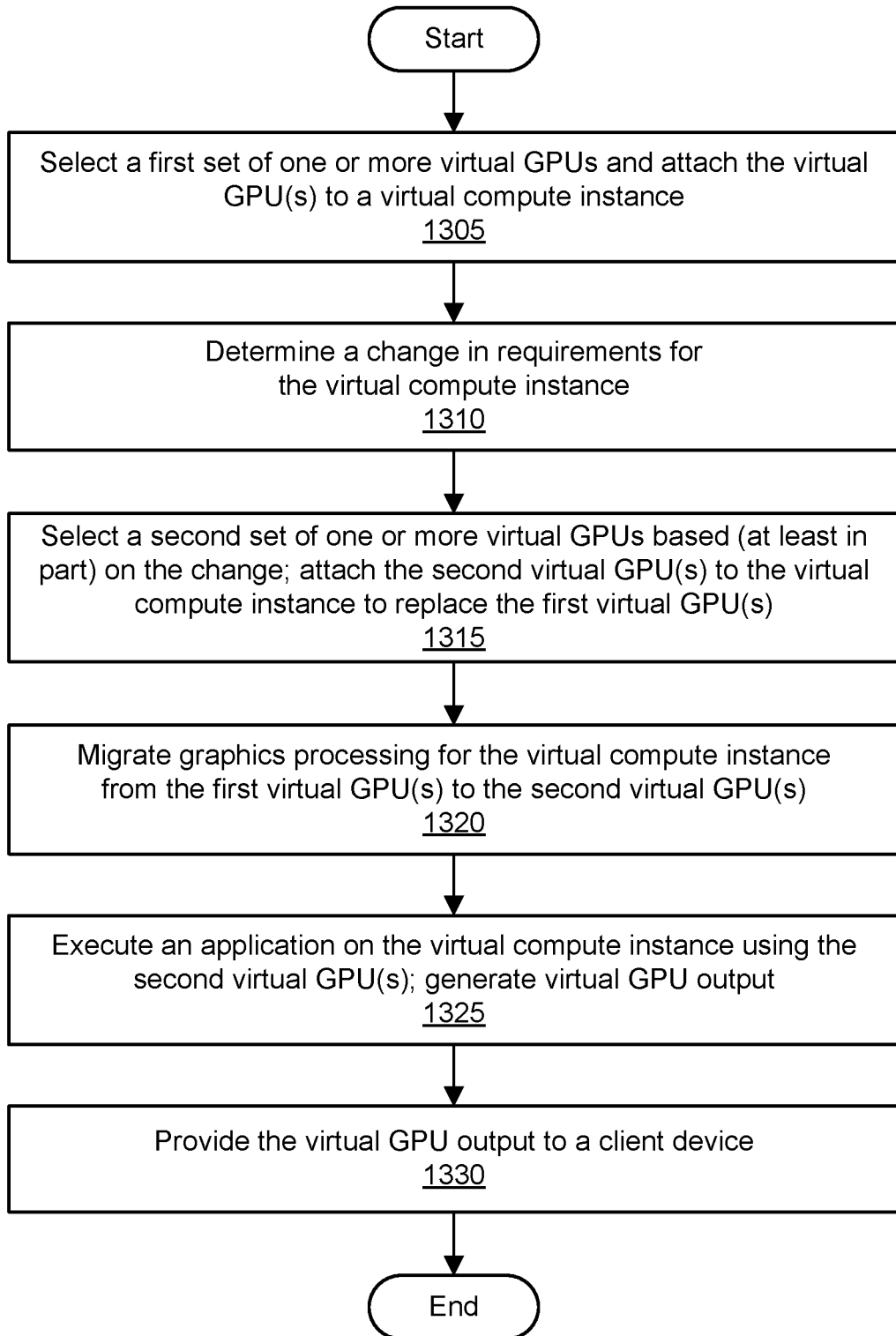
FIG. 13 is a flowchart illustrating a method for scaling for virtualized graphics processing, according to one embodiment.

FIG. 13 is a flowchart illustrating a method for scaling for virtualized graphics processing, according to one embodiment. A virtual compute instance may be provisioned from a multi-tenant provider network. The multi-tenant provider network may include a plurality of computing devices configured to implement a plurality of virtual compute instances. As shown in 1305, one or more virtual GPUs (referred to herein as the first set of one or more virtual GPUs) may be attached to the virtual compute instance either at the time of provisioning or afterwards. The virtual compute instance may be implemented using central processing unit (CPU) resources and memory resources of a physical compute instance. The first virtual GPU(s) may be implemented using physical GPU resources (e.g., one or more physical GPU(s) of the provider network. The physical GPU(s) may be attached to a different computing device than the computing device that provides the CPU resources for the virtual compute instance. The physical GPU(s) may be accessible to the physical compute instance over a network.

The first virtual GPU(s) may provide a particular level of graphics processing capabilities, e.g., as associated with one or more virtual GPU classes to which the set belongs. If the first set includes more than one virtual GPU, then the multiple virtual GPUs may typically (but not necessarily) be of the same class. The virtual compute instance may be used to execute one or more applications. At least one of the applications may use the first virtual GPU, e.g., for graphics processing. If the first set includes more than one virtual GPU, then any suitable techniques may be used to distribute a workload among the multiple virtual GPUs, such as broadcasting input data to all of the virtual GPUs and using the virtual GPUs to operate in a concurrent manner on different portions of the input data.

As shown in 1310, a change in requirements for the instance may be determined. The change in requirements may indicate a need for more graphics processing capability or less graphics processing capability for the instance. In one embodiment, the change in requirements may be determined based (at least in part) on user input, e.g., by a user of the instance. The user input associated with the requirements may directly specify a desired class of a virtual GPU or other features of a virtual GPU, or the user input may be transformed and mapped to a desired class of a virtual GPU or other features of a virtual GPU by the elastic graphics service. The requirements specified by the user may include GPU requirements for graphics processing as well as computational requirements. The GPU requirements may specify a recommended graphics processing unit (GPU) class, a recommended size for video memory, or other GPU features and/or configurations that are recommended to run the application. In one embodiment, the requirements may be determined using an application manifest that specifies required or recommended characteristics of a platform (e.g., computational and memory requirements) or environment for executing the application, including characteristics of a physical compute instance or virtual compute instance. For example, if a new application is added to the virtual compute instance during its use, an application manifest for the new application may require greater GPU performance than the instance currently provides (e.g., with the first virtual GPU(s)).

In one embodiment, the change in requirements may be determined based (at least in part) on performance monitoring. Any suitable techniques may be used to perform performance monitoring of the virtual compute instance and/or first virtual GPU(s). The performance monitoring may determine any suitable set of performance metrics, e.g., metrics related to the use of the first virtual GPU(s) by the instance. For example, a graphics workload for the first virtual GPU(s) may be detected during the use of the virtual compute instance. The graphics workload may be based on any suitable metrics relating to use of a GPU, such as the number of primitives sent to the GPU, the number of operations requested of the GPU, the video memory used by the GPU, and/or the rate of output from the GPU over a period of time. The detected change may represent an increase or decrease in graphics workload, e.g., an increase beyond the graphics capabilities of the first virtual GPU(s) or a decrease well below its full graphics capabilities. For example, if the application is using the first virtual GPU(s) to produce full-screen 2D or 3D graphics, the graphics workload may increase such that the frames per second (fps) decreases below a threshold of acceptable performance. As another example, the aggregate graphics workload generated by multiple applications may push the first virtual GPU(s) beyond a threshold of acceptable performance as additional applications are executed simultaneously. Any suitable techniques may be used for monitoring of the graphics workload and detecting a change therein, and any suitable thresholds may be used to assess when the graphics workload has changed sufficiently to justify the attachment of a different set of one or more virtual GPUs.

As shown in 1315, a second set of one or more virtual GPUs may be selected for use with the virtual compute instance and attached to the instance to replace the use of the first virtual GPU(s). The second virtual GPU(s) may be selected based (at least in part) on the change in requirements. The second set of virtual GPU(s) may provide a different level of graphics processing relative to the first virtual GPU(s), such as a lesser level or a greater level. The level of graphics processing may refer to the collective graphics processing power or ability of one or more virtual GPUs as measured by any suitable metric(s), such as the number of primitives sent to the GPU(s), the number of operations requested of the GPU(s), the video memory used by the GPU(s), and/or the rate of output from the GPU(s) over a period of time. The second virtual GPU(s) may be selected from a set of virtual GPU classes having various graphics processing capabilities. The second virtual GPU(s) may be selected to meet or exceed the requirements, e.g., to match the current or anticipated graphics workload of the virtual compute instance. Accordingly, the second virtual GPU(s) may be of one or more classes that are capable of handling the graphics workload with an acceptable level of performance. In one embodiment, the elastic graphics service may store benchmarks or other metrics for each class of virtual GPU to indicate the graphics processing capabilities relative to various levels of graphics workload.

In one embodiment, the first set may include a single virtual GPU, and the second set may include multiple virtual GPUs that may collectively provide a lesser or greater level of graphics processing than the single virtual GPU. In one embodiment, the first set may include multiple virtual GPUs, and the second set may include a single virtual GPU that may provide a lesser or greater level of graphics processing than the multiple virtual GPUs. If the second set includes more than one virtual GPU, then the multiple virtual GPUs may typically (but not necessarily) be of the same class. If the first set includes more than one virtual GPU, then any suitable techniques may be used to distribute a workload among the multiple virtual GPUs, such as broadcasting input data to all of the virtual GPUs and using the virtual GPUs to operate in a concurrent manner on different portions of the input data.

The first virtual GPU(s) may be removed from the virtual compute instance, and the second virtual GPU(s) may be attached to the virtual compute instance. In one embodiment, the elastic graphics service may interact with one or more other services or functionalities of a provider network, such as a compute virtualization functionality and/or GPU virtualization functionality, to remove the first virtual GPU(s) and attach the second virtual GPU to the instance. The second virtual GPU(s) may be implemented using physical GPU resources (e.g., one or more physical GPU(s)) of the provider network, potentially including the same physical GPU resources that implement the first set. The physical GPU(s) may be attached to a different computing device than the computing device that provides the CPU resources for the virtual compute instance. The physical GPU(s) may be accessible to the physical compute instance over a network. The second virtual GPU(s) may be said to be attached to the virtual compute instance, or the virtual compute instance may be said to include the second virtual GPU(s). In one embodiment, the physical GPU(s) may be shared between the second virtual GPU(s) and one or more additional virtual GPUs (potentially including the first virtual GPU(s)), and the additional virtual GPUs may be attached to additional virtual compute instances. In one embodiment, the second virtual GPU(s) may be accessible to the virtual compute instance via an interface device that includes a network interface and a custom hardware interface. Via the custom hardware interface, the interface device may emulate a GPU and appear to the virtual compute instance to include the second virtual GPU(s). Via the network interface, the interface device may communicate with the physical GPU(s) over the network.

As shown in 1320, graphics processing for the virtual compute instance may be migrated from the first virtual GPU(s) to the second virtual GPU(s). Migration of graphics processing may represent replacing the graphics processing provided by the first virtual GPU(s) with the graphics processing provided by the second virtual GPU(s) with respect to one or more applications. Migration of graphics processing may include discontinuing use of the first virtual GPU(s) for graphics processing and initiating use of the second virtual GPU(s) for graphics processing with respect to one or more applications. In some circumstances, the migration may be performed at a time when no applications are using the first virtual GPU(s). More typically, the migration may be initiated during execution of one or more applications and while the application(s) are using the first virtual GPU(s). In one embodiment, the graphics processing may be migrated from the first virtual GPU(s) to the second virtual GPU(s) based (at least in part) on the change in GPU requirements. In one embodiment, the second set of virtual GPU(s) may include one or more of the virtual GPU(s) in the first set, such that one or more virtual GPU(s) may remain attached to the virtual compute instance. In one embodiment, the first virtual GPU(s) may be removed from the virtual compute instance and returned to a pool of available virtual GPUs maintained by the provider network.

When applications are using the first virtual GPU(s) when migration is initiated, the migration may be referred to as live migration. To implement live migration, any currently running applications may be paused, an interface of the application(s) to the first virtual GPU(s) may be replaced by an interface to the second virtual GPU(s), any graphics instructions and/or data may be transferred to the second virtual GPU(s), and then the second virtual GPU(s) may be used to resume the graphics processing. As discussed above with respect to FIG. 3, any suitable technique(s) may be used to offload graphics processing from a virtual compute instance to a virtual GPU on a different computing device. For example, an API shim may intercept calls to a graphics API and marshal the calls to an interface device that presents an interface to the first virtual GPU(s). Within the interface device or at the API shim level, an interface to the first virtual GPU(s) may be replaced by an interface to the second virtual GPU(s) such that the graphics processing is migrated seamlessly and transparently with respect to the application(s), e.g., without needing to modify or relaunch the application(s).

Turning back to FIG. 13, as shown in 1325, the application may be executed on the virtual compute instance using the second virtual GPU(s). Execution of the application may include execution of instructions on the virtual compute instance (e.g., on the underlying physical compute instance) and/or second virtual GPU(s) (e.g., on the underlying physical GPU(s)). Execution of the application using the second virtual GPU(s) may generate virtual GPU output, e.g., output produced by executing instructions or otherwise performing tasks on the virtual GPU(s). The techniques described herein for migration for virtualized graphics processing may be used with the techniques described herein for application-specific virtualized graphics processing.

As shown in 1330, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Placement Optimization for Virtualized Graphics Processing

In some embodiments, the placement of virtual compute instance(s) and/or virtual GPU(s) may be optimized in a provider network. As used herein, optimization includes improvement (of performance, cost, and so on) even if the improvement does not achieve an ideal or perfect state. The physical compute instance(s) may be used to implement virtual compute instance(s), and the physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available physical compute instance(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying physical compute instance and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

Figure 14:
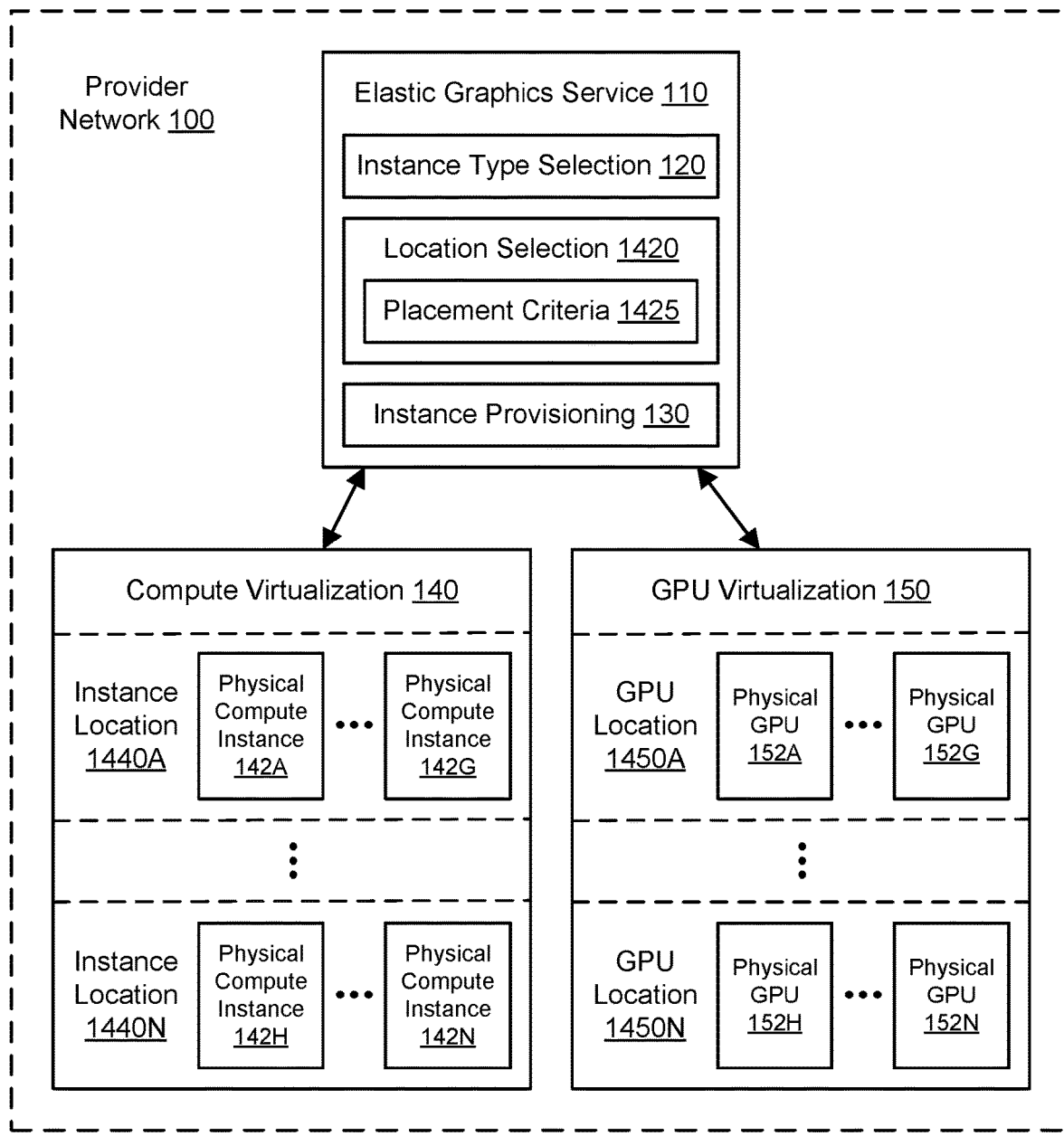
FIG. 14 illustrates an example system environment for placement optimization for virtualized graphics processing, including multiple instance locations and multiple GPU locations in a provider network, according to one embodiment.

FIG. 14 illustrates an example system environment for placement optimization for virtualized graphics processing, including multiple instance locations and multiple GPU locations in a provider network, according to one embodiment. The provider network 100 may include a plurality of instance locations 1440A-1440N for a plurality of physical compute instances 142A-142N. The instance locations 1440A-1440N may represent a plurality of racks, a plurality of data centers, and/or a plurality of geographical regions. Any of the instance locations 1440A-1440N may include one or more physical compute instances. For example, physical compute instances 142A-142G may be physically located at the instance location 1440A, and physical compute instances 142H-142N may be physically located at the instance location 1440N.

The provider network 100 may also include a plurality of GPU locations 1450A-1450N for a plurality of physical GPUs 152A-152N (e.g., for graphics servers that include and provide access to the physical GPUs). The GPU locations 1450A-1450N may represent a plurality of racks, a plurality of data centers, and/or a plurality of geographical regions. Any of the GPU locations 1450A-1450N may include one or more physical GPUs. For example, physical GPUs 152A-152G may be physically located at the GPU location 1450A, and physical GPUs 152H-152N may be physically located at the GPU location 1450N. Some of the GPU locations may be within the same racks, same data centers, and/or same geographical regions as some of the instance locations. Placement optimization may often seek to place virtual compute instances and their attached virtual GPUs within the same rack or otherwise near each other to minimize latency.

As discussed above, the elastic graphics service 110 may include an instance type selection functionality 120. Using the instance type selection functionality 120, an instance type for a virtual compute instance may be selected for a client. Using the instance type selection functionality 120, a virtual GPU class for a virtual GPU may also be selected for a client. As discussed above, the instance provisioning functionality 130 may provision a virtual compute instance with an attached virtual GPUs of the selected instance type and virtual GPU class. Using the placement optimization techniques described herein, the location of a virtual compute instance and/or virtual GPU may be selected in a provider network based on one or more placement criteria.

The elastic graphics service may include a location selection functionality 1420 that performs location optimization for resources in the provider network 100. Using the location selection functionality 1420, a particular one of the GPU locations 1450A-1450N may be selected for a physical GPU that implements a virtual GPU. The GPU location may be selected based (at least in part) on one or more placement criteria 1425. Using the location selection functionality 1420, a particular one of the instance locations 1440A-1440N may be selected for a physical compute instance that implements a virtual compute instance. The instance location may also be selected based (at least in part) on one or more placement criteria 1425.

Figure 15:
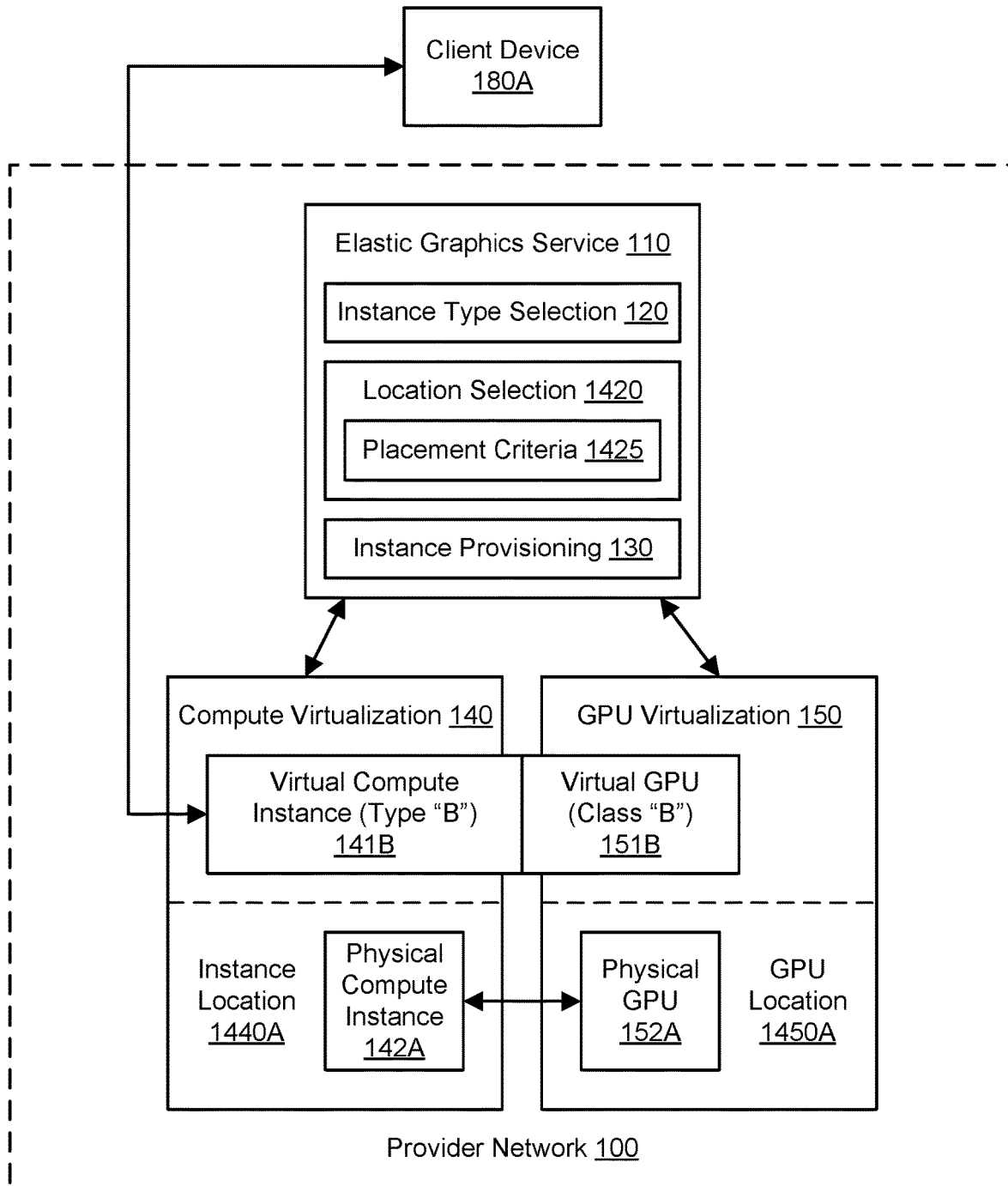
FIG. 15 illustrates further aspects of the example system environment for placement optimization for virtualized graphics processing, including resource provisioning with a selected instance location and a selected GPU location in a provider network, according to one embodiment.

FIG. 15 illustrates further aspects of the example system environment for placement optimization for virtualized graphics processing, including resource provisioning with a selected instance location and a selected GPU location in a provider network, according to one embodiment. Based on one or more of the placement criteria 1425, a particular GPU location 1450A may be selected for a physical GPU 152A. Based on one or more of the placement criteria 1425, a particular instance location 1440A may be selected for a physical compute instance 141B. The placement criteria used to select the GPU location may be the same criteria or different criteria as the placement criteria used to select the instance location. In one embodiment, both the instance location and the GPU location may be optimized for a particular virtual compute instance and its attached virtual GPU. In one embodiment, the placement criteria used to optimize the placement of a particular virtual compute instance and/or virtual GPU may be provided or approved by a client of the provider network. In one embodiment, the placement criteria used to optimize the placement of a particular virtual compute instance and/or virtual GPU may be provided or approved by an administrator of the provider network. In one embodiment, the placement criteria used to optimize the placement of a particular virtual compute instance and/or virtual GPU may be determined using a default configuration.

The one or more placement criteria 1425 may include or be associated with optimization (e.g., improvement) of metrics for performance (e.g., to maximize performance), resource usage (e.g., to minimize resource usage), cost (e.g., to minimize cost or fit resource costs within a client-specified budget), energy usage (e.g., to minimize energy usage or prioritize "green" energy), network locality (e.g., to minimize networking proximity between two or more resources), and/or any other suitable metrics. Performance metrics and cost metrics used as placement criteria may often be associated with the use of the physical GPU by the physical compute instance. Performance metrics may include network-related metrics such as latency and bandwidth, as measured within the provider network and/or between the provider network and a client device. Performance metrics may include any other metrics related to processor use, GPU use, memory use, storage use, and so on. As an example, to minimize network latency and/or bandwidth, an instance location 1440A for a physical compute instance 142A may be selected within the same rack as the physical GPU 152A such that network communication between the underlying physical compute instance and physical GPU may not extend beyond a top-of-rack switch in the rack. If locations within the same rack are not available, then an instance location nearby the physical GPU (e.g., within the same data center) may be selected to optimize the placement criteria. As another example, a GPU location 1450A in a data center nearest the client device 180A may be selected to minimize latency between the physical GPU and the client device, where the proximity of the data center to the client device is measured based on anticipated or historical latency and/or on geographical proximity.

Using the instance provisioning functionality 130, a virtual GPU 151B may be provisioned using the physical GPU 152A in the selected GPU location 1450A. The virtual GPU 151B may be selected from a set of virtual GPU classes having various graphics processing capabilities. The virtual GPU may be selected to meet or exceed any applicable GPU requirements, e.g., to match the current or anticipated graphics workload of the virtual compute instance. Using the instance provisioning functionality 130, a virtual compute instance 141B may be provisioned using the physical compute instance 142A in the selected instance location 1440A. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. The virtual compute instance may be selected from a plurality of instance types having various capabilities.

Placement optimization for network locality may attempt to group multiple resources (e.g., one or more physical compute instances and one or more physical GPUs) based (at least in part) on proximity within a network. Network locality may refer to one or more locations, connections, associations, or zones in a network to which a resource belongs. A resource itself may be a node or particular network location (e.g., network address) and thus a network locality. Network locality may be determined based on the network router, switch, or other network device or infrastructure (e.g., network spine) to which a resource is connected. Network localities may be logically determined according to logically associated network devices or resource in some embodiments. A resource may belong to multiple network localities, such as being connected to a particular network router, which may be in turn linked to other network routers, or networking devices. Instance locations and/or GPU locations may be selected based (at least in part) on network locality.

Figure 16A:
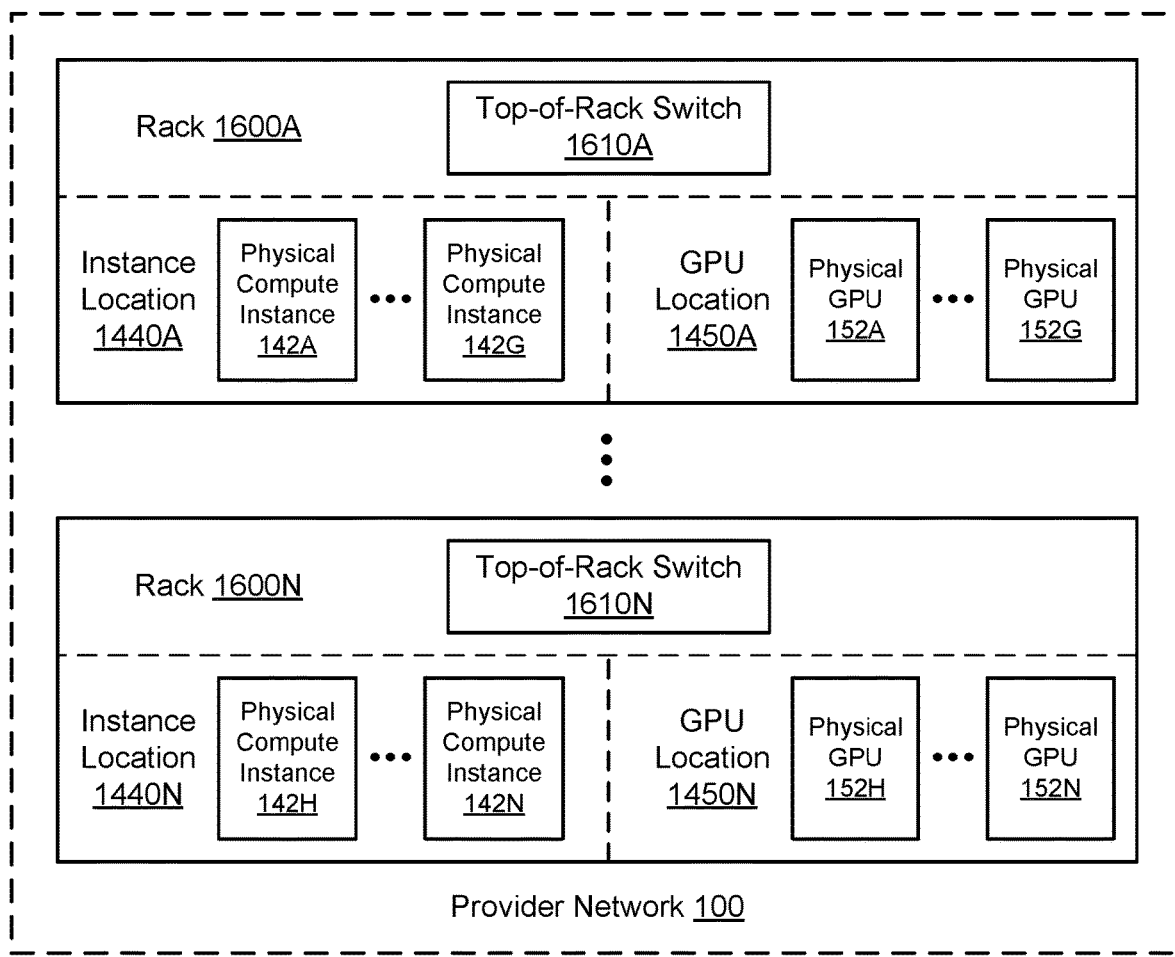
FIG. 16A illustrates an example of multiple instance locations and multiple GPU locations in different racks in a provider network, according to one embodiment.

FIG. 16A illustrates an example of multiple instance locations and multiple GPU locations in different racks in a provider network, according to one embodiment. As discussed above, the provider network 100 may include a plurality of instance locations 1440A-1440N for a plurality of physical compute instances 142A-142N and also include a plurality of GPU locations 1450A-1450N for a plurality of physical GPUs 152A-152N (e.g., for graphics servers that include and provide access to the physical GPUs). In one embodiment, the provider network 100 may include a plurality of racks 1600A-1600N in one or more data centers or geographical locations. Any of the racks 1600A-1600N may include one or more instance locations and also one or more GPU locations. As shown in the example of FIG. 16A, rack 1600A may include physical compute instances 142A-142G at the instance location 1440A, and rack 1600A may also include physical GPUs 152A-152G at the GPU location 1450A. Similarly, rack 1600N may include physical compute instances 142H-142N at the instance location 1440N, and rack 1600N may also include physical GPUs 152H-152N at the GPU location 1450N.

Each rack may have a networking component such as a top-of-rack switch (such as switch 1610A for rack 1600A and switch 1610N for rack 1600A). The top-of-rack switches 1610A-1610N may mediate network communication for components within the corresponding rack and provide a network connection to other portions of the network beyond the rack. When the virtual compute instance 141B communicates with the attached virtual GPU 151B, data sent between the underlying physical compute instance 142A and the underlying physical GPU 152A may not go beyond the switch 1610A. Accordingly, to optimize for network locality, placement optimization may often seek to place virtual compute instances and their attached virtual GPUs within the same rack or otherwise near each other in a data center to minimize latency and/or minimize network bandwidth beyond the rack.

Figure 16B:
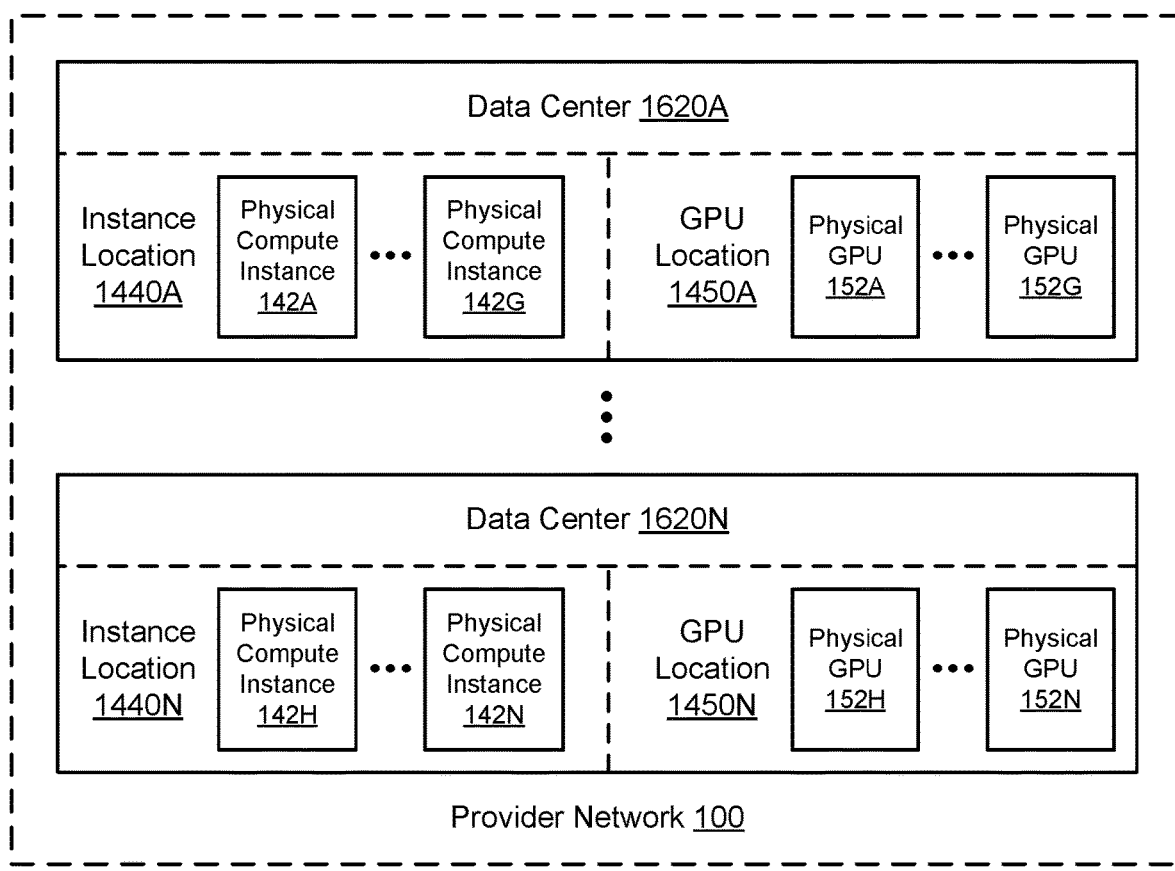
FIG. 16B illustrates an example of multiple instance locations and multiple GPU locations in different data centers in a provider network, according to one embodiment.

FIG. 16B illustrates an example of multiple instance locations and multiple GPU locations in different data centers in a provider network, according to one embodiment. As discussed above, the provider network 100 may include a plurality of instance locations 1440A-1440N for a plurality of physical compute instances 142A-142N and also include a plurality of GPU locations 1450A-1450N for a plurality of physical GPUs 152A-152N (e.g., for graphics servers that include and provide access to the physical GPUs). In one embodiment, the provider network 100 may include a plurality of data centers 1620A-1620N in one or more geographical locations. Each of the data centers 1620A-1620N may represent a set of computing resources, processing resources, storage resources, memory resources, and so on at a single facility or geographically proximate set of facilities. Any of the data centers 1620A-1620N may include one or more instance locations and also one or more GPU locations. As shown in the example of FIG. 16B, data center 1620A may include physical compute instances 142A-142G at the instance location 1440A, and data center 1620A may also include physical GPUs 152A-152G at the GPU location 1450A. Similarly, data center 1620N may include physical compute instances 142H-142N at the instance location 1440N, and data center 1620N may also include physical GPUs 152H-152N at the GPU location 1450N. The data centers 1620A-1620N may vary in their proximity to various client devices. To optimize for network locality, placement optimization may seek to place a virtual compute instance and/or its attached virtual GPU in a data center based on proximity to a particular client device to minimize latency with respect to that client device.

Figure 17A:
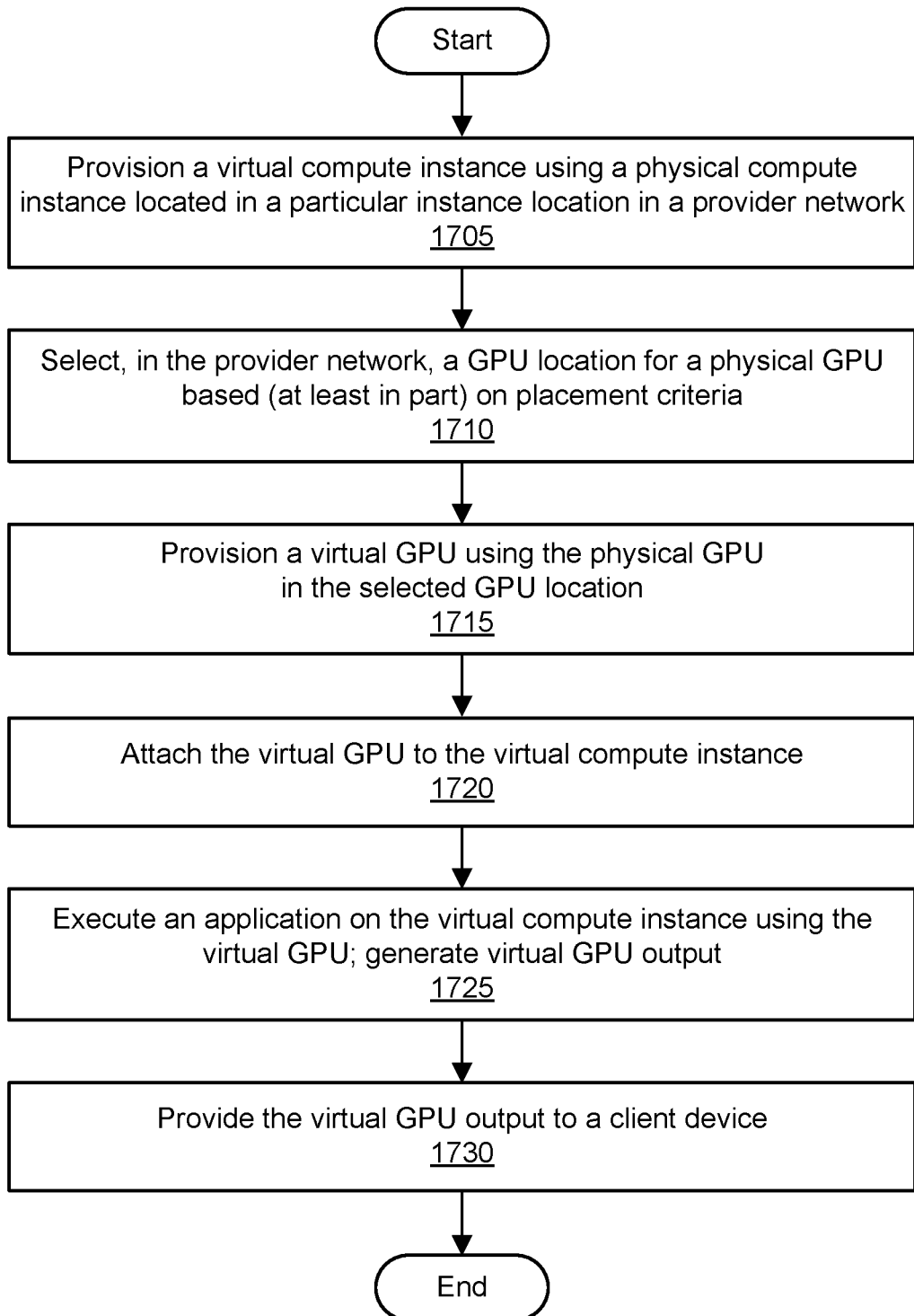
FIG. 17A is a flowchart illustrating a method for placement optimization for virtualized graphics processing, including location selection for a physical GPU used to implement a virtual GPU, according to one embodiment.

FIG. 17A is a flowchart illustrating a method for placement optimization for virtualized graphics processing, including location selection for a physical GPU used to implement a virtual GPU, according to one embodiment. As shown in 1705, a virtual compute instance may be provisioned using a physical compute instance in a provider network. The provider network may include a plurality of instance locations for a plurality of physical compute instances. For example, the instance locations may include a plurality of racks, a plurality of data centers, and/or a plurality of geographical regions. The virtual compute instance may be provisioned in a particular one of these instance locations.

The method may optimize placement of a virtual GPU to be used with the virtual compute instance. As used herein, optimization includes improvement (of performance, cost, and so on) even if the improvement does not achieve an ideal or perfect state. The provider network may also include a plurality of GPU locations for a plurality of physical GPUs (e.g., for graphics servers that include and provide access to the physical GPUs). For example, the GPU locations may include a plurality of racks, a plurality of data centers, and/or a plurality of geographical regions. Some of the GPU locations may be within the same racks, same data centers, and/or same geographical regions as some of the instance locations. Placement optimization may often seek to place virtual compute instances and their attached virtual GPUs within the same rack or otherwise near each other to minimize latency.

As shown in 1710, a particular one of these GPU locations may be selected for a physical GPU. The GPU location may be selected based (at least in part) on one or more placement criteria. The one or more placement criteria may include optimization (e.g., improvement) of metrics for performance (e.g., to maximize performance), resource usage (e.g., to minimize resource usage), cost (e.g., to minimize cost or fit resource costs within a client-specified budget), energy usage (e.g., to minimize energy usage or prioritize "green" energy), and/or any other suitable metrics. Performance metrics and cost metrics used as placement criteria may often be associated with the use of the physical GPU by the physical compute instance. Performance metrics may include network-related metrics such as latency and bandwidth, as measured within the provider network and/or between the provider network and a client device. Performance metrics may include any other metrics related to processor use, GPU use, memory use, storage use, and so on. As an example, to minimize network latency and/or bandwidth, a GPU location for a physical GPU may be selected within the same rack as the physical compute instance such that network communication between the underlying physical compute instance and physical GPU may not extend beyond a top-of-rack switch in the rack. If locations within the same rack are not available, then a GPU location nearby the physical compute instance (e.g., within the same data center) may be selected to optimize the placement criteria. As another example, a GPU location in a data center nearest the client device may be selected to minimize latency between the physical GPU and the client device, where the proximity of the data center to the client device is measured based on anticipated or historical latency and/or on geographical proximity.

As shown in 1715, a virtual GPU may be provisioned using the physical GPU in the selected GPU location. The virtual GPU may be selected from a set of virtual GPU classes having various graphics processing capabilities. The virtual GPU may be selected to meet or exceed any applicable GPU requirements, e.g., to match the current or anticipated graphics workload of the virtual compute instance.

As shown in 1720, the virtual GPU may be attached to the virtual compute instance. In one embodiment, an elastic graphics service may interact with one or more other services or functionalities of a provider network, such as a compute virtualization functionality and/or GPU virtualization functionality, to attach the virtual GPU to the instance. The physical GPU used to implement the virtual GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

In one embodiment, a different virtual GPU may have been attached to the virtual compute instance prior to the provisioning and attachment of the virtual GPU as shown in 1715 and 1720. The newly attached virtual GPU may represent an improvement in the one or more placement criteria with respect to the previously attached virtual GPU. Graphics processing for the virtual compute instance may be migrated from the previously attached virtual GPU to the newly attached virtual GPU using the migration techniques discussed above.

As shown in 1725, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU.

As shown in 1730, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Figure 17B:
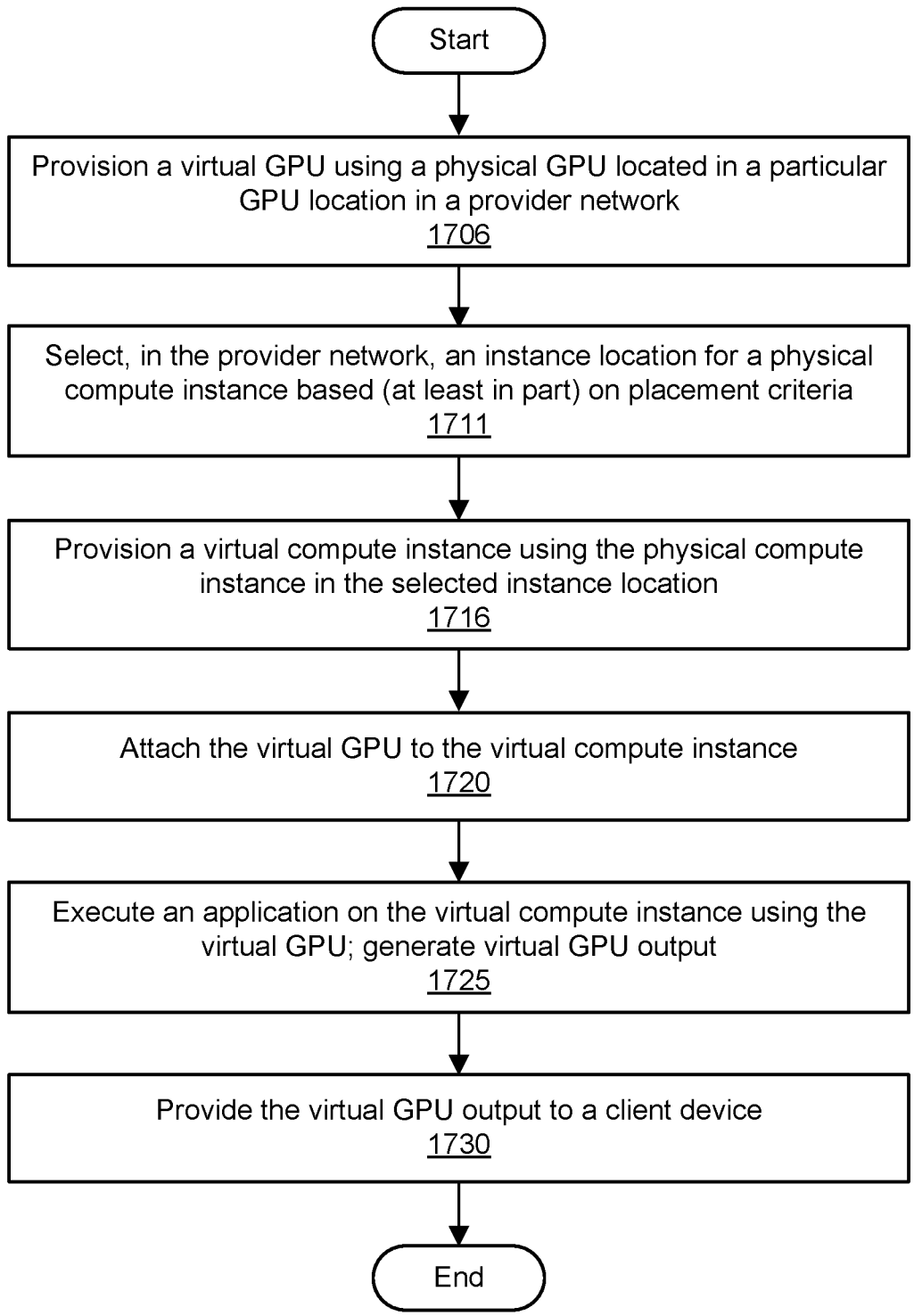
FIG. 17B is a flowchart illustrating a method for placement optimization for virtualized graphics processing, including location selection for a physical compute instance used to implement a virtual compute instance, according to one embodiment.

FIG. 17B is a flowchart illustrating a method for placement optimization for virtualized graphics processing, including location selection for a physical compute instance used to implement a virtual compute instance, according to one embodiment. As shown in 1706, a virtual GPU may be provisioned using a physical GPU in a provider network. The provider network may include a plurality of GPU locations for a plurality of physical GPUs. For example, the GPU locations may include a plurality of racks, a plurality of data centers, and/or a plurality of geographical regions. The virtual GPU may be provisioned in a particular one of these GPU locations. The virtual GPU may be selected from a set of virtual GPU classes having various graphics processing capabilities. The virtual GPU may be selected to meet or exceed any applicable GPU requirements, e.g., to match the current or anticipated graphics workload of the virtual compute instance.

The method may optimize placement of a virtual compute instance to be used with the virtual GPU. As used herein, optimization includes improvement (of performance, cost, and so on) even if the improvement does not achieve an ideal or perfect state. The provider network may also include a plurality of instance locations for a plurality of physical compute instances. For example, the instance locations may include a plurality of racks, a plurality of data centers, and/or a plurality of geographical regions. Some of the instance locations may be within the same racks, same data centers, and/or same geographical regions as some of the GPU locations. Placement optimization may often seek to place virtual compute instances and their attached virtual GPUs within the same rack or otherwise near each other to minimize latency.

As shown in 1711, a particular one of these instance locations may be selected for a physical compute instance. The instance location may be selected based (at least in part) on one or more placement criteria. The one or more placement criteria may include optimization (e.g., improvement) of metrics for performance (e.g., to maximize performance), resource usage (e.g., to minimize resource usage), cost (e.g., to minimize cost or fit resource costs within a client-specified budget), energy usage (e.g., to minimize energy usage or prioritize "green" energy), and/or any other suitable metrics. Performance metrics and cost metrics used as placement criteria may often be associated with the use of the physical GPU by the physical compute instance. Performance metrics may include network-related metrics such as latency and bandwidth, as measured within the provider network and/or between the provider network and a client device. Performance metrics may include any other metrics related to processor use, GPU use, memory use, storage use, and so on. As an example, to minimize network latency and/or bandwidth, an instance location for a physical compute instance may be selected within the same rack as the physical GPU such that network communication between the underlying physical compute instance and physical GPU may not extend beyond a top-of-rack switch in the rack. If locations within the same rack are not available, then an instance location nearby the physical GPU (e.g., within the same data center) may be selected to optimize the placement criteria. As another example, an instance location in a data center nearest the client device may be selected to minimize latency between the physical compute instance and the client device, where the proximity of the data center to the client device is measured based on anticipated or historical latency and/or on geographical proximity.

As shown in 1716, a virtual compute instance may be provisioned using the physical compute instance in the selected instance location. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. The virtual compute instance may be selected from a plurality of instance types having various capabilities.

As shown in 1720, the virtual GPU may be attached to the virtual compute instance. In one embodiment, an elastic graphics service may interact with one or more other services or functionalities of a provider network, such as a compute virtualization functionality and/or GPU virtualization functionality, to attach the virtual GPU to the instance. The physical GPU used to implement the virtual GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 1725, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU.

As shown in 1730, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Figure 17C:
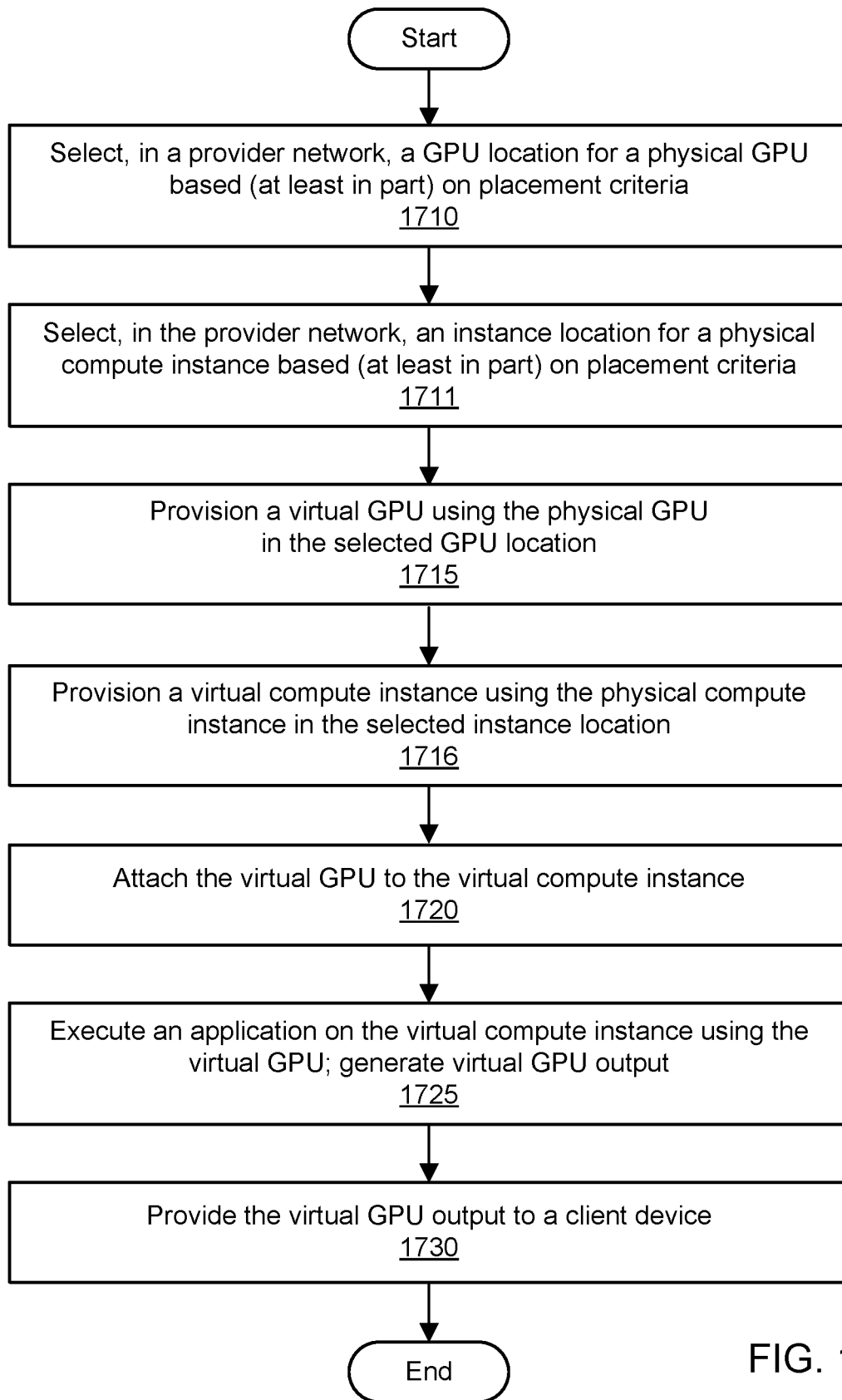
FIG. 17C is a flowchart illustrating a method for placement optimization for virtualized graphics processing, including location selection for a physical GPU used to implement a virtual GPU and location selection for a physical compute instance used to implement a virtual compute instance, according to one embodiment.

FIG. 17C is a flowchart illustrating a method for placement optimization for virtualized graphics processing, including location selection for a physical GPU used to implement a virtual GPU and location selection for a physical compute instance used to implement a virtual compute instance, according to one embodiment. The method may optimize placement of a virtual GPU as well as placement of a virtual compute instance to which the virtual GPU is attached. As used herein, optimization includes improvement (of performance, cost, and so on) even if the improvement does not achieve an ideal or perfect state. A provider network may include a plurality of GPU locations for a plurality of physical GPUs (e.g., for graphics servers that include and provide access to the physical GPUs). For example, the GPU locations may include a plurality of racks, a plurality of data centers, and/or a plurality of geographical regions. The provider network may also include a plurality of instance locations for a plurality of physical compute instances. The instance locations may include a plurality of racks, a plurality of data centers, and/or a plurality of geographical regions. Some of the GPU locations may be within the same racks, same data centers, and/or same geographical regions as some of the instance locations. Placement optimization may often seek to place virtual compute instances and their attached virtual GPUs within the same rack or otherwise near each other to minimize latency.

As shown in 1710, a particular one of the GPU locations may be selected for a physical GPU. The GPU location may be selected based (at least in part) on one or more placement criteria. The one or more placement criteria may include optimization (e.g., improvement) of metrics for performance (e.g., to maximize performance), resource usage (e.g., to minimize resource usage), cost (e.g., to minimize cost or fit resource costs within a client-specified budget), energy usage (e.g., to minimize energy usage or prioritize "green" energy), and/or any other suitable metrics. Performance metrics and cost metrics used as placement criteria may often be associated with the use of the physical GPU by the physical compute instance. Performance metrics may include network-related metrics such as latency and bandwidth, as measured within the provider network and/or between the provider network and a client device. Performance metrics may include any other metrics related to processor use, GPU use, memory use, storage use, and so on. As an example, to minimize network latency and/or bandwidth, a GPU location for a physical GPU may be selected within the same rack as the physical compute instance such that network communication between the underlying physical compute instance and physical GPU may not extend beyond a top-of-rack switch in the rack. If locations within the same rack are not available, then a GPU location nearby the physical compute instance (e.g., within the same data center) may be selected to optimize the placement criteria.

As another example, a GPU location in a data center nearest the client device may be selected to minimize latency between the physical GPU and the client device, where the proximity of the data center to the client device is measured based on anticipated or historical latency and/or on geographical proximity.

As shown in 1711, a particular one of the instance locations may be selected for a physical compute instance. The instance location may be selected based (at least in part) on one or more placement criteria. Again, the one or more placement criteria may include optimization (e.g., improvement) of metrics for performance (e.g., to maximize performance), resource usage (e.g., to minimize resource usage), cost (e.g., to minimize cost or fit resource costs within a client-specified budget), energy usage (e.g., to minimize energy usage or prioritize "green" energy), and/or any other suitable metrics. As an example, to minimize network latency and/or bandwidth, an instance location for a physical compute instance may be selected within the same rack as the physical GPU such that network communication between the underlying physical compute instance and physical GPU may not extend beyond a top-of-rack switch in the rack. If locations within the same rack are not available, then an instance location nearby the physical GPU (e.g., within the same data center) may be selected to optimize the placement criteria. As another example, an instance location in a data center nearest the client device may be selected to minimize latency between the physical compute instance and the client device, where the proximity of the data center to the client device is measured based on anticipated or historical latency and/or on geographical proximity.

As shown in 1715, a virtual GPU may be provisioned using the physical GPU in the selected GPU location. The virtual GPU may be selected from a set of virtual GPU classes having various graphics processing capabilities. The virtual GPU may be selected to meet or exceed any applicable GPU requirements, e.g., to match the current or anticipated graphics workload of the virtual compute instance.

As shown in 1716, a virtual compute instance may be provisioned using the physical compute instance in the selected instance location. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. The virtual compute instance may be selected from a plurality of instance types having various capabilities.

As shown in 1720, the virtual GPU may be attached to the virtual compute instance. In one embodiment, an elastic graphics service may interact with one or more other services or functionalities of a provider network, such as a compute virtualization functionality and/or GPU virtualization functionality, to attach the virtual GPU to the instance. The physical GPU used to implement the virtual GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

In one embodiment, a different virtual GPU may have been attached to the virtual compute instance prior to the provisioning and attachment of the virtual GPU as shown in 1715 and 1720. The newly attached virtual GPU may represent an improvement in the one or more placement criteria with respect to the previously attached virtual GPU. Graphics processing for the virtual compute instance may be migrated from the previously attached virtual GPU to the newly attached virtual GPU using the migration techniques discussed above.

As shown in 1725, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU.

As shown in 1730, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Placement criteria may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria. For example, if a virtual GPU is insufficient to meet the GPU requirements of a virtual compute instance, both the virtual GPU and the virtual compute instance may be moved to a different set of locations where a virtual GPU of a sufficiently capable class can be provisioned. Similarly, if a virtual compute instance needs to be migrated to a different location, the location of an attached virtual GPU may be migrated as well to optimize one or more placement criteria. If the resource requirements for the instance type and/or GPU class change over time (based on user input and/or performance monitoring), either the virtual compute instance and/or attached virtual GPU (and often both) may be migrated to new locations for optimization of placement criteria. If resource availability changes over time, either the virtual compute instance and/or attached virtual GPU (and often both) may be migrated to new locations for optimization of placement criteria. If resource costs change over time, either the virtual compute instance and/or attached virtual GPU (and often both) may be migrated to new locations for optimization of placement criteria.

In one embodiment, migration of resources such as virtual compute instances and/or virtual GPUs may be performed based on placement scoring. A placement score for a current placement of a resource at a resource host may be generated with respect to one or more placement criteria. The placement criteria, as discussed above, may be used to optimize placement of resources in the provider network 100. For example, placement criteria may include configuration of the resource along with other resources if part of a distributed resource, available bytes, input/output operations per second (IOPs), or slots, a resource utilization balance, such as bytes to IOPs balance, impact on capacity fragmentation, hardware/software characteristics, and/or various desired location-based configurations. It may be optimal to place a resource such as a virtual GPU in the same infrastructure zone (e.g., connected to the same network router) as a related resource such as a virtual compute instance. The placement score may reflect a score on how close the current placement is with respect to the more optimal scenario (e.g., same network router). The score may be a composite of multiple different placement criteria, considering the impact on the resource, resource host, and/or distributed system as a whole.

Resource hosts such as physical compute instances and graphics servers (that host physical GPUs) may be evaluated to determine those resource hosts that can host a resource such as a virtual compute instance or a virtual GPU. For instance, hosts that do not satisfy certain conditions may be filtered out of consideration. Such conditions may include, but are not limited to logical groups (e.g., identifying a particular server pool in which the resource is to be placed), capability or capacity to host the resource (e.g., sufficient bytes to store data, sufficient IOP bandwidth, appropriate hardware and/or software installed, etc.), location or diversity constraints (e.g., a resource that is part of a distributed resource cannot be placed on a resource host at the same server rack as another resource host hosting another resource of the distributed resource), and/or explicitly excluded resource hosts (e.g., a black list). The remaining available resource hosts that can host the resource may then be evaluated as potential destination hosts. For example, placement score(s) may be generated for the placement of the resource at possible destination resource host(s). In at least some embodiments, a subset of available resource hosts may have scores generated as a possible placement, while in other embodiments all available resource hosts may be considered by generating a placement scores.

A difference between the placement score of the current placement of the resource and the scores of the possible placements may be determined and compared to an optimization threshold. For example, the difference may be a value which is compared to a threshold value (is difference >0.3). If the difference of any of the possible placements does not exceed the optimization threshold, then another resource may be selected to evaluate. However, if the difference of any placement exceeds the resource, then the resource may be identified as a candidate resource for migration. The possible destination that created the largest difference may be identified as the destination host (if more than one destination host was evaluated).

In at least some embodiments, a priority for performing the migration of the resource to the destination resource host may be assigned. Priority factors may be used to score, weight, generate or otherwise indicate the assigned priority.

For example, priority factors may include the difference value between current and possible destination (e.g., to favor performing those migrations that make larger improvements), resource age or history (e.g., newer resources are less likely to exist as long and therefore migrations may not be as important), size or cost to perform the migration (e.g., delay migration if resource is a complicated component or service or other resource-intensive migration), and/or local network state (e.g., to delay migration operations from being performed in locations within a distributed system that might be under network or other resource constraints because of foreground processing, such as serving client requests). These factors, along with others, may be weighted, combined, ordered, or selectively applied to determine a priority for the migration operation.

Illustrative Computer System

In at least some embodiments, a computer system that implements a portion or all of one or more of the technologies described herein may include a computer system that includes or is configured to access one or more computer-readable media. FIG. 18 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 18 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a first virtual compute instance, wherein a virtual graphics processing unit (GPU) is attached to the first virtual compute instance, wherein the first virtual compute instance is implemented using first central processing unit (CPU) resources and first memory resources of a first physical compute instance in a multi-tenant provider network, wherein the virtual GPU is implemented using a physical GPU accessible to the first physical compute instance over a network, wherein the first virtual compute instance is configured to execute an application, and wherein execution of the application on the first virtual compute instance generates one or more GPU instructions that are sent to the virtual GPU over the network and executed using the virtual GPU;
   a second virtual compute instance, wherein the second virtual compute instance is implemented using second CPU resources and second memory resources of a second physical compute instance in the multi-tenant provider network; and
   one or more processors and memory storing program instructions executable by the one or more processors to:
   pause the execution of the application on the first virtual compute instance;
   migrate the application to the second virtual compute instance;
   attach the virtual GPU to the second virtual compute instance; and
   resume execution of the application on the second virtual compute instance, wherein the execution of the application on the second virtual compute instance generates one or more additional GPU instructions that are sent to the virtual GPU over the network and executed using the virtual GPU.

2. The system as recited in claim 1, wherein a location of the second virtual compute instance is selected based at least in part on optimization of a performance metric associated with use of the physical GPU.

3. The system as recited in claim 1, wherein a location of the second virtual compute instance is selected based at least in part on optimization of an energy metric associated with use of the physical GPU.

4. The system as recited in claim 1, wherein the physical GPU is implemented in the multi-tenant provider network.

5. A computer-implemented method, comprising:
   pausing an application on a first virtual compute instance, wherein the first virtual compute instance is implemented using first central processing unit (CPU) resources and first memory resources of a first physical compute instance, wherein a virtual graphics processing unit (GPU) is attached to the first virtual compute instance, and wherein the virtual GPU is implemented using a physical GPU accessible to the first physical compute instance over a network;
   attaching the virtual GPU to a second virtual compute instance, wherein the second virtual compute instance is implemented using second CPU resources and second memory resources of a second physical compute instance; and
   resuming execution of the application on the second virtual compute instance, wherein the execution of the application on the second virtual compute instance generates one or more GPU instructions that are sent to the virtual GPU over the network and executed using the virtual GPU.

6. The method as recited in claim 5, wherein a location of the second virtual compute instance is selected according to one or more placement criteria.

7. The method as recited in claim 6, wherein the one or more placement criteria are associated with a performance metric for use of the physical GPU.

8. The method as recited in claim 6, wherein the one or more placement criteria are based at least in part on an energy metric for use of the physical GPU.

9. The method as recited in claim 5, wherein a location of the second virtual compute instance is selected based at least in part on network locality with respect to the physical GPU.

10. The method as recited in claim 5, wherein a location of the second virtual compute instance is selected based at least in part on reduction of network latency between the physical GPU and the second physical compute instance.

11. The method as recited in claim 5, further comprising:
    migrating the application from the first virtual compute instance to the second virtual compute instance, wherein execution of the application on the first virtual compute instance prior to migration generates one or more additional GPU instructions that are sent to the virtual GPU over the network and executed using the virtual GPU.

12. The method as recited in claim 5, wherein the first physical compute instance, the second physical compute instance, and the physical GPU are implemented in a multi-tenant provider network.

13. One or more non-transitory computer-readable storage media storing program instructions that, when executed on or across one or more processors, perform:
- executing an application on a first virtual compute instance, wherein the first virtual compute instance is implemented using first central processing unit (CPU) resources and first memory resources of a first physical compute instance in a multi-tenant provider network, wherein a virtual graphics processing unit (GPU) is attached to the first virtual compute instance, wherein the virtual GPU is implemented using a physical GPU accessible to the first physical compute instance over a network, and wherein the execution of the application on the first virtual compute instance generates one or more GPU instructions that are sent to the virtual GPU over the network and executed using the virtual GPU;
- pausing the execution of the application on the first virtual compute instance;
- attaching the virtual GPU to a second virtual compute instance, wherein the second virtual compute instance is implemented using second CPU resources and second memory resources of a second physical compute instance in a multi-tenant provider network; and
- resuming execution of the application on the second virtual compute instance, wherein the execution of the application on the second virtual compute instance generates one or more additional GPU instructions that are sent to the virtual GPU over the network and executed using the virtual GPU.

14. The one or more non-transitory computer-readable storage media as recited in claim 13, wherein a location of the second virtual compute instance is selected according to one or more placement criteria.

15. The one or more non-transitory computer-readable storage media as recited in claim 14, wherein the one or more placement criteria are associated with a performance metric for use of the physical GPU by the second physical compute instance.

16. The one or more non-transitory computer-readable storage media as recited in claim 14, wherein the one or more placement criteria are associated with an energy metric for use of the physical GPU by the second physical compute instance.

17. The one or more non-transitory computer-readable storage media as recited in claim 13, wherein a location of the second virtual compute instance is selected based at least in part on network locality with respect to the physical GPU.

18. The one or more non-transitory computer-readable storage media as recited in claim 13, wherein a location of the second virtual compute instance is selected based at least in part on reduction of network latency between the physical GPU and the second physical compute instance.

19. The one or more non-transitory computer-readable storage media as recited in claim 13, further comprising additional program instructions that, when executed on or across the one or more processors, perform:
- initiating migration of the application from the first virtual compute instance to the second virtual compute instance based at least in part on optimization of one or more metrics.

20. The one or more non-transitory computer-readable storage media as recited in claim 13, wherein the physical GPU is implemented in the multi-tenant provider network.

* * * * *